(12) United States Patent
Kato et al.

(10) Patent No.: US 8,895,200 B2
(45) Date of Patent: Nov. 25, 2014

(54) FUEL CELL SYSTEM

(75) Inventors: Manabu Kato, Susono (JP); Michihito Tanaka, Mishima (JP); Shuya Kawahara, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 27 days.

(21) Appl. No.: 13/125,770

(22) PCT Filed: Aug. 2, 2010

(86) PCT No.: PCT/JP2010/004875
§ 371 (c)(1),
(2), (4) Date: Apr. 26, 2011

(87) PCT Pub. No.: WO2012/017474
PCT Pub. Date: Feb. 9, 2012

(65) Prior Publication Data
US 2013/0130140 A1    May 23, 2013

(51) Int. Cl.
*H01M 8/04* (2006.01)
*H01M 8/10* (2006.01)

(52) U.S. Cl.
CPC ........ *H01M 8/04223* (2013.01); *H01M 8/0432* (2013.01); *H01M 8/0444* (2013.01); *H01M 8/04559* (2013.01); *H01M 8/04679* (2013.01); *H01M 2008/1095* (2013.01); *Y02E 60/50* (2013.01)
USPC .......................................... 429/429; 429/432

(58) Field of Classification Search
CPC ................. H01M 2008/1095; H01M 8/04223; H01M 8/0444; H01M 8/04559
USPC .................................. 429/429–432
See application file for complete search history.

(56) References Cited

U.S. PATENT DOCUMENTS

| | | | |
|---|---|---|---|
| 7,906,243 B2 | 3/2011 | Lee et al. | |
| 2003/0039869 A1* | 2/2003 | Murakami et al. | 429/13 |
| 2009/0110988 A1 | 4/2009 | Morikawa et al. | |
| 2009/0148730 A1 | 6/2009 | Chizawa et al. | |

(Continued)

FOREIGN PATENT DOCUMENTS

| | | |
|---|---|---|
| CN | 1808165 A | 7/2006 |
| JP | A-2005-310644 | 11/2005 |

(Continued)

OTHER PUBLICATIONS

International Search Report for International Patent Application No. PCT/JP2010/004875, mailed on Nov. 2, 2010 (w/ English translation).

*Primary Examiner* — Jonathan Jelsma
*Assistant Examiner* — Rashid Alam
(74) *Attorney, Agent, or Firm* — Oliff PLC

(57) ABSTRACT

A fuel cell system having a fuel cell includes a power generation-time gas supplier that supplies hydrogen-containing fuel gas to an anode of the fuel cell and supplies an oxygen-containing oxidizing gas to a cathode of the fuel cell during power generation of the fuel cell. The fuel cell system also includes an anode potential rise information acquirer that acquires anode potential rise information, which represents information regarding a status of an anode potential rise of the fuel cell, after termination of supplies of the fuel gas and the oxidizing gas by the power generation-time gas supplier. The fuel cell system further includes an anode morphology variation deriver that derives an anode morphology variation representing a degree of a morphology change of a catalyst metal included in the anode, based on the anode potential rise information.

24 Claims, 25 Drawing Sheets

(56) References Cited

U.S. PATENT DOCUMENTS

2010/0136447 A1    6/2010   Kumei et al.

FOREIGN PATENT DOCUMENTS

| | | |
|---|---|---|
| JP | A-2006-147250 | 6/2006 |
| JP | A-2008-218097 | 9/2008 |
| JP | A-2008-277044 | 11/2008 |
| JP | A-2009-104986 | 5/2009 |
| JP | A-2009-140751 | 6/2009 |
| JP | A-2009-259481 | 11/2009 |
| JP | A-2009-301868 | 12/2009 |
| JP | A-2010-10050 | 1/2010 |
| JP | A-2010-80166 | 4/2010 |

* cited by examiner

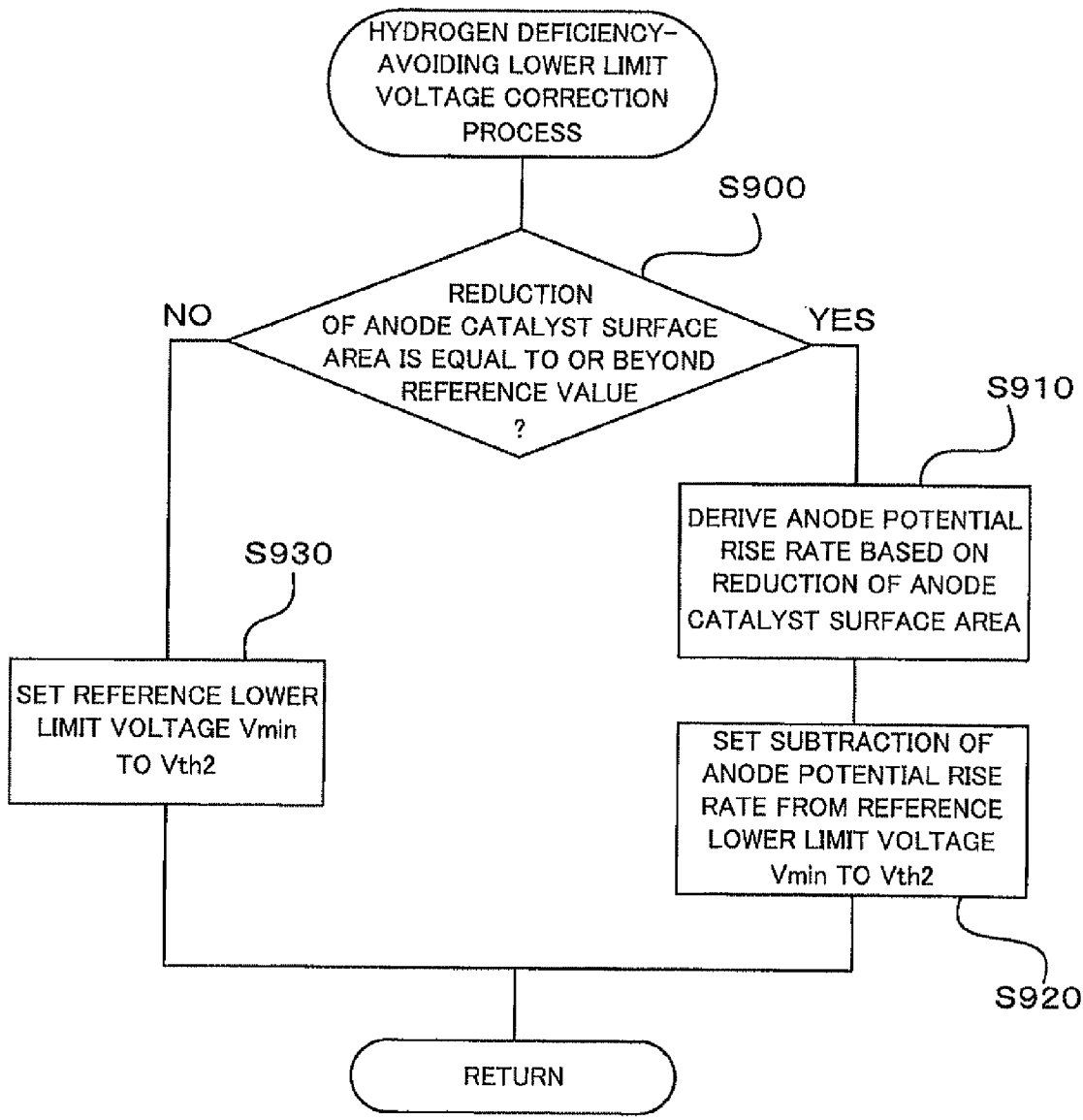

FUEL CELL SYSTEM

TECHNICAL FIELD

The present invention relates to a fuel cell system.

BACKGROUND ART

One typical cause for a time change of the performance of a fuel cell is a morphology change of an electrode catalyst. An electrode for the fuel cell generally has catalyst-supported particles prepared by dispersively supporting a catalyst metal, e.g., platinum, on a carrier, e.g., carbon particles. The morphology change of the electrode catalyst is, for example, agglutination of catalyst metal fine particles dispersively supported on the carrier to reduce the overall surface area of the catalyst metal on the electrode. One proposed method of detecting such a morphology change of the electrode catalyst and its degree determines the effective area of the electrode catalyst based on the cyclic voltammetry characteristic (for example, Patent Literature 1).

CITATION LIST

Patent Literature 1: JP 2008-218097
Patent Literature 2: JP 2009-140751
Patent Literature 3: JP2009-259481
Patent Literature 4: JP2010-80166

The proposed method of determining the effective area of the electrode catalyst based on the cyclic voltammetry characteristic, however, requires a measurement device for cyclic voltammetry, in addition to a fuel cell system. This method also requires separate opportunities for cyclic voltammetry, independently of general starts and stoppages of power generation of the fuel cell.

DISCLOSURE OF THE INVENTION

By taking into account at least part of the issue discussed above, there is a requirement for readily detecting a morphology change of an electrode catalyst and its degree. There is also a requirement for optimizing power generation control of a fuel cell, based on the readily detected degree of the morphology change of the electrode catalyst.

In order to address at least part of the requirement described above, the present invention provides various embodiments and applications described below.

A first aspect of the present invention is directed to a fuel cell system having a fuel cell, comprising:

a power generation-time gas supplier that supplies a hydrogen-containing fuel gas to an anode of the fuel cell and supplies an oxygen-containing oxidizing gas to a cathode of the fuel cell during power generation of the fuel cell;

an anode potential rise information acquirer that acquires anode potential rise information, which represents information regarding a status of an anode potential rise of the fuel cell, after termination of supplies of the fuel gas and the oxidizing gas by the power generation-time gas supplier; and an anode morphology variation deriver that derives an anode morphology variation representing a degree of a morphology change of a catalyst metal included in the anode, based on the anode potential rise information.

The fuel cell system according to the first aspect of the invention acquires the anode potential rise information and thus enables easier detection of an anode potential rise associated with a stoppage of power generation of the fuel cell than direct measurement of an anode potential. The fuel cell system derives an anode morphology variation, based on the detected anode potential rise. This arrangement enables the anode morphology variation to be readily derived by this simple method without requiring direct measurement of the anode morphology variation.

In one preferable application of the fuel cell system according to this aspect of the invention, the anode potential rise information acquired by the anode potential rise information acquirer represents information showing one occurrence of anode potential rise occurring after a stoppage of power generation of the fuel cell. The fuel cell system of this application enables the anode morphology variation to be readily derived, based on the simple information showing one anode potential rise occurring after a stoppage of power generation of the fuel cell.

In one preferable embodiment of the invention, the fuel cell system further has a voltage acquirer that obtains a voltage of the fuel cell, wherein the information showing one occurrence of anode potential rise occurring after the stoppage of the fuel cell is generated based on a variation pattern of the voltage obtained by the voltage acquirer. The fuel cell system of this embodiment assures acquisition of the anode potential rise information by the simple configuration of detecting the voltage of the fuel cell.

In one preferable application of the fuel cell system of the above embodiment, the variation pattern of the voltage obtained by the voltage acquirer has a drop after the stoppage of power generation of the fuel cell, an upward turn from the drop, and a subsequent downward turn. The fuel cell system of this application assures easy acquisition of the anode potential rise information by detecting a voltage variation of the fuel cell that drops after a stoppage of power generation, takes an upward turn from the drop, and substantially takes a downward turn.

In another preferable embodiment of the invention, the fuel cell system further has an elapsed time acquirer that obtains an elapsed time after a stoppage of power generation of the fuel cell, wherein the information showing one occurrence of anode potential rise occurring after the stoppage of the fuel cell is generated when the elapsed time obtained by the elapsed time acquirer reaches a first reference time that is determined based on a progress status of an anode morphology change. The fuel cell system of this embodiment assures acquisition of the anode potential rise information by the simple configuration of detecting the elapsed time after a stoppage of power generation of the fuel cell.

In one preferable application of the fuel cell system of the above embodiment, the first reference time represents a time period required for stabilization of anode potential which rises after the stoppage of power generation of the fuel cell. The fuel cell system of this application assures accurate detection of one anode potential rise after a stoppage of power generation of the fuel cell.

In another preferable application of the fuel cell system of the above embodiment, the first reference time represents a time period required for termination of an anode morphology change reaction proceeding after the stoppage of power generation of the fuel cell. The fuel cell system of this application further enhances the reliability of the detection of one anode potential rise after a stoppage of power generation of the fuel cell.

In still another preferable embodiment of the invention, the fuel cell system further has an oxygen partial pressure deriver that derives an oxygen partial pressure in a flow path of the fuel cell formed on the anode in the fuel cell, wherein the information showing one occurrence of anode potential rise occurring after the stoppage of the fuel cell is generated when the oxygen partial pressure derived by the oxygen partial pressure deriver exceeds a preset reference partial pressure. The fuel cell system of this embodiment assures accurate detection of one anode potential rise after a stoppage of power generation of the fuel cell.

In one preferable embodiment of the fuel cell system, the information showing one occurrence of anode potential rise occurring after the stoppage of the fuel cell is generated upon execution of a power generation stopping process of the fuel cell associated with termination of the supplies of the fuel gas and the oxidizing gas by the power generation-time gas supplier. The fuel cell system of this embodiment enables acquisition of the anode potential rise information by this simple method.

In one preferable application of the fuel cell system of this embodiment, the power generation stopping process comprises an air purge operation of supplying air to a flow path of the fuel gas in the fuel cell. The fuel cell system of this application assures acquisition of the anode potential rise information by this simple operation.

In one preferable embodiment of the invention, the fuel cell system further has an anode morphology variation storage that stores the anode morphology variation derived by the anode morphology variation deriver, wherein the anode morphology variation deriver adds a value currently derived as an amount of an anode morphology change proceeding with an anode potential rise by one stoppage of power generation of the fuel cell to an accumulated value of the anode morphology variation stored in the anode morphology variation storage upon previous acquisition of the anode potential rise information, so as to derive the anode morphology variation. The fuel cell system of this embodiment derives the anode morphology variation by this simple procedure.

In another preferable embodiment of the invention, the fuel cell system further has a fuel cell temperature acquirer that obtains a temperature of the fuel cell, wherein the anode morphology variation deriver derives the amount of the anode morphology change proceeding with the anode potential rise by one stoppage of power generation of the fuel cell, based on the obtained temperature of the fuel cell. The fuel cell system of this embodiment enhances the accuracy of derivation of the anode morphology variation.

In another preferable embodiment of the fuel cell system, after a stoppage of power generation of the fuel cell, upon detection of occurrence of an anode morphology change induced by an anode potential rise without interruption by a restart of the fuel cell, the anode potential rise information acquirer acquires information showing one anode potential rise occurring after the stoppage of power generation of the fuel cell, as first anode potential rise information, and after a stoppage of power generation of the fuel cell, upon detection of a restart of the fuel cell in the middle of an anode morphology change induced by an anode potential rise, the anode potential rise information acquirer acquires a value representing an anode morphology change proceeding until the restart of the fuel cell, as second anode potential rise information. The fuel cell system of this embodiment derives the anode morphology variation, while discriminating between anode morphology changes proceeding after a stoppage of power generation of the fuel cell with and without interruption of a restart of the fuel cell.

In one preferable application of the fuel cell system of this embodiment, after a stoppage of power generation of the fuel cell, on elapse of a first reference time set according to a progress status of the anode morphology change without a restart of the fuel cell, the anode potential rise information acquirer acquires the first anode potential rise information, and after a stoppage of power generation of the fuel cell, on elapse of a second reference time set at an earlier timing than the first reference time according to the progress status of the anode morphology change and on a restart of the fuel cell before elapse of the first reference time, the anode potential rise information acquirer acquires information regarding a time when the fuel cell has restarted, as the second potential rise information. The fuel cell system of this application assures acquisition of the anode potential rise information by the simple configuration of using elapse of time as a criterion of determination.

In one preferable embodiment of the above application, the fuel cell system further has an anode morphology variation storage that stores the anode morphology variation derived by the anode morphology variation deriver, wherein upon acquisition of the first anode potential rise information, the anode morphology variation deriver adds a value currently derived as an amount of an anode morphology change proceeding with an anode potential rise by one stoppage of power generation of the fuel cell to an accumulated value of the anode morphology variation stored in the anode morphology variation storage upon previous acquisition of the anode potential rise information, so as to derive the anode morphology variation, and upon acquisition of the second anode potential rise information, the anode morphology variation deriver derives a current anode morphology change proceeding between a stoppage and a restart of power generation of the fuel cell, based on the acquired second anode potential rise information, and adds the derived current anode morphology change to the accumulated value of the anode morphology variation stored in the anode morphology variation storage upon previous acquisition of the anode potential rise information, so as to derive the anode morphology variation. The fuel cell system of this embodiment assures accurate derivation of the anode morphology variation.

In one preferable embodiment of the invention, the fuel cell system further has a negative-voltage unit cell identifier that identifies a negative-voltage unit cell having a negative voltage induced by hydrogen deficiency during power generation of the fuel cell, among unit cells constituting the fuel cell and detects a power generation condition of the identified negative-voltage unit cell; a negative voltage-state anode morphology variation deriver that derives an anode morphology variation in the identified negative-voltage unit cell, based on the detected power generation condition; and a power generation-time anode morphology variation deriver that integrates the anode morphology variation derived by the negative voltage-state anode morphology variation deriver with regard to each unit cell and thereby derives a power generation-time anode morphology variation for each unit cell, which corresponds to an anode morphology change proceeding with the negative voltage induced by the hydrogen deficiency. The fuel cell system of this embodiment enables the amount of an anode morphology change proceeding during power generation of the fuel cell to be derived with regard to each unit cell, in addition to the anode morphology change proceeding after a stoppage of power generation.

In another preferable embodiment of the invention, the fuel cell system further has a voltage drop controller that changes fuel gas supply control related to the supply of the fuel gas to the anode by the power generation-time gas supplier, in order to restrict a voltage drop arising from an anode morphology change, based on the anode morphology variation derived by the anode morphology variation deriver, during power generation of the fuel cell. The fuel cell system of this embodiment effectively restricts performance degradation of the fuel cell even in progress of an anode morphology change.

In still another preferable embodiment of the invention, the fuel cell system further has a voltage drop controller that changes fuel gas supply control related to the supply of the fuel gas to the anode by the power generation-time gas supplier, in order to restrict a voltage drop arising from an anode morphology change, during power generation of the fuel cell, wherein on determination that the anode morphology variation derived by the anode morphology variation deriver is not less than a first reference value, the voltage drop controller changes the fuel gas supply control, based on the derived anode morphology variation, and on determination that the anode morphology variation derived by the anode morphology variation deriver is less than the first reference value and that there exists a unit cell whose power generation-time anode morphology variation derived by the power generation-time anode morphology variation deriver exceeds a second reference value, the voltage drop controller changes the fuel gas supply control when a voltage of the unit cell with the power generation-time anode morphology variation exceeding the second reference value drops to be lower than a reference voltage. When there is any unit cell with a voltage drop induced by progress of an anode morphology change among the unit cells constituting the fuel cell, the fuel cell system of this embodiment performs the control for restricting a further voltage drop, so as to prevent an overall voltage drop of the fuel cell. This arrangement effectively enhances the reliability of the control for restricting performance degradation of the fuel cell.

In one preferable application of the fuel cell system of the above embodiment, the voltage drop controller increases a pressure of the fuel gas supplied to the anode, as the change of the fuel gas supply control to restrict the voltage drop arising from the anode morphology change. The fuel cell system of this application increases the pressure of the fuel gas to restrict a voltage drop of the fuel cell.

In another preferable application of the fuel cell system of the above embodiment, the voltage drop controller increases a flow of the fuel gas supplied to the anode, as the change of the fuel gas supply control to restrict the voltage drop arising from the anode morphology change. The fuel cell system of this application increases the flow of the fuel gas to restrict a voltage drop of the fuel cell.

In still another preferable application of the fuel cell system of the above embodiment, the voltage drop controller increases a humidity of the fuel gas supplied to the anode, as the change of the fuel gas supply control to restrict the voltage drop arising from the anode morphology change. The fuel cell system of this application increases the humidity of the fuel gas to restrict a voltage drop of the fuel cell.

In one preferable embodiment of the invention, the fuel cell system further has a high potential avoidance controller that controls a power generation status of the fuel cell, in order to prevent an output voltage of the fuel cell from exceeding an upper limit voltage; an anode potential rise rate deriver that derives an anode potential rise rate induced by an anode morphology change, based on the anode morphology variation derived by the anode morphology variation deriver; and an upper limit voltage setter that sets a result of subtraction of the anode potential rise rate derived by the anode potential rise rate deriver from a reference upper limit voltage preset for the upper limit voltage, to the upper limit voltage. The fuel cell system of this embodiment effectively prevents the cathode potential of the fuel cell from increasing to an undesirably high level.

In another preferable embodiment of the invention, the fuel cell system further has a hydrogen-deficient operation avoidance controller that performs hydrogen-deficient operation avoidance control for avoiding continuation of power generation in a hydrogen deficient condition, when a voltage of the fuel cell drops to or below a lower limit voltage due to deficiency of hydrogen supplied to the anode; an anode potential rise rate deriver that derives an anode potential rise rate induced by an anode morphology change, based on the anode morphology variation derived by the anode morphology variation deriver; and a lower limit voltage setter that sets a result of subtraction of the anode potential rise rate derived by the anode potential rise rate deriver from a reference lower limit voltage preset for the lower limit voltage, to the lower limit voltage. The fuel cell system of this embodiment effectively avoids excessive hydrogen-deficient operation avoidance control.

In one preferable application of the fuel cell system of this embodiment, the hydrogen-deficient operation avoidance controller increases a flow of the fuel gas supplied to the anode, as the hydrogen-deficient operation avoidance control. The fuel cell system of this embodiment avoids excessive hydrogen-deficient operation avoidance control, so as to prevent deterioration of the efficiency of the fuel cell system caused by the increased flow of the fuel gas.

The technique of the present invention is not restricted to the fuel cell system having any of the configurations and arrangements discussed above but may be actualized by diversity of other applications, for example, a method of deriving an anode morphology variation, a method of restricting power output degradation of the fuel cell, a high potential avoidance control method of the fuel cell, and a hydrogen-deficient operation avoidance control method of the fuel cell.

BRIEF DESCRIPTION OF THE DRAWINGS

FIG. 33 is a flowchart of a hydrogen deficiency-avoiding lower limit voltage correction process.

DESCRIPTION OF EMBODIMENTS

A. General Configuration of Fuel Cell System 10

Figure 1:
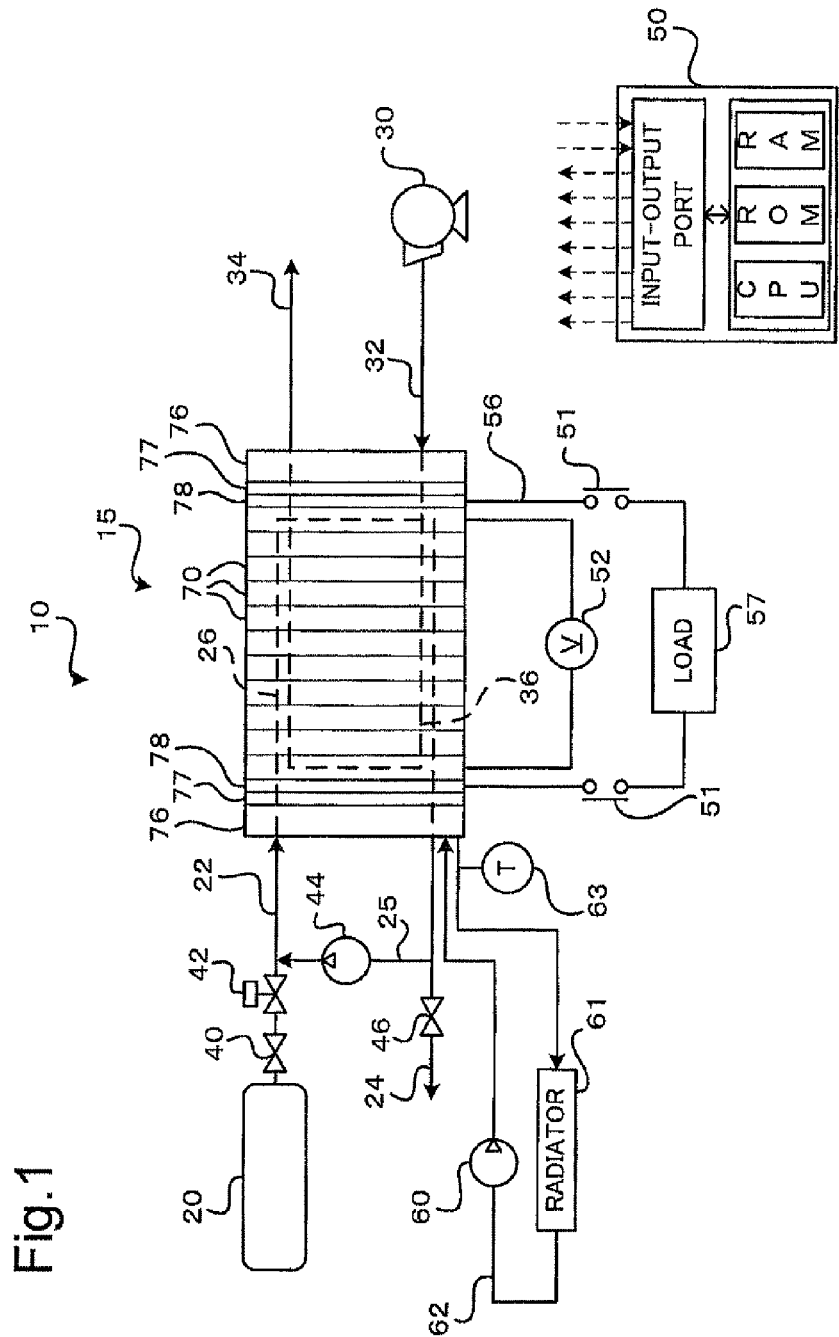
FIG. 1 is a block diagrammatic representation of the general configuration of a fuel cell system 10.

FIG. 1 is a block diagrammatic representation of the general configuration of a fuel cell system 10 as a first embodiment according to the invention. The fuel cell system 10 of the embodiment includes a fuel cell 15, a hydrogen tank 20, a compressor 30, a hydrogen shutoff valve 40, a variable regulator 42, a hydrogen circulation pump 44, a purge valve 46, a load connector 51, a voltage sensor 52, a coolant circulation pump 60, a radiator 61, a coolant temperature sensor 63, and a controller 50.

Figure 2:
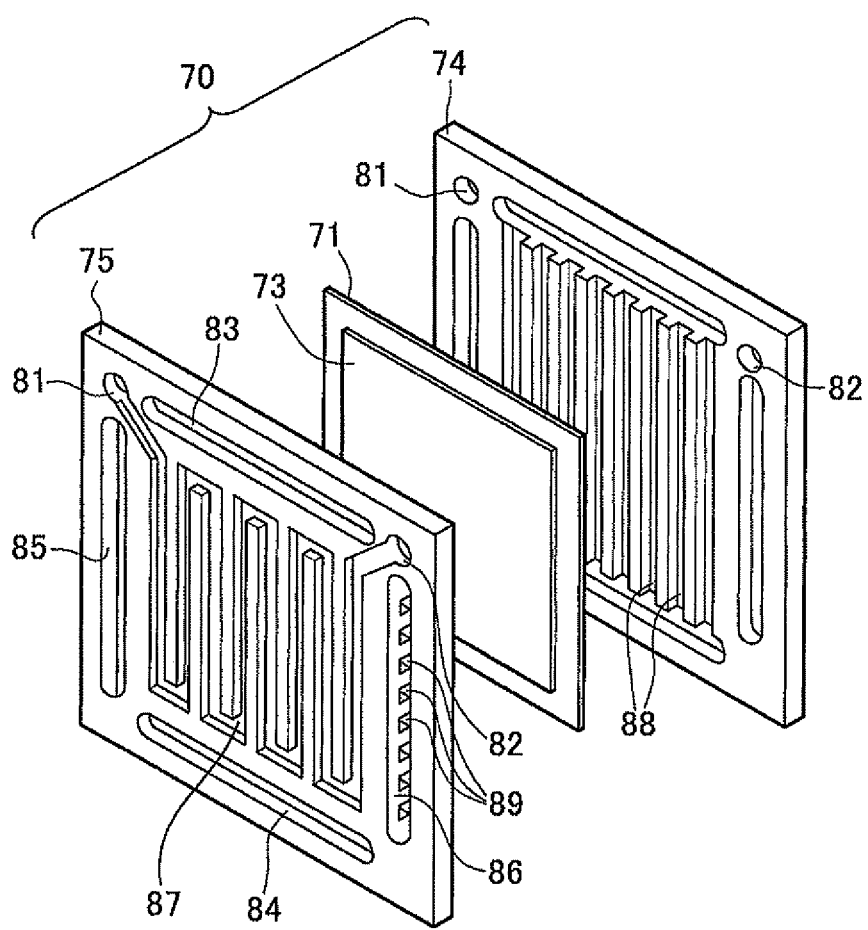
FIG. 2 is an exploded perspective representation of each unit cell 70.

The fuel cell 15 is a polymer electrolyte fuel cell constructed to have a stack structure of multiple unit cells 70 as power generation elements. FIG. 2 is an exploded perspective representation of each unit cell 70 as a unit component of the fuel cell 15. The unit cell 70 has an MEA (membrane electrode assembly) 71, gas diffusion layers 72 and 73, and gas separators 74 and 75. The MEA 71 consists of an electrolyte membrane and an anode and a cathode as electrodes formed on respective faces of the electrolyte membrane. The MEA 71 is interposed between the gas diffusion layers 72 and 73, and this sandwich structure of the MEA 71 and the gas diffusion layers 72 and 73 is further interposed between the gas separators 74 and 75 (the gas diffusion layer 72 is formed on a reverse face of the gas diffusion layer 73 and is thus omitted from the illustration of FIG. 2).

The electrolyte membrane of the MEA 71 is a proton-conductive ion exchange membrane composed of a solid polymer material, for example, a fluororesin, and has favorable electron conductivity in the wet condition. Each of the cathode and the anode is a layer formed on the electrolyte membrane and includes carbon particles with a catalyst metal (for example, platinum) supported thereon to accelerate electrochemical reactions and a proton-conductive polymer electrolyte. The gas diffusion layers 72 and 73 are composed of a member having gas permeability and electron conductivity, for example, a metal member such as foamed metal or metal mesh or a carbon member such as carbon cloth or carbon paper.

The gas separators 74 and 75 are composed of a gas-impermeable conductive member, for example, a carbon member such as dense carbon prepared by compacting carbon to have gas impermeability or a metal member such as press-formed stainless steel. Each of the gas separators 74 and 75 serves as a wall member defining, in combination with the MEA 71, a flow path of a reaction gas (a hydrogen-containing fuel gas or an oxygen-containing oxidizing gas). The gas separators 74 and 75 have concavo-convex structures formed on the respective surfaces thereof to define the corresponding gas flow paths. The gas separator 74 with grooves 88 formed thereon is combined with the MEA 71 to define an inner-cell oxidizing gas flow path as flow passage of the oxidizing gas. The gas separator 75 with grooves 89 formed thereon is combined with the MEA 71 to define an inner-cell fuel gas flow path as flow passage of the fuel gas. In assembly of the unit cell 70, a seal member (not shown) is arranged on the outer circumference of the MEA 71 to assure the sealing property of the gas flow paths in the unit cell 70 and interconnect the gas separators 74 and 75.

The gas separators 74 and 75 have concave structures 87 formed on respective reverse faces as the reverse sides of the surfaces having the grooves 88 and 89 formed thereon to define the inner-cell gas flow paths (the concave structures 87 formed on the reverse face of the gas separator 74 are omitted from the illustration). These concave structures 87 are formed over a range overlapping the whole area of the gas diffusion layers 72 and 73, on the gas separators 74 and 75. An inter-cell coolant flow path as flow passage of a cooling medium is formed between each adjacent pair of the unit cells 70. The inter-cell coolant flow path may be provided on a stack of every preset number of the unit cells 70, instead of between each adjacent pair of the unit cells 70.

The gas separators 74 and 75 respectively have a plurality of apertures formed at corresponding positions in the neighborhood of their outer circumferences. In assembly of the fuel cell by stacking a plurality of the unit cells 70, the apertures formed at the corresponding positions of the respective separators are aligned to form flow paths passing through the fuel cell in a stacking direction of the gas separators. More specifically, apertures 83 form an oxidizing gas supply manifold serving to distribute the flow of oxidizing gas into the respective inner-cell oxidizing gas flow paths. Apertures 84 form an oxidizing gas exhaust manifold serving to collect the flows of oxidizing gas from the respective inner-cell oxidizing gas flow paths. Apertures 85 form a fuel gas supply manifold serving to distribute the flow of fuel gas into the respective inner-cell fuel gas flow paths. Apertures 86 form a fuel gas exhaust manifold serving to collect the flows of fuel gas from the respective inner-cell fuel gas flow paths. Apertures 81 form a coolant supply manifold serving to distribute the flow of coolant to the respective inter-cell coolant flow paths. Apertures 82 form a coolant discharge manifold serving to collect the flows of coolant from the respective inter-cell coolant flow paths.

The fuel cell 15 of the embodiment is completed by sequentially arranging a collector (terminal) 78 with an output terminal, an insulator 77, and an end plate 76 on both ends of the cell laminate obtained by stacking the plurality of the unit cells 70 as shown in FIG. 1. The fuel cell 15 is kept under a certain fastening pressure in the stacking direction of the unit cells 70 by means of a holder member (not shown), for example, a tension plate connected to both the end plates 76 with bolts.

The hydrogen tank 20 included in the fuel cell system 10 serves as a reservoir of hydrogen gas used as the fuel gas and is connected with the fuel gas supply manifold or hydrogen supply manifold of the fuel cell 15 via a hydrogen supply passage 22. The hydrogen shutoff valve 40 and the variable regulator 42 are provided on the hydrogen supply passage 22 in this sequence from the position closer to the hydrogen tank 20. The variable regulator 42 is configured to regulate the hydrogen pressure (quantity of hydrogen) to be supplied from the hydrogen tank 20 to the fuel cell 15. The hydrogen tank 20 may be a hydrogen cylinder for storage of high-pressure hydrogen gas or alternatively a tank including a hydrogen storage alloy to absorb hydrogen therein for storage of hydrogen.

A hydrogen exhaust passage 24 is connected with the fuel gas exhaust manifold or hydrogen exhaust manifold of the fuel cell 15. The hydrogen exhaust passage 24 is equipped with the purge valve 46. A connection passage 25 is provided to connect the hydrogen supply passage 22 with the hydrogen exhaust passage 24. The connection passage 25 is connected with the hydrogen supply passage 22 in the downstream of the variable regulator 42, while being connected with the hydrogen exhaust passage 24 in the upstream of the purge valve 46. The hydrogen circulation pump 44 is located on the connection passage 25 to generate a driving force for circulating hydrogen through the flow path.

The hydrogen supplied from the hydrogen tank 20 through the hydrogen supply passage 22 is subjected to the electrochemical reactions in the fuel cell 15 and is then led to the hydrogen exhaust passage 24. The hydrogen led to the hydrogen exhaust passage 24 flows through the connection passage 25 and is again introduced into the hydrogen supply passage 22. In the fuel cell system 10, the hydrogen is accordingly circulated through part of the hydrogen exhaust passage 24, the connection passage 25, part of the hydrogen supply passage 22, and the fuel gas flow paths formed in the fuel cell 15 (these passages and flow paths are collectively referred to as "hydrogen circulation flow path"). During power generation of the fuel cell 15, the purge valve 46 is generally closed. In response to an increase in concentration of the impurities (for example, nitrogen and water vapor) included in the circulated hydrogen flow, the purge valve 46 is opened at appropriate timings to flow part of the hydrogen gas with the increased impurity concentration out of the system. When hydrogen in the hydrogen circulation flow path becomes insufficient in quantity by consuming the hydrogen through the progress of the electrochemical reactions or by opening the purge valve 46, hydrogen is resupplied from the hydrogen tank 20 to the hydrogen circulation flow path via the variable regulator 42.

The compressor 30 serves to compress the externally intake air and supply the compressed air as the oxidizing gas to the fuel cell 15 and is connected with the oxidizing gas supply manifold of the fuel cell 15 via an air supply passage 32. The oxidizing gas exhaust manifold of the fuel cell 15 is connected with an air exhaust passage 34. The air supplied from the compressor 30 through the air supply passage 32 is subjected to the electrochemical reactions in the fuel cell 15 and is flowed through the air exhaust passage 34 to be discharged out of the fuel cell 15.

As described above, in the course of power generation of the fuel cell 15, the fuel gas is supplied to the anodes of the fuel cell 15 by means of the hydrogen tank 20, the variable regulator 42, and the hydrogen circulation pump 44, while the oxidizing gas is supplied to the cathodes of the fuel cell 15 by means of the compressor 30. A combination of these components thus serves as the power generation-time gas supplier configured to supply the fuel gas to the anodes and the oxidizing gas to the cathodes of the fuel cell in power generation of the fuel cell.

A load 57 is connected to the respective collectors 78 of the fuel cell 15 via wiring 56. The load 57 may be, for example, a secondary battery or a power-consuming device (e.g., motor). The load connector 51 is arranged on the wiring 56 to serve as a switch to enable and cut off the connection between the fuel cell 15 and the load 57. The load connector 51 is switched on to enable the connection between the fuel cell 15 and the load 57 in power generation of the fuel cell 15, while being switched off to cut off the connection between the fuel cell 15 and the load 57 at a stoppage of power generation of the fuel cell 15.

The voltage sensor 52 is arranged to sense a fuel cell voltage Vf of the fuel cell 15. The voltage sensor 52 may be arranged to sense a voltage of an individual unit cell 70 of the fuel cell 15.

The radiator 61 is located on a coolant passage 62 to cool down the coolant or cooling medium flowing through the coolant passage 62. The coolant passage 62 is connected with the coolant supply manifold and with the coolant discharge manifold of the fuel cell 15 explained above. The coolant circulation pump 60 is provided on the coolant passage and is actuated to circulate the flow of coolant between the radiator 61 and the fuel cell 15 and thereby regulate the internal temperature of the fuel cell 15. The coolant temperature sensor 63 configured to sense the temperature of the coolant is located at a position close to a connection with the coolant discharge manifold of the fuel cell 15 on the coolant passage 62.

The controller 50 is constructed as a microcomputer-based logic circuit and more specifically includes a CPU configured to perform a specific arithmetic operation according to a preset control program, a ROM configured to prestore control programs and control data required for various arithmetic operations performed by the CPU, a RAM configured to enable temporarily reading and writing of diversity of data required for the various arithmetic operations performed by the CPU, and an input-output port configured to input and output diversity of signals. The controller 50 outputs driving signals to the compressor 30, the hydrogen shutoff valve 40, the variable regulator 42, the load connector 51, the hydrogen circulation pump 44, the purge valve 46, and the coolant circulation pump 60. The controller 50 also obtains sensing signals from various sensors including the voltage sensor 52 and the coolant temperature sensor 63. The controller 50 also has a timer function of counting a preset time period.

In the illustrated configuration of FIG. 1, only the fuel cell 15 is shown as a power source of the fuel cell system 10 to supply electric power to the load 57. The fuel cell system 10 is also equipped with a secondary battery (not shown) as another power source. The secondary battery is arranged in combination with or separately from the fuel cell 15 to supply electric power to the power-consuming device, e.g., the motor, as the load 57. The secondary battery is chargeable by the fuel cell 15 on the occasion of a decrease in remaining charge. The secondary battery is thus regarded as the load 57 for the fuel cell 15 in the course of charging. After a stoppage of power generation of the fuel cell 15, the secondary battery serves to supply electric power to the controller 50 and the other respective components of the fuel cell system 10.

B. Increase of Anode Potential on Stoppage of Power Generation

At a start of power generation of the fuel cell 15 simultaneously with activation of the fuel cell system 10, the controller 50 performs series of processing to start the power generation. More specifically, in response to reception of a command signal to activate the fuel cell system 10, the controller 50 controls the load connector 51 to connect the fuel cell 15 with the load 57. The controller 50 opens the hydrogen shutoff valve 40, adjusts the variable regulator 42, controls operation of the compressor 30 in response to a load demand, and actuates the hydrogen circulation pump 44 and the coolant circulation pump 60. This starts the supplies of the fuel gas and the oxidizing gas to the fuel cell 15. In an application with the motor connected as the load 57, the controller 50 outputs a driving signal for driving the load 57 to the load 57 in response to the load demand. In the course of power generation of the fuel cell 15, the controller 50 additionally performs appropriate valve-opening control of the purge valve 46.

At a stoppage of power generation of the fuel cell 15, for example, when the fuel cell system 10 receives a system shutdown request, the controller 50 performs a series of power generation stopping process. More specifically, the controller 50 activates the load connector 51 to cut off the connection between the fuel cell 15 and the load 57. The controller 50 also closes the hydrogen shutoff valve 40 and stops the operations of the hydrogen circulation pump 44 and the compressor 30 to terminate the supplies of the fuel gas and the oxidizing gas to the fuel cell 15. During a stoppage of power generation, the purge valve 46 is kept closed. In this state, hydrogen is sealed in a fuel gas flow path (hereafter referred to as "anode-side flow path") including the inner-cell fuel gas flow paths, the fuel gas manifolds, the hydrogen supply passage 22 having one end closed with the hydrogen shutoff valve 40, the hydrogen exhaust passage 24 having one end closed with the purge valve 46, and the connection passage 25. At the time of operation stop of the compressor 30 as mentioned above, an oxidizing gas flow path (hereafter referred to as "cathode-side flow path") including the inner-cell oxidizing gas flow paths, the oxidizing gas manifolds, the air exhaust passage 34, and the air supply passage 32 having one end closed with the compressor 30 is filled with the air. The coolant circulation pump 60 eventually stops its operation in the course of the system shutdown. When the control based on the temperature of the fuel cell is performed in the course of a stoppage of power generation as discussed later, however, the coolant circulation pump 60 may continue its operation for some time even after a stoppage of power generation.

Figure 3:
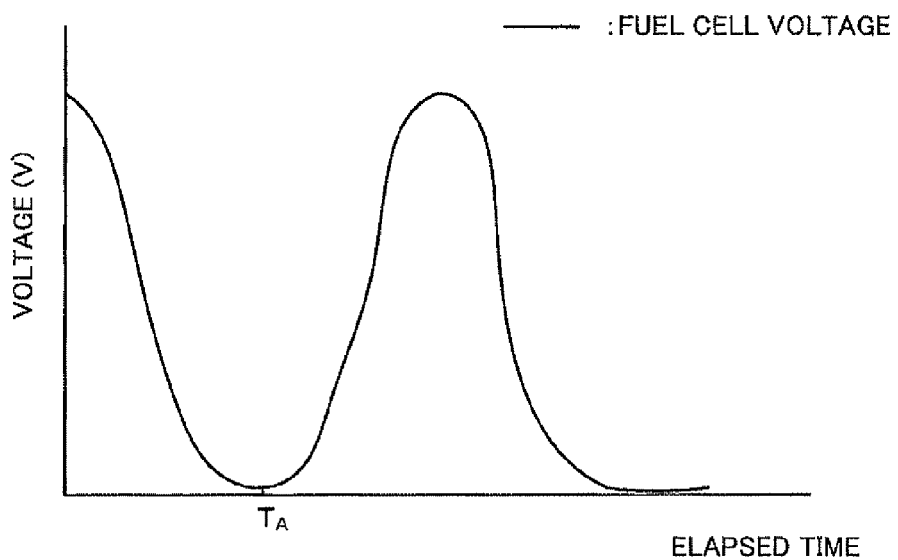
FIG. 3 is an explanatory graphical representation of a variation of the fuel cell voltage after a stoppage of power generation.

The following describes an increase of the fuel cell voltage and an increase of the electrode potential induced by a stoppage of power generation of the fuel cell 15. FIG. 3 is an explanatory graphical representation of a variation of the fuel cell voltage after a stoppage of power generation. The graph of FIG. 3 has the time elapsed since a stoppage of power generation of the fuel cell (with termination of the gas supplies and cutoff of the connection with the load 57) as the abscissa and the voltage of the fuel cell 15 as the ordinate. At the time of a system shutdown with terminating the supplies of the fuel gas and the oxidizing gas to the fuel cell 15 to stop power generation, the fuel gas (hydrogen) is sealed in the anode-side fuel path, while the cathode-side fuel path is filled with the oxidizing gas (the air) as discussed above. In this state, when the connection between the fuel cell 15 and the load 57 is cut off, the fuel cell 15 has a relatively high voltage level (a voltage level corresponding to OCV immediately after a stoppage of power generation). In each of the unit cells 70, hydrogen is then diffused from the anode to the cathode across the electrolyte membrane. The diffused hydrogen reacts with the air (oxygen) on the cathode, so as to consume oxygen in the inner-cell oxidizing gas flow path. Diffusion of oxygen from the cathode to the anode across the electrolyte membrane proceeds simultaneously. The oxygen in the inner-cell oxidizing gas flow path accordingly decreases in quantity to trigger a voltage drop of the fuel cell 15. In the state that there is a sufficiently large quantity of hydrogen sealed in the anode-side flow path, the voltage of the fuel cell 15 decreases with a decrease in quantity of oxygen in the cathode-side flow path and eventually reaches a stable low voltage level (for example, about 0 V).

The consumption of the oxygen in the inner-cell oxidizing gas flow path described above lowers the pressure in the cathode-side flow path and accordingly induces an inflow of the atmosphere (the air) into the cathode-side flow path through an open end of the air exhaust passage 34 that is open to the atmosphere. Such air inflow triggers a voltage rise of the fuel cell 15. More specifically, when the air is flowed into the cathode-side flow path as mentioned above, the air is diffused from the cathode to the anode across the electrolyte membrane. Such air diffusion causes a hydrogen concentration gradient to give an area with a relatively high hydrogen concentration and an area with a relatively low hydrogen concentration on the anode to generate an internal cell. Generation of such an internal cell increases the cathode potential and triggers a rise of the fuel cell voltage (at a time $T_A$ in FIG. 3). The state of generating the internal cell represents a state where electrons are transmitted between the reactions proceeding in the individual in-plane areas of the MEA 71 without a flow of electrons to and from an external circuit.

More specifically, the same reactions as the general cell reactions (i.e., the reaction proceeding on the anode to produce protons and electrons from hydrogen and the reaction proceeding on the cathode to produce water from oxygen, protons, and electrons) proceed in the MEA 71 with regard to the area with the relatively high hydrogen concentration on the anode. Oxidation of the cathode component or more specifically the catalyst-support carrier (carbon particles in this embodiment) proceeds on the cathode, on the other hand, with regard to the area with the relatively low hydrogen concentration on the anode. Electrons are accordingly transmitted between these reactions. The oxidation of the catalyst-support carrier thus varies the particle diameter and the specific surface area of the catalyst-support carrier to promote a morphology change of the cathode.

As shown in FIG. 3, the fuel cell voltage takes a downward turn to drop again after a rise. This second voltage drop is ascribed to the consumption of the hydrogen sealed in the anode-side flow path with the progress of the internal cell reactions as explained above and the resulting interference with the electrode reactions. Even in the course of such consumption of the hydrogen, the air inflow to the cathode-side flow path continues, so that both the anode-side flow path and the cathode-side flow path are eventually filled with the similar hydrogen-free gas compositions, i.e., with the air. In the state where both the gas flow paths are similarly filled with the air, the decreasing voltage of the fuel cell 15 reaches the stable low voltage level (for example, about 0 V) again.

Figure 4:
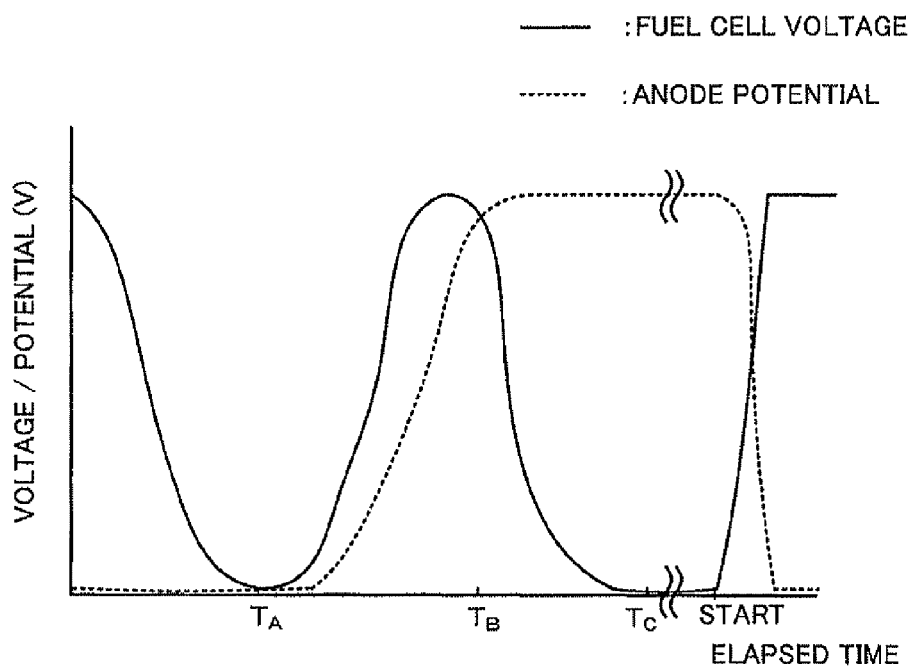
FIG. 4 is an explanatory graphical representation of a variation of the anode potential, as well as the variation of the voltage of the fuel cell.

In the state of a voltage rise of the fuel cell 15 associated with an increase of the cathode potential after the system shutdown, there is an increase of the anode potential. In the general power generation condition, the anode receives a supply of hydrogen and accordingly has an anode potential of about 0V. The fuel cell voltage represents a difference between the cathode potential and the anode potential. Under the condition that the anode potential is about 0 V, the fuel cell voltage is substantially equal to the cathode potential. After a stoppage of power generation associated with termination of the gas supplies, the oxygen inflow into the inner-cell fuel gas flow path discussed above triggers an increase of the anode potential. FIG. 4 is an explanatory graphical representation of a variation of the anode potential, as well as the variation of the voltage of the fuel cell 15 after the system shutdown shown in FIG. 3. In the graph of FIG. 4, the variation of the fuel cell voltage is shown by a solid-line curve, and the variation of the anode potential is shown by a broken-line curve. As shown in FIG. 4, until the voltage of the fuel cell 15 decreases to about 0 V with consumption of the oxygen in the cathode-side flow path, the anode potential is kept at about 0 V since there is a sufficient quantity of hydrogen but substantially no oxygen in the anode-side flow path. A voltage rise of the fuel cell 15 is triggered by the inflow of the atmosphere (air) into the cathode-side flow path and diffusion of oxygen included in the inflow air across the electrode membrane to the anode. Namely the anode potential rises with an increase in oxygen concentration in the inner-cell fuel gas flow path. In the state where both the anode-side flow path and the cathode-side flow path are similarly filled with the air and the decreasing voltage of the fuel cell 15 reaches the stable low voltage level (about 0 V) again, the anode potential rises to a high potential level substantially equivalent to the cathode potential.

After the voltage drop of the fuel cell 15 again to the stable low voltage level (about 0 V), the high potential state continues, where both the anode potential and the cathode potential are kept at the substantially equivalent high potential levels. A restart of the fuel cell system 10 with resumption of the supplies of the fuel gas and the oxidizing gas to the fuel cell 15, i.e., resumption of the supply of hydrogen to the inner-cell fuel gas flow path, triggers a decrease of the anode potential to about 0 V simultaneously with a voltage rise of the fuel cell 15.

As described above, when the fuel cell 15 stops power generation at the time of a system shutdown, the anode potential has an increase and promotes a morphology change of the electrode catalyst on the anode. In the state of the electrode potential rising to a relatively high potential level, the catalyst metal supported on the carbon particles as the carrier is eluted. Fluctuation of the electrode potential between a high potential level and a low potential level leads to repetition of elution and deposition of the catalyst metal. Such repeated elution and deposition of the catalyst metal promote a morphology change of the electrode catalyst. A morphology change on the anode is mainly triggered by the increase of the anode potential to the high potential level at a stoppage of power generation as discussed above. As the anode potential increases to the high potential level and causes elution of the catalyst metal, the catalyst metal supported on the carrier decreases in quantity or aggregates to decrease the surface area of the fine particles of the catalyst metal dispersively supported on the carrier.

The anode potential rising to the high potential level at the time of an operation shutdown of the fuel cell system 10 is kept at the high potential level until an operation restart of the fuel cell system 10. As a morphology change of the electrode catalyst is promoted with an increase of the anode potential to the high potential level, an oxide layer is formed on the surface of the catalyst metal and interferes with further elution of the catalyst metal, thereby interfering with further promotion of the morphology change. Irrespective of a time period where the anode potential is kept at the high potential level, i.e., a time period between an operation shutdown and an operation restart of the fuel cell system 10, a morphology change on the anode is promoted by a fixed degree on every operation shutdown of the fuel cell system.

On a restart of the fuel cell system 10 with resumption of the supply of the fuel gas to the fuel cell 15, the oxide layer formed on the surface of the catalyst metal at the anode is immediately reduced to disappear, so that the catalyst metal recovers its catalytic activity.

Figure 5:
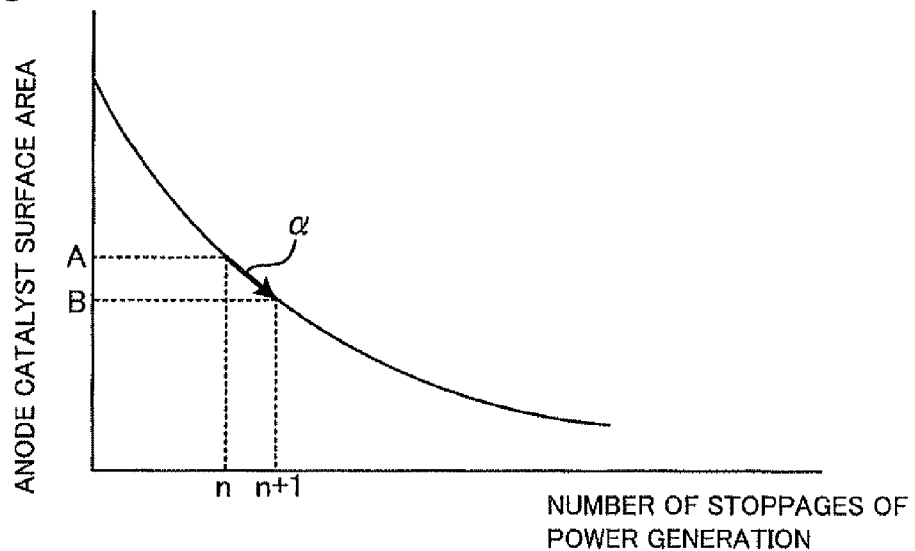
FIG. 5 is an explanatory graphical representation of a relation of an anode catalyst surface area to the number of stoppages of power generation.

C. Outline of Derivation of Morphology Variation of Anode Catalyst at Stoppage of Power Generation FIG. 5 is an explanatory graphical representation of a relation of the degree of a morphology change of the anode catalyst or more specifically an anode catalyst surface area (effective surface area having the activity of the anode catalyst) to the number of stoppages of power generation of the fuel cell associated with termination of the supplies of the fuel gas and the oxidizing gas by the power generation-time gas supplier. As explained above, when the anode potential increases to the high potential level at the time of a system shutdown, a morphology change of the anode catalyst proceeds until formation of an oxide layer on the surface of the catalyst metal on the anode. A reduction of the anode catalyst surface area induced by a subsequent increase of the anode potential to the high potential level is thus determinable corresponding to the anode catalyst surface area at the start of a morphology change (i.e., at a stoppage of power generation of the fuel cell). The relation of the anode catalyst surface area to the number of stoppages of power generation of the fuel cell can thus be specified as shown in FIG. 5.

Figure 6:
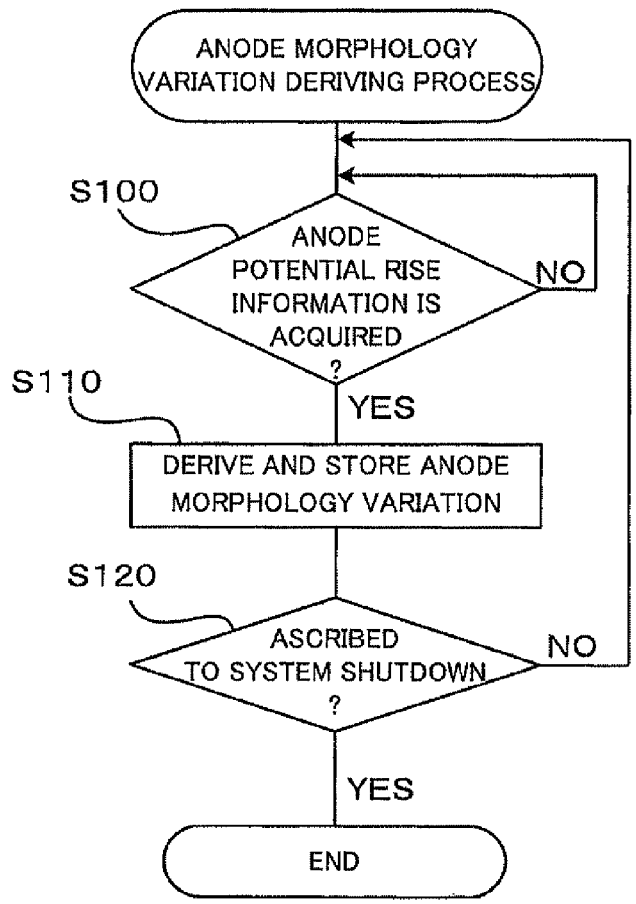
FIG. 6 is a flowchart of an anode morphology variation deriving routine.

FIG. 6 is a flowchart of an anode morphology variation deriving routine performed by the controller 50 in the fuel cell system 10. This routine is triggered by activating the fuel cell system 10. On activation of this routine, the CPU of the controller 50 first determines whether anode potential rise information is acquired (step S100). The anode potential rise information represents the state of an increase of the anode potential. The anode potential rise information may be provided as, for example, information representing one stoppage of power generation of the fuel cell associated with termination of the gas supplies by the power generation-time gas supplier. A concrete procedure of acquiring the information representing one stoppage of power generation of the fuel cell will be described later in detail. The determination at the decision step S100 is repeated until the anode potential rise information is acquired. The CPU of the controller 50 serves as the anode potential rise information acquirer at step S100.

On determination at step S100 that the anode potential rise information is acquired, the CPU of the controller 50 derives an anode morphology variation as the degree of an anode morphology change, based on the acquired anode potential rise information and stores the derived anode morphology variation (step S110). In this embodiment, the map of FIG. 5 showing the relation of the anode catalyst surface area to the number of stoppages of power generation is stored in the controller 50. A latest integration number of stoppages of power generation and a value representing a latest anode morphology variation are also stored in the controller 50. A concrete example of the value representing the latest anode morphology variation is a latest anode catalyst surface area.

A concrete procedure of step S110 increments the number of times (for example, "n" times) stored as the latest integration number of stoppages of power generation by one, so as to update the stored latest integration number of stoppages of power generation. The procedure subsequently refers to the map stored in the controller 50 and derives the anode catalyst surface area corresponding to the "n+1" times as the updated latest integration number of stoppages of power generation. In the graph of FIG. 5, a value A is given as the anode catalyst surface area corresponding to the "n" times of stoppages of power generation, and another stoppage of power generation decreases the corresponding anode catalyst surface area to a value B. The CPU of the controller 50 serves as the anode morphology variation deriver at step S110.

The map of FIG. 5 is designed to determine the anode catalyst surface area unequivocally corresponding to the number of stoppages of power generation. In the actual state, however, the anode catalyst surface area is affected by diversity of environmental factors in addition to the number of stoppages of power generation, for example, the temperature of the fuel cell 15 (anode temperature) at a stoppage of power generation. The catalyst metal is eluted through a chemical reaction when the anode potential rises to the high potential level. Accordingly the higher temperature of the fuel cell 15 gives a greater anode morphology variation per stoppage of power generation, while the lower temperature of the fuel cell 15 gives a less anode morphology variation per stoppage of power generation. Relative to a reduction of the anode catalyst surface area caused by a stoppage of power generation under a specific temperature condition, a degree (rate) of change in reduction of the anode catalyst surface area by a stoppage of power generation under each of other different temperature conditions is set in advance corresponding to the each of the other different temperature conditions. The map of FIG. 5 is designed to show the relation of the anode catalyst surface area to the number of stoppages of power generation under the specific temperature condition (reference temperature condition). In correlation to this map, the rate of change in reduction of the anode catalyst surface area by a stoppage of power generation is determined and stored in advance corresponding to each of different temperature conditions other than the reference temperature. The rate of change in reduction of the anode catalyst surface area by a stoppage of power generation under each of the other different temperature conditions to the reduction of the anode catalyst surface area by a stoppage of power generation under the reference temperature condition is referred to as "temperature-sensitive factor" in the description hereafter.

Figure 7:
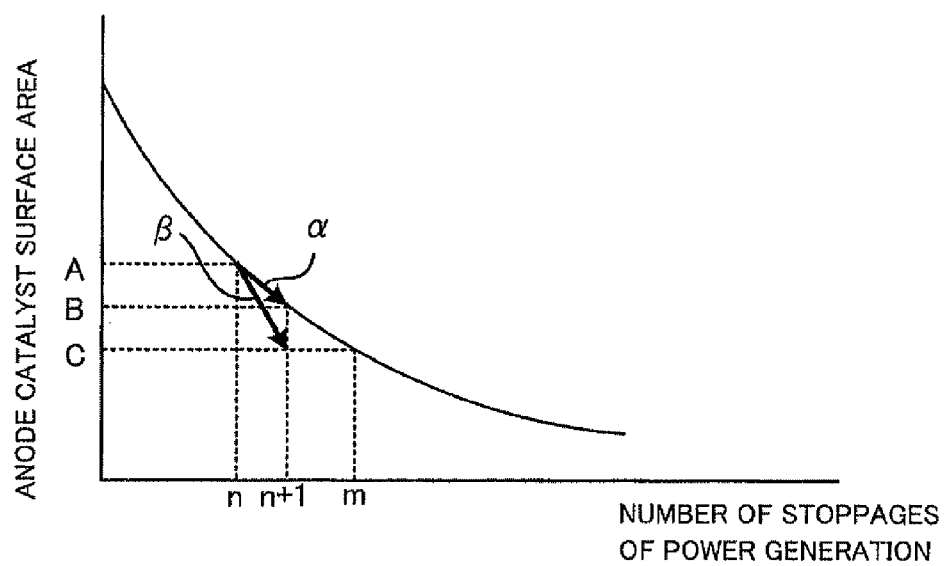
FIG. 7 is an explanatory graphical representation of a method of deriving the anode catalyst surface area when the power generation stops at a different temperature.

FIG. 7 is an explanatory graphical representation of a method of deriving the anode catalyst surface area when the power generation stops at a different temperature from the reference temperature set for the map stored in the controller 50. It is here assumed that the latest integration number of stoppages of power generation is "n" times. As described above, the (n+1)-th stoppage of power generation under the reference temperature condition decreases the anode catalyst surface area from the value A to the value B. In the maps of FIGS. 5 and 7, this decrease of the anode catalyst surface area is shown by an arrow α. The (n+1)-th stoppage of power generation under a higher temperature condition than the reference temperature, on the other hand, decreases the anode catalyst surface area from the value A to a value C that is smaller than the value B. In the map of FIG. 7, this decrease of the anode catalyst surface area is shown by an arrow β. The reduction of the anode catalyst surface area by the (n+1)-th stoppage of power generation under the higher temperature condition is computable by multiplying the slope of the arrow α representing the variation of the anode catalyst surface area under the reference temperature condition by the temperature-sensitive factor corresponding to the higher temperature condition. The multiplication of the slope of the arrow α by the temperature-sensitive factor gives the slope of the arrow β representing the variation of the anode catalyst surface area under the higher temperature condition. The value C representing the anode catalyst surface area corresponding to the (n+1)-th stoppage of power generation is then determinable from the value A representing the original anode catalyst surface area before the change and the slope of the arrow β.

In the application of deriving a corrected anode morphology variation based on the temperature of the fuel cell at a stoppage of power generation as described above, the controller 50 is required to additionally obtain the temperature of the fuel cell 15 at step S110. The temperature of the fuel cell 15 may be obtained, for example, in the form of a sensing signal of the coolant temperature sensor 63 configured to sense the temperature of the coolant discharged out of the fuel cell 15. In order to enhance the sensing accuracy of the temperature of the fuel cell 15, it is preferable to continue the operation of the coolant circulation pump 60 until completion of the processing at step S110 in the course of a stoppage of power generation of the fuel cell 15. In another example, the fuel cell 15 may be equipped with a temperature sensor configured to directly sense the internal temperature of the fuel cell 15, and the temperature of the fuel cell 15 may be obtained in the form of a sensing signal of this temperature sensor. Any suitable technique may be adopted to directly or indirectly obtain a value representing the internal temperature of the fuel cell.

The value C is obtained as the corrected anode catalyst surface area after the (n+1)-th stoppage of power generation with the temperature-sensitive factor-based correction of the map set for the reference temperature condition and stored in the controller 50. This obtained value C is equivalent to an anode catalyst surface area at an m-th stoppage of power generation under the reference temperature condition as shown in FIG. 7. In this case, after the (n+1)-th stoppage of power generation, the controller 50 accordingly corrects the integration number of stoppages of power generation (integration number of stoppages) to "m" times, instead of "(n+1)" times, and stores the corrected integration number of stoppages. In a next cycle of the anode morphology variation deriving routine of FIG. 6, the controller 50 derives the anode catalyst surface area with the temperature-sensitive factor-based correction, if necessary, at step S110, on the assumption that there is an (m+1)-th stoppage of power generation in the state of the anode catalyst surface area equal to the value C.

After the derivation and the storage of the anode morphology variation at step S110, the CPU of the controller 50 determines whether the current stoppage of power generation arises from a shutdown of the fuel cell system 10 (step S120). An anode potential rise is explained above at a stoppage of power generation of the fuel cell 15 associated with a shutdown of the fuel cell system 10. There may be a stoppage of power generation of the fuel cell 15 involving an anode potential rise on the occasion other than a shutdown of the fuel cell system 10. On determination at step S120 that the current stoppage of power generation is not ascribed to a system shutdown, the CPU of the controller 50 returns the processing flow to step S100. On determination at step S120 that the current stoppage of power generation is ascribed to a system shutdown, on the other hand, the CPU of the controller 50 terminates this routine. The stoppage of power generation of the fuel cell 15 involving an anode potential rise on the occasion other than a shutdown of the fuel cell system 10 will be described later in detail.

In the embodiment discussed above, the map of FIG. 7 is stored in the controller 50 and is referred to at step S110 to derive the anode morphology variation (anode catalyst surface area). This procedure is, however, neither essential nor restrictive. In another application, for example, an approximate expression representing the relation of the anode catalyst surface area to the number of stoppages of power generation as shown in the map of FIG. 7 may be provided and stored in advance in the controller 50, instead of the map of FIG. 7. The controller 50 increments the stored latest integration number of stoppages ("n" times) by one and substitutes the incremented integration number of stoppages ("n+1" times) into the approximate expression, so as to derive the anode catalyst surface area. In this application, the temperature-sensitive factor discussed above may be used for correction in the case that the fuel cell temperature is different from the reference temperature. A concrete procedure computes a difference between the anode catalyst surface area corresponding to the n-th stoppage as the integration number of stoppages and the anode catalyst surface area corresponding to the (n+1)-th stoppage as the integration number of stoppages, which are both obtained from the approximate expression, multiplies the computed difference by the temperature-sensitive factor, and adds the result of the multiplication to the anode catalyst surface area corresponding to the n-th stoppage as the integration number of stoppages, so as to derive the actual anode catalyst surface area corresponding to the (n+1)-th stoppage as the integration number of stoppages.

D. Acquisition of Anode Potential Rise Information in System Shutdown State

D-1. Acquisition Based on Fuel Cell Voltage

In the fuel cell system 10 of the first embodiment, the anode potential rise information representing one stoppage of power generation of the fuel cell involving an anode potential rise is acquired, based on the voltage of the fuel cell 15 at step S100 in the routine of FIG. 6. As explained above, at a stoppage of power generation of the fuel cell associated with termination of the gas supplies by the power generation-time gas supplier, the fuel cell voltage rises after a temporal drop and subsequently drops again. The anode potential increases at a specific timing, in correlation to this variation pattern of the fuel cell voltage. More specifically, the anode potential rises with an increase of the inflow of oxygen into the inner-cell fuel gas flow path. The anode potential accordingly begins to rise in correlation to a rise of the fuel cell voltage and is stabilized at a high potential level in correlation to a reach of the fuel cell voltage to its maximal voltage level (FIG. 4). Since the anode potential increases at the specific timing in correlation to the variation pattern of the fuel cell voltage, an anode potential rise involved in a stoppage of power generation of the fuel cell is estimable by measurement of the fuel cell voltage. The procedure of acquiring the anode potential rise information based on the fuel cell voltage is described in detail below.

Figure 8:
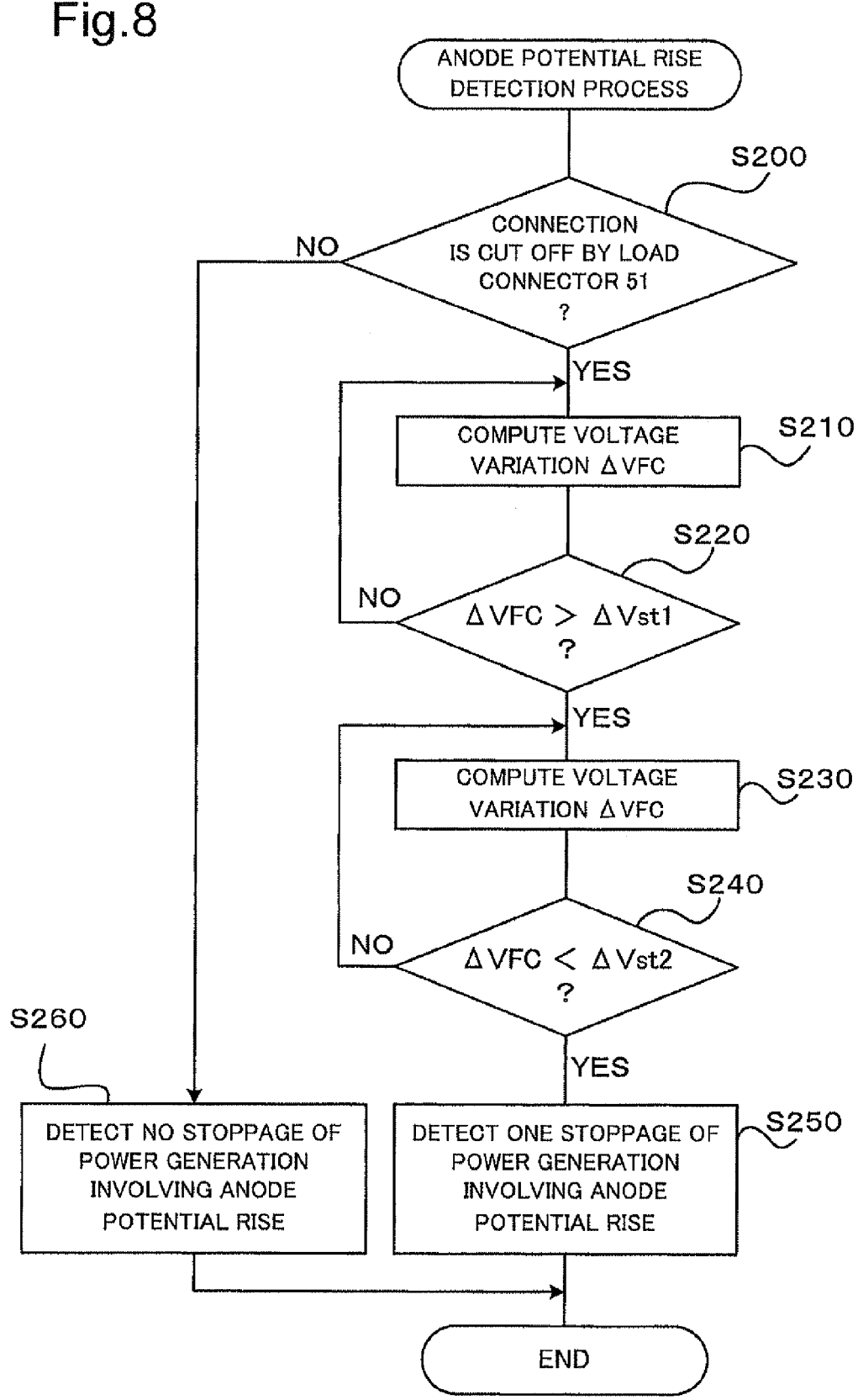
FIG. 8 is a flowchart of an anode potential rise detection routine.

FIG. 8 is a flowchart of an anode potential rise detection routine performed at step S100 by the CPU of the controller 50 in the fuel cell system 10 of the first embodiment. On activation of this routine, the CPU of the controller 50 first determines whether the connection between the fuel cell 15 and the load 57 is cut off by the load connector 51 (step S200). The decision step S200 determines whether the connection is cut off by the load connector 51, in order to determine whether there is a stoppage of power generation of the fuel cell involving an anode potential rise.

On determination at step S200 that the connection is cut off by the load connector 51, the CPU of the controller 50 computes a voltage variation $\Delta VFC$ as an amount of change of the fuel cell voltage per unit time (step S210). More specifically, the controller 50 sequentially obtains the measured voltage of the fuel cell 15 from the voltage sensor 52 at preset narrow time intervals $\Delta T$ and stores the sequentially obtained fuel cell voltages into the RAM. The controller 50 subsequently subtracts a previous measurement of the fuel cell voltage from a current measurement of the fuel cell voltage to compute a voltage variation in a latest narrow time interval. The controller 50 then divides the computed voltage variation in the latest narrow time interval by the narrow time interval $\Delta T$, which is the time interval of voltage measurement, so as to calculate the voltage variation $\Delta VFC$ as the amount of change of the fuel cell voltage per unit time.

After the computation of the voltage variation $\Delta VFC$, the CPU of the controller 50 determines whether the computed voltage variation $\Delta VFC$ is greater than a first reference value $\Delta Vst1$ (step S220). The decision step S220 determines whether the fuel cell voltage takes an upward turn after dropping to a minimal voltage level. As shown in FIG. 4, at a stoppage of power generation of the fuel cell associated with the cutoff of the connection by the load connector 51, the fuel cell voltage continuously decreases and a takes an upward turn after elapse of a time point $T_A$. Namely the first reference value $\Delta Vst1$ is set to a certain positive value that enables detection of an upward turn of the voltage after elapse of the time point $T_A$.

On determination at step S220 that the computed voltage variation $\Delta VFC$ is not greater than the first reference value $\Delta Vst1$, the CPU of the controller 50 returns the processing flow to step S210 and repeats the computation of the voltage variation $\Delta VFC$ and the comparison with the first reference value $\Delta Vst1$.

On determination at step S220 that the computed voltage variation $\Delta VFC$ is greater than the first reference value $\Delta Vst1$, on the other hand, the CPU of the controller 50 computes again the voltage variation $\Delta VFC$ as the amount of change of the fuel cell voltage per unit time (step S230). The computation procedure of step S230 is identical with the computation procedure of step S210. The CPU of the controller 50 subsequently determines whether the computed voltage variation $\Delta VFC$ is smaller than a second reference value $\Delta Vst2$ (step S240). The decision step S240 determines whether the fuel cell voltage takes a downward turn after dropping to the minimal voltage level and taking the upward turn to a maximal voltage level. As shown in FIG. 4, at a stoppage of power generation of the fuel cell associated with the cutoff of the connection by the load connector 51, the fuel cell voltage takes an upward turn after dropping to the minimal voltage level and subsequently takes a downward turn after rising to the maximal voltage level. Namely the second reference value $\Delta Vst2$ is set to a certain negative value that enables detection of a downward turn of the voltage after rising to the maximal voltage level.

On determination at step S240 that the computed voltage variation $\Delta VFC$ is not smaller than the second reference value $\Delta Vst2$, the CPU of the controller 50 returns the processing flow to step S230 and repeats the computation of the voltage variation $\Delta VFC$ and the comparison with the second reference value $\Delta Vst2$.

On determination at step S240 that the computed voltage variation AVFC is smaller than the second reference value ΔVst2, on the other hand, the CPU of the controller 50 detects one stoppage of power generation involving an anode potential rise (step S250) and terminates this routine. At this moment, at step S100 in the anode morphology variation deriving routine of FIG. 6, the CPU of the controller 50 determines acquisition of the anode potential rise information representing one stoppage of power generation of the fuel cell involving an anode potential rise.

In the routine of FIG. 8, when it is determined at step S200 that the connection is not cut off but is enabled by the load connector 51, the CPU of the controller 50 detects no stoppage of power generation involving an anode potential rise (step S260) and terminates this routine. At this moment, at step S100 in the anode morphology variation deriving routine of FIG. 6, the CPU of the controller 50 determines no acquisition of the anode potential rise information.

D-2. Acquisition Based on Time Elapsed Since Stoppage of Power Generation of Fuel Cell A method of acquisition based on the time elapsed since a stoppage of power generation of the fuel cell 15 may be adopted as another available procedure to acquire the anode potential rise information representing one stoppage of power generation of the fuel cell involving an anode potential rise at step S100 in the routine of FIG. 6. A configuration for acquiring the anode potential rise information based on the time elapsed since a stoppage of power generation in the fuel cell system 10 is discussed below as a second embodiment.

At a stoppage of power generation of the fuel cell 15 associated with the cutoff of the connection by the load connector 51, a time elapsed since a stoppage of power generation and until the beginning of stabilization of the rising anode potential is referred to as an elapsed time $T_B$ (FIG. 4). The elapsed time $T_B$ depends on a time period required for the inflow of oxygen into the inner-cell fuel gas flow path via the inner-cell oxidizing gas flow path and the electrolyte membrane after a stoppage of power generation. The elapsed time $T_B$ until the rise of the anode potential to a stabilizing maximal potential level induced by the inflow of oxygen into the inner-cell fuel gas flow path is affected by various factors, for example, the quantity of hydrogen sealed in the anode-side flow path at a stoppage of power generation, the quantity of oxygen remaining in the cathode-side flow path at a stoppage of power generation, the quantity of the catalyst included in the fuel cell, the shapes of the inner-cell fuel gas flow path and the inner-cell oxidizing gas flow path, and the shape of the air exhaust passage 34 with one end open to the atmosphere. The elapsed time $T_B$ is given as a substantially fixed value for each fuel cell system. The elapsed time $T_B$ since a stoppage of power generation of the fuel cell and until the rise of the anode potential to the stabilizing maximal potential level is thus determinable in advance for each fuel cell system. A concrete procedure of acquiring the anode potential rise information based on the time elapsed since a stoppage of power generation of the fuel cell at step S100 measures a time elapsed since a stoppage of power generation of the fuel cell associated with the cutoff of the connection by the load connector 51 and determines whether the elapsed time reaches the elapsed time $T_B$ specified and stored in advance as a reference elapsed time in the controller 50. More specifically, the CPU of the controller 50 uses an internal timer provided in the controller 50 to measure the time elapsed since a stoppage of the power generation and compares the elapsed time with the stored reference elapsed time $T_B$. When the time elapsed since a stoppage of power generation reaches the reference elapsed time $T_B$, the CPU of the controller 50 determines acquisition of the anode potential rise information representing one stoppage of power generation of the fuel cell involving an anode potential rise at step S100.

In the fuel cell system 10 of the embodiment, the air exhaust passage 34 has one end open to the atmosphere. As the remaining oxygen in the inner-cell fuel gas flow path is consumed through the reaction with hydrogen after a stoppage of power generation of the fuel cell, invasion of the atmosphere via the air exhaust passage 34 begins immediately to trigger an increase of the fuel cell voltage and an anode potential rise. In one possible configuration, the air exhaust passage 34 may be equipped with a shutoff valve. At a stoppage of power generation of the fuel cell, the shutoff valve is closed to interfere with the air circulation between the cathode-side flow path and the outside. A similar shutoff valve may additionally be provided on the side of the air supply passage 32 (for example, inside the compressor 30) according to the requirements. The shutoff valve may be closed at a stoppage of power generation. Even when the oxygen remaining in the cathode-side flow path has been used up after a stoppage of power generation of the fuel cell, this arrangement effectively prevents invasion of the external air and allows for an extremely slow inflow of oxygen into the inner-cell fuel gas flow path via the inner-cell oxidizing gas flow path and the electrolyte membrane. This accordingly enables significant extension of an elapsed time required for an increase of the fuel cell voltage and an anode potential rise induced by the air inflow after a stoppage of power generation of the fuel cell. The reference elapsed time $T_B$ until the rise of the anode potential to the stabilizing maximal potential level is determinable by additionally taking into account the sealing power of the shutoff valve. The anode potential rise information can thus be acquired, based on the time elapsed since a stoppage of power generation.

Figure 9:
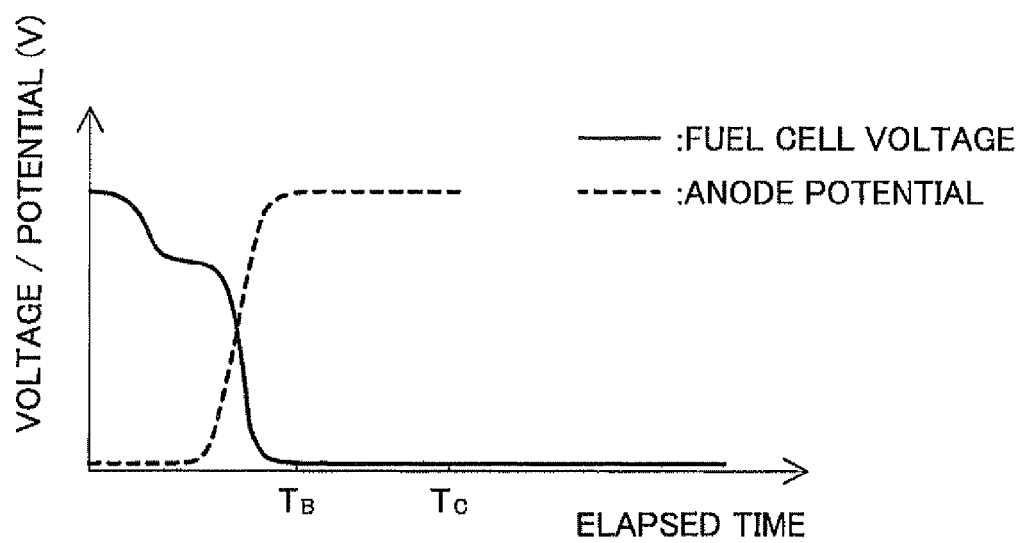
FIG. 9 is an explanatory graphical representation of one example of another pattern of a voltage behavior after a stoppage of power generation.

In some configuration of the fuel cell system, the voltage variation pattern after a stoppage of power generation of the fuel cell may not have two inflection points, i.e., an upward turn after a voltage drop and a downward turn after a voltage rise shown in FIG. 4. For example, on the condition that there is a relatively low pressure of hydrogen sealed in the anode-side flow path (i.e., there is a relatively low quantity of the sealed hydrogen) at a stoppage of power generation of the fuel cell, the oxygen has a relatively low consumption rate through the reaction with the hydrogen on the cathode after the stoppage of power generation. In this case, in the course of consumption of the oxygen remaining in the cathode-side flow path, the air (oxygen) is gradually flowed in via the air exhaust passage 34. This may give a voltage behavior of extending the period of the high voltage level to a relatively long time by slowing down a voltage drop before the fuel cell voltage sufficiently decreases to the low voltage level or by taking an upward turn of the voltage variation before the fuel cell voltage sufficiently decreases to the low voltage level. One example of such a voltage behavior is shown in FIG. 9. The graph of FIG. 9 also shows an anode potential rise in correlation to this pattern of a voltage behavior after a stoppage of power generation. The reference elapsed time $T_B$ until the rise of the anode potential to the stabilizing maximal potential level can similarly be computed and stored for the fuel cell system having a different voltage variation pattern as shown in FIG. 9. The comparison between an actual elapsed time after a stoppage of power generation and the reference elapsed time $T_B$ enables acquisition of the anode potential rise information at step S100. When the voltage variation pattern has no clear inflection point as shown in FIG. 9, there may be difficulties in measuring the fuel cell voltage and detecting an anode potential rise based on a voltage variation per unit time.

The anode potential rise information is, however, acquirable easily with high accuracy, based on the elapsed time.

The reference elapsed time $T_B$ required since a stoppage of power generation of the fuel cell and until a rise of the anode potential to the stabilizing maximal potential level depends on the configuration of the fuel cell system as discussed above and is further affected by the temperature of the fuel cell at the stoppage of power generation. The rate of the chemical reaction proceeding on the catalyst is affected by the temperature, so that a temperature change varies the consumption rate of oxygen on the cathode. In the state where the usage environment of the fuel cell system has a temperature change, it is preferable to store the reference elapsed time $T_B$ since a stoppage of power generation and until a rise of the anode potential to the stabilizing maximal potential level in the form of a map correlated to the temperature of the fuel cell at the stoppage of power generation into the controller 50. At step S100 in the routine of FIG. 6, the CPU of the controller 50 obtains the temperature of the fuel cell, refers to this stored map to compute the reference elapsed time $T_B$ required for a rise of the anode potential to the stabilizing maximal potential level at a current stoppage of power generation, and subsequently compares the computed reference elapsed time $T_B$ with an actual measurement of elapsed time. The temperature of the fuel cell may be obtained in the form of a sensing signal of the coolant temperature sensor 63 or in the form of a sensing signal of another temperature sensor separately provided for measurement of the internal temperature of the fuel cell.

In the description above, the elapsed time $T_B$ until the beginning of stabilization of the rising anode potential is set to the reference elapsed time for acquiring the information representing one stoppage of power generation of the fuel cell involving an anode potential rise based on the time elapsed since the stoppage of power generation. Such setting is, however, neither essential nor restrictive. The reference elapsed time may be set to any time period preset to enable detection of an anode morphology change corresponding to one stoppage of power generation, based on the progress of the anode morphology change. For example, the reference elapsed time may be set to a time period required for an increase of the fuel cell voltage to its maximal voltage level after a temporal decrease of the fuel cell voltage at a stoppage of power generation of the fuel cell. In another example, the reference elapsed time may be set to a time period required for a decrease of the fuel cell voltage to an approximately 0-V level after a temporal decrease and a subsequent temporal increase of the fuel cell voltage at a stoppage of power generation.

The reference elapsed time may alternatively be set to a time period required for the progress of an anode morphology change to cover the surface of the catalyst metal with an oxide layer and the resulting termination of the reaction of the anode morphology change (a reference elapsed time $T_C$ in the graph of FIG. 4). The reference elapsed time $T_C$ is also determinable in advance for each fuel cell system. A concrete procedure measures a time change of the anode morphology (for example, the reduction of the anode catalyst surface area or the amount of elution of the anode catalyst metal) and specifies a time period required for completion of the anode morphology change as the reference elapsed time $T_C$. This arrangement detects completion of an anode morphology change associated with an anode potential rise at a stoppage of power generation, thus enhancing the accuracy of estimation of the anode morphology variation. The elapsed time until the coverage of the surface of the catalyst metal with an oxide layer, as well as the elapsed time until the rise of the anode potential, is affected by the temperature. In the procedure of acquiring the anode potential rise information based on the reference elapsed time $T_C$, the reference elapsed time $T_C$ may be stored in the form of a map corresponding to the temperature of the fuel cell at a stoppage of power generation. The determination of the decision step S100 may subsequently be performed by additionally taking into account the temperature at a stoppage of power generation.

D-3. Acquisition Based on Oxygen Partial Pressure on Anode

A method of acquisition based on the oxygen partial pressure in the inner-cell fuel gas flow path after a stoppage of power generation of the fuel cell 15 may be adopted as still another available procedure to acquire the anode potential rise information representing one stoppage of power generation of the fuel cell involving an anode potential rise at step S100 in the routine of FIG. 6. The anode potential depends on the oxygen partial pressure in the environment where the anodes are placed or more specifically the oxygen partial pressure in the inner-cell fuel gas flow path. An anode potential rise is accordingly detectable by deriving the oxygen partial pressure in the inner-cell fuel gas flow path. A configuration for acquiring the anode potential rise information based on the oxygen partial pressure in the inner-cell fuel gas flow path is discussed below as a third embodiment.

A fuel cell system of the third embodiment has a similar configuration to that of the fuel cell system 10 described above, except addition of an oxygen concentration sensor and a pressure sensor (neither shown). The oxygen concentration sensor is provided in the inner-cell fuel gas flow path to sense the oxygen concentration in the inner-cell fuel gas flow path. The pressure sensor is also provided in the inner-cell fuel gas flow path to sense the total gas pressure in the inner-cell fuel gas flow path. The oxygen partial pressure in the inner-cell fuel gas flow path is then computed from the observed oxygen concentration and the observed total gas pressure.

Figure 10:
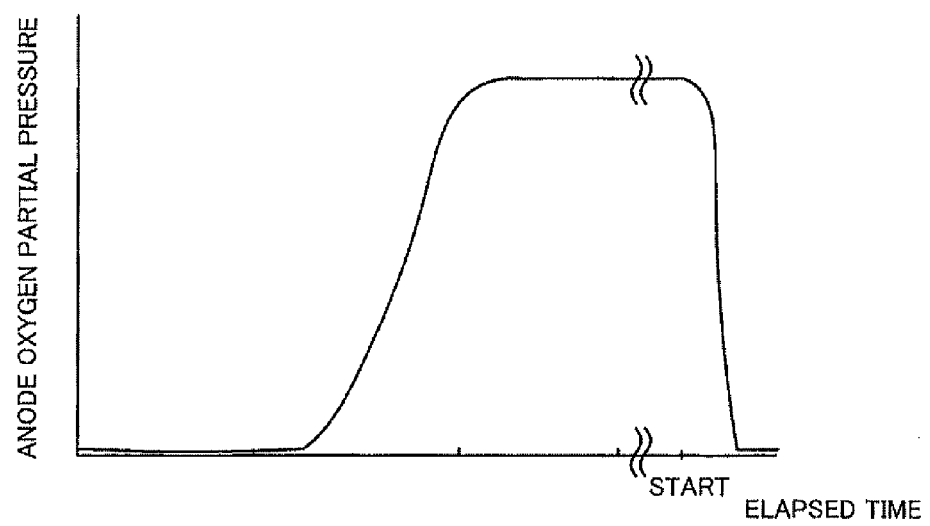
FIG. 10 is an explanatory graphical representation of a relation of the anode oxygen partial pressure to the time elapsed since a stoppage of power generation.

FIG. 10 is an explanatory graphical representation of a relation of the anode oxygen partial pressure to the time elapsed since a stoppage of power generation of the fuel cell associated with termination of the gas supplies by the power generation-time gas supplier. The behavior of the anode oxygen partial pressure relative to the elapsed time shown in FIG. 10 well agrees with the behavior of the anode potential relative to the elapsed time. An anode potential rise is thus detectable by deriving the anode oxygen partial pressure.

Figure 11:
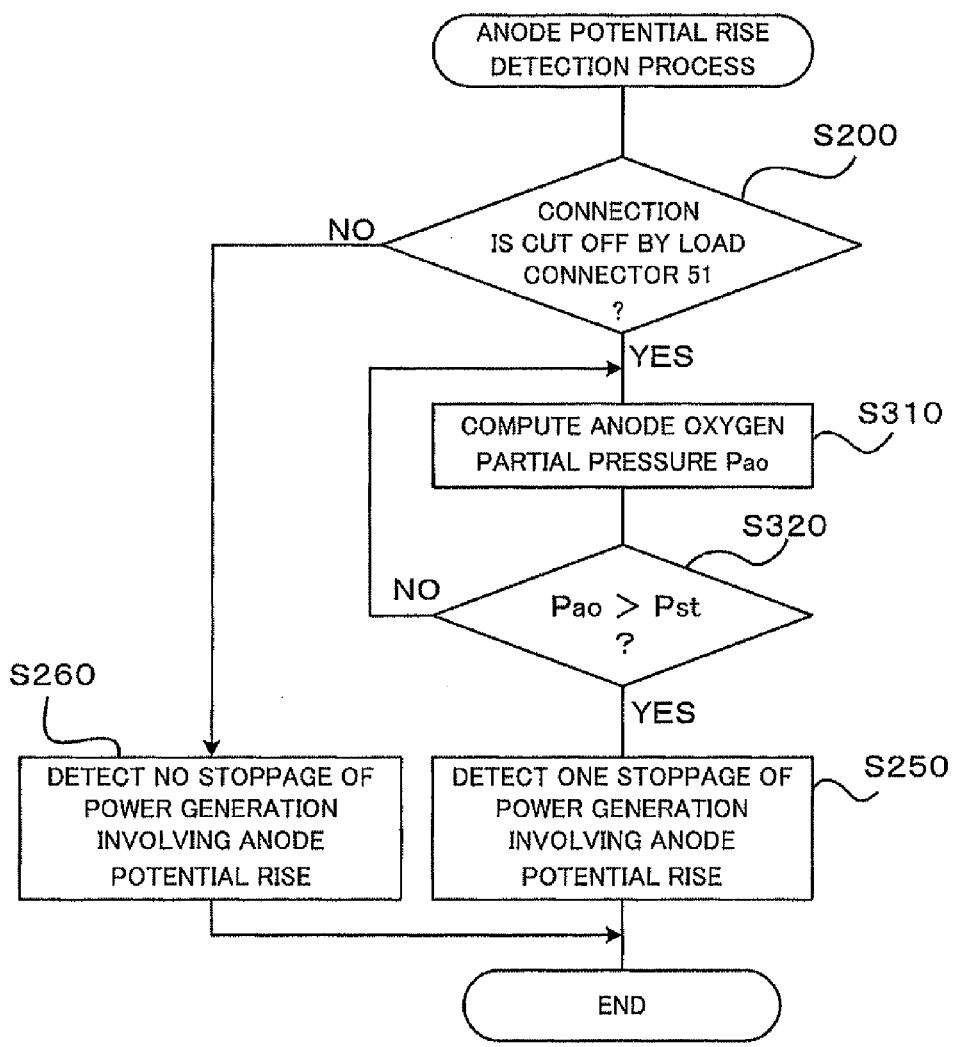
FIG. 11 is a flowchart of an anode potential rise detection routine.

FIG. 11 is a flowchart of an anode potential rise detection routine performed at step S100 by the CPU of the controller 50 in the fuel cell system 10 of the third embodiment. The like steps of FIG. 11 to those of FIG. 8 are expressed by the like step numbers and are not specifically explained here.

On activation of this routine, the CPU of the controller 50 first determines whether the connection between the fuel cell 15 and the load 57 is cut off by the load connector 51 (step S200). On determination at step S200 that the connection is cut off by the load connector 51, the CPU of the controller 50 derives an anode oxygen partial pressure Pao (step S310). More specifically, the CPU of the controller 50 obtains the oxygen concentration in the inner-cell fuel gas flow path and the total gas pressure in the inner-cell fuel gas flow path respectively from the oxygen concentration sensor and the pressure sensor and computes the anode oxygen partial pressure Pao as the oxygen partial pressure in the inner-cell fuel gas flow path from the observed oxygen concentration and the observed total gas pressure.

After the computation of the anode oxygen partial pressure Pao, the CPU of the controller 50 determines whether the computed anode oxygen partial pressure Pao is greater than a reference oxygen partial pressure Pst (step S320). The reference oxygen partial pressure Pst is specified in advance as a value for enabling detection of a rise of the corresponding anode potential to a sufficiently high level inducing an anode morphology change and is stored in the controller 50.

On determination at step S320 that the computed anode oxygen partial pressure Pao is not greater than the reference oxygen partial pressure Pst, the CPU of the controller 50 returns the processing flow to step S310 and repeats the computation of the anode oxygen partial pressure Pao and the comparison with the reference oxygen partial pressure Pst.

On determination at step S320 that the computed anode oxygen partial pressure Pao is greater than the reference oxygen partial pressure Pst, on the other hand, the CPU of the controller 50 detects one stoppage of power generation involving an anode potential rise (step S250) and terminates this routine.

The oxygen concentration is not uniform but is varied in the inner-cell fuel gas flow path of each unit cell. For example, the oxygen concentration has an increase at an earlier timing in an area closer in position to the oxidizing gas exhaust manifold. Strictly speaking, there is accordingly a potential gradient in the anode plane. Among the individual unit cells of the fuel cell 15, a unit cell located closer to an end on the side of the air exhaust passage 34 has an increase of the oxygen concentration in the inner-cell fuel gas flow path at an earlier timing. The oxygen concentration sensor may thus be located at a middle position in the inner-cell fuel gas flow path in a middle unit cell located in the middle of the fuel cell 15 to obtain an overall mean of the anode oxygen concentration in the fuel cell 15. A mean oxygen partial pressure is then computable from this mean anode oxygen concentration thus obtained. The anode potential rise information representing one stoppage of power generation of the fuel cell involving an anode potential rise can thus be acquired at an overall mean timing of the fuel cell 15.

A position close to the oxidizing gas exhaust manifold in the inner-cell fuel gas flow path of an end unit cell closest to the connection with the air exhaust passage 34 is accordingly expected to have an increase of the oxygen concentration at an earliest timing among all the inner-cell fuel gas flow paths of the fuel cell 15. The oxygen concentration sensor may be located at this position to obtain an oxygen concentration increasing at the earliest timing and thereby detect an anode potential rise at the earliest timing. The anode potential rise information can thus be acquired in relation to the position where an anode morphology change proceeds at the earliest timing in the fuel cell 15. In an application of measuring the anode oxygen concentration as an overall average of the fuel cell 15, a plurality of oxygen concentration sensors may be located in a plurality of unit cells at a plurality of different positions having different distances from the connection with the air exhaust passage 34. The anode oxygen concentration may be obtained as an average of the measurements of the respective sensors.

In the process of deriving the anode oxygen partial pressure, the anode oxygen concentration may be obtained by any suitable method of enabling direct or indirect acquisition of the anode oxygen concentration other than the above method using the oxygen concentration sensor located in the inner-cell fuel gas flow path. For example, a sensor for measuring the concentration of a non-oxygen gas present in the inner-cell fuel gas flow path may be provided to obtain the non-oxygen gas concentration. The anode oxygen concentration is then computed from the observed non-oxygen gas concentration.

D-4. Acquisition Based on Execution of Power Generation Stopping Process

A method of acquisition based on execution of a specific power generation stopping process at a stoppage of power generation of the fuel cell may be adopted as another available procedure to acquire the anode potential rise information representing one stoppage of power generation of the fuel cell involving an anode potential rise at step S100 in the routine of FIG. 6. The following sequentially describes various applications of acquiring the anode potential rise information based on the frequency of execution of the specific power generation stopping process (the fact that the specific power generation stopping process has been performed).

D-4-1. Stopping Process in Fuel Cell System 10

In the fuel cell system 10 of a fourth embodiment, in response to a command for a system shutdown, the CPU of the controller 50 performs a power generation stopping process, which includes a step of terminating the supplies of the fuel gas and the oxidizing gas by the power generation-time gas supplier and a step of cutting off the connection between the fuel cell 15 and the load 57 by the load connector 51. In the fourth embodiment, it is determined whether a series of power generation stopping process associated with a shutdown of the fuel cell system has been performed at step S100 in the routine of FIG. 6. On determination that the series of power generation stopping process has been performed, the CPU of the controller 50 determines acquisition of the anode potential rise information representing one stoppage of power generation of the fuel cell involving an anode potential rise. On determination that the series of power generation stopping process has not been performed, on the other hand, the CPU of the controller 50 determines no acquisition of the anode potential rise information.

D-4-2. Stopping Process in Fuel Cell System 110

Figure 12:
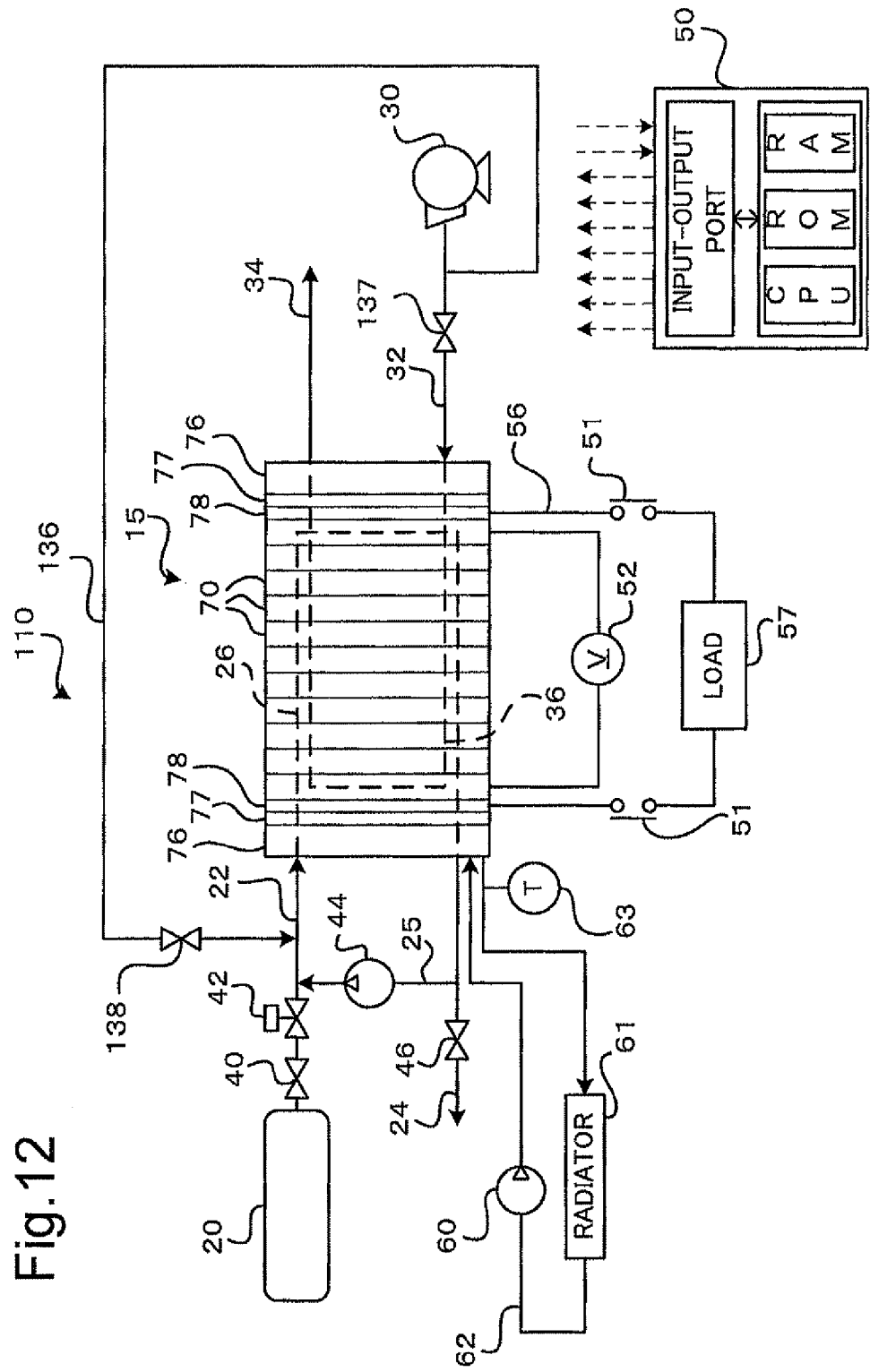
FIG. 12 is a block diagrammatic representation of the general configuration of a fuel cell system 110.

The power generation stopping process in the fuel cell system may be performed in various applications according to the configuration of the fuel cell system. FIG. 12 is a block diagrammatic representation of the general configuration of a fuel cell system 110 of a fifth embodiment, which performs a different procedure of the power generation stopping process from that performed in the fuel cell system 10. The fuel cell system 110 has the similar configuration to that of the fuel cell system 10, except a structure involved in the power generation stopping process. The like components in the fuel cell system 110 of FIG. 12 to those in the fuel cell system 10 are expressed by the like reference numerals. Only the structure involved in the power generation stopping process is described below.

The fuel cell system 110 has a purge flow path 136 arranged to connect the air supply passage 32 with the hydrogen supply passage 22. The purge flow path 136 is connected with the hydrogen supply passage 22 in the downstream of the variable regulator 42. In the fuel cell system 110, an on-off valve 137 is provided in the air supply passage 32 in the downstream of the connection with the purge flow path 136. Another on-off valve 138 is provided in the purge flow path 136. The on-off valve 137 provided in the air supply passage 32 is opened during power generation of the fuel cell 15, while being closed at the time of a system shutdown. The on-off valve 138 provided in the purge flow path 136 is closed during power generation of the fuel cell 15, while being temporarily opened at the time of a system shutdown as discussed later.

In the fuel cell system 110, in response to a command for a system shutdown, the CPU of the controller 50 performs a step of purging the anode-side flow path with the air (anode air purge), in addition to the step of terminating the gas supplies by the power generation-time gas supplier and the step of cutting off the connection by the load connector 51, as the power generation stopping process. The anode air purge step closes the on-off valve 137, while opening the on-off valve 138 and the purge valve 46 provided in the hydrogen exhaust passage 24, in the state of continuous operation of the compressor 30. The air inflow from the compressor 30 is accordingly not supplied to the cathode-side flow path but is introduced into the anode-side flow path via the purge flow path 136. In this state, since the purge valve 46 is opened, the continuous air inflow from the compressor replaces the gas in the anode-side flow path with the air. On elapse of a time period set for replacing the gas in the anode-side flow path with the air after a start of the anode air purge step, the CPU of the controller 50 stops the operation of the compressor 30 and closes the on-off valve 138 and the purge valve 46 to terminate the anode air purge step. In the anode air purge step, the compressor 30 continues its operation, but the supply of the air to the cathode-side flow path is terminated and power generation of the fuel cell 15 is stopped. The compressor 30 operated to supply the air to the anode-side flow path in the anode air purge step accordingly does not serve as the "power generation-time gas supplier configured to supply the fuel gas to the anode of the fuel cell and supply the oxidizing gas to the cathode of the fuel cell during power generation of the fuel cell".

The anode air purge performed as discussed above abruptly increases the concentration of oxygen in the inner-cell fuel gas flow path and thereby causes an anode potential rise. Both the cathode-side flow path and the anode-side flow path are filled with the air, so that both the cathode potential and the anode potential are stabilized at high potential levels. In this state, a morphology change proceeds on both the cathode and the anode until the surface of the catalyst metal is covered with an oxide layer.

In the fuel cell system 110 of the fifth embodiment, it is determined whether the series of power generation stopping process described above has been performed for a shutdown of the fuel cell system at step S100 in the routine of FIG. 6. When the above series of power generation stopping process has been performed, the CPU acquires the anode potential rise information representing one stoppage of power generation of the fuel cell involving an anode potential rise. The system shutdown accompanied with the anode air purge causes the immediate inflow of oxygen into the anode-side flow path. This immediate oxygen inflow shortens a time elapsed since a start of the power generation stopping process of the fuel cell and until the progress of an anode morphology change induced by one stoppage of power generation of the fuel cell. The anode air purge significantly shortens a time period when an internal cell is generated by the coexistence of hydrogen and oxygen on the anode, and thus prevents an extreme increase of the cathode potential at the time of a system shutdown.

D-4-3. Stopping Process in Fuel Cell System 110

Figure 13:
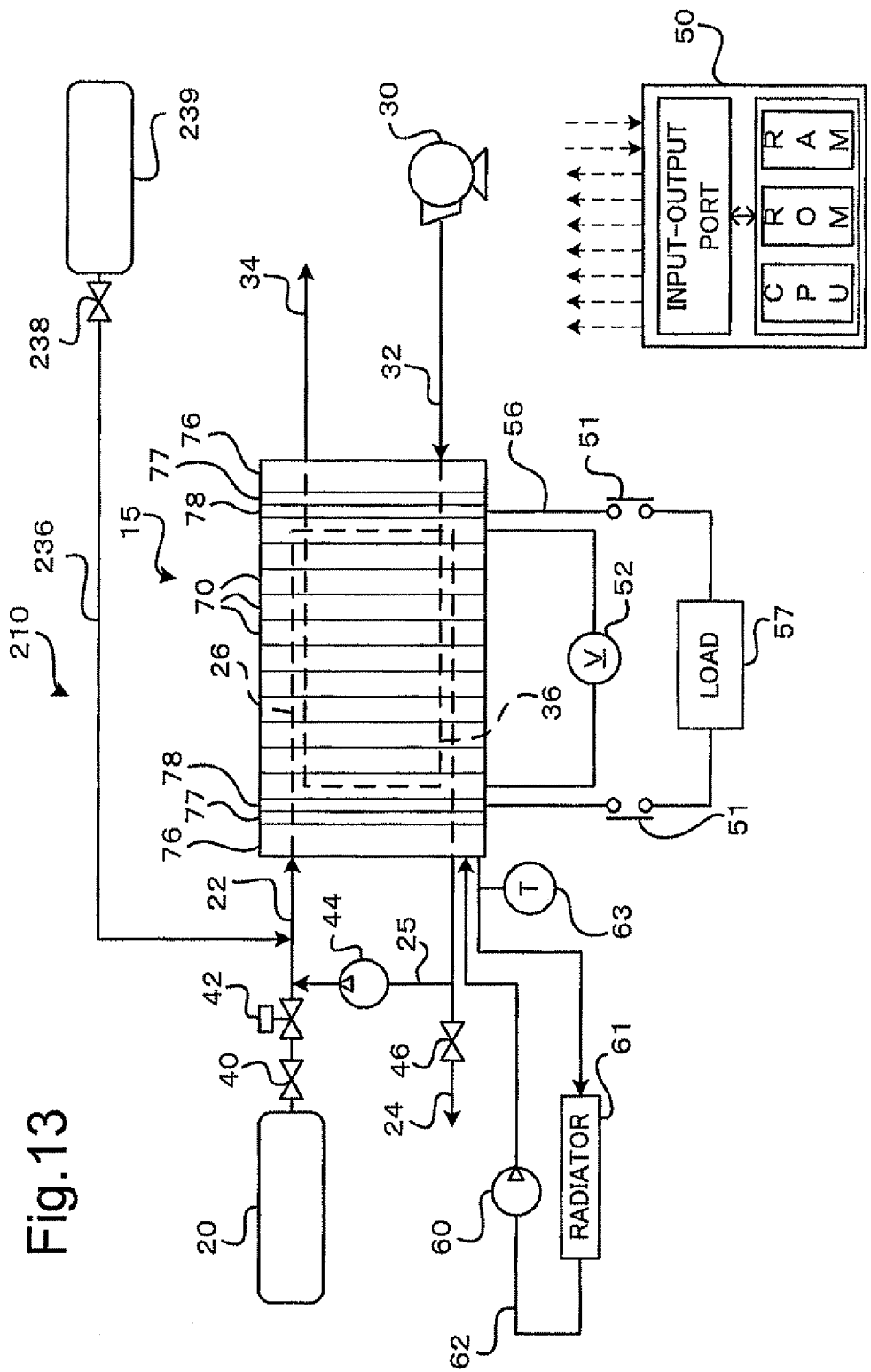
FIG. 13 is a block diagrammatic representation of the general configuration of a fuel cell system 210.

FIG. 13 is a block diagrammatic representation of the general configuration of a fuel cell system 210 of a sixth embodiment, which performs a different procedure of the power generation stopping process from those performed in the fuel cell systems 10 and 110. The fuel cell system 210 has the similar configuration to that of the fuel cell system 10, except a structure involved in the power generation stopping process. The like components in the fuel cell system 210 of FIG. 13 to those in the fuel cell system 10 are expressed by the like reference numerals. Only the structure involved in the power generation stopping process is described below.

The fuel cell system 210 includes a nitrogen tank 239 and a purge flow path 236 arranged to connect the nitrogen tank 239 with the hydrogen supply passage 22. The purge flow path 236 is connected with the hydrogen supply passage 22 in the downstream of the variable regulator 42. An on-off valve 238 is provided in the purge flow path 236 at a position close to the connection with the nitrogen tank 239. The on-off valve 238 is closed during power generation of the fuel cell 15, while being temporarily opened at the time of a system shutdown.

In the fuel cell system 210, in response to a command for a system shutdown, the CPU of the controller 50 performs a step of purging the anode-side flow path with nitrogen gas (anode nitrogen purge), in addition to the step of terminating the gas supplies by the power generation-time gas supplier and the step of cutting off the connection by the load connector 51, as the power generation stopping process. The anode nitrogen purge step opens the on-off valve 238 and the purge valve 46 to introduce the nitrogen gas from the nitrogen tank 239 to the anode-side flow path via the purge flow path 236 and replace the gas in the anode-side flow path with the nitrogen gas. On elapse of a time period set for replacing the gas in the anode-side flow path with the nitrogen gas after a start of the anode nitrogen purge step, the CPU of the controller 50 closes the on-off valve 238 and the purge valve 46 to terminate the anode nitrogen purge step.

The anode nitrogen purge performed as discussed above keeps the anode potential at an approximately 0-V level. In this state of stopped power generation, the gas moves across the electrolyte membrane between the inner-cell oxidizing gas flow path and the inner-cell fuel gas flow path according to the difference of the gas concentration. Oxygen moves from the inner-cell oxidizing gas flow path having a higher oxygen concentration to the inner-cell fuel gas flow path, while nitrogen moves from the inner-cell fuel gas flow path having a higher nitrogen concentration to the inner-cell oxidizing gas flow path. Such gas migration eventually causes both the inner-cell oxidizing gas flow path and the inner-cell fuel gas flow path to be filled with the gas of substantially the same composition (the air. The anode potential rises with an increase in oxygen concentration in the inner-cell fuel gas flow path and is stabilized at a high potential level. A morphology change proceeds on the anode until the surface of the catalyst metal is covered with an oxide layer.

In the fuel cell system 210 of the sixth embodiment, it is determined whether the series of power generation stopping process described above has been performed for a shutdown of the fuel cell system at step S100 in the anode morphology variation deriving routine of FIG. 6. When the above series of power generation stopping process has been performed, the CPU acquires the anode potential rise information representing one stoppage of power generation of the fuel cell involving an anode potential rise. The power generation stopping process accompanied with the anode nitrogen purge step also effectively prevents an extreme rise of the cathode potential at the time of a system shutdown.

Any other suitable procedure of the power generation stopping process different from those of the fourth to the sixth embodiments discussed above may be performed to eventually make the oxygen inflow into the inner-cell fuel gas flow path, at the time of a shutdown of the fuel cell system. The anode potential rise information representing one stoppage of power generation of the fuel cell involving an anode potential rise may be acquired, based on execution of the power generation stopping process that enables the eventual oxygen inflow into the inner-cell fuel gas flow path and a resulting anode potential rise.

Instead of the determination whether the series of power generation stopping process has actually been performed, one alternative application may determine whether a command for a system shutdown has been input to the controller 50 to trigger the series of power generation stopping process.

Another alternative application may determine whether the controller 50 has output a driving signal in response to input of a command for a system shutdown to trigger at least part of the series of power generation stopping process. In these modified applications, the anode potential rise information representing one stoppage of power generation of the fuel cell involving an anode potential rise may be acquired at the time of input of a command for a system shutdown or at the time of output of a driving signal from the controller 50 to trigger at least part of the series of power generation stopping process.

The fuel cell systems of the first through the sixth embodiments acquire the anode potential rise information. Any of these fuel cell systems can thus detect an anode potential rise involved in a stoppage of power generation of the fuel cell without requiring direct measurement of the anode potential. Any suitable measurement or detection, for example, measurement of a variation of the fuel cell voltage, measurement of a time elapsed since a start of the series of power generation stopping process, measurement of the hydrogen concentration on the anode, or detection of the execution of the series of power generation stopping process at the time of a system shutdown, may enable detection of an anode potential rise involved in a stoppage of power generation of the fuel cell without requiring direct measurement of the anode potential. Measurement or detection of any value or factor that has some correlation to an anode potential rise and is more readily and more simply measurable or detectable than the anode potential can be used to estimate an anode potential rise.

The fuel cell systems of the first through the sixth embodiments derive the anode morphology variation based on the anode potential rise detected as described above. Any of these fuel cell systems can thus easily obtain the anode morphology variation by a simple procedure without requiring direct measurement of the anode morphology variation. The anode morphology variation is derived according to the relation to the number of stoppages of power generation involving an anode potential rise. The current anode morphology variation can thus be derived simultaneously with a series of operations for a system shutdown. This arrangement requires neither any special measurement device as in the case of measuring the electrode catalyst surface area based on the cyclic voltammetry characteristic nor any special opportunity for measuring the electrode catalyst surface area. Derivation of the anode morphology variation based on the anode potential rise information is performed in the course of the processing for a system shutdown on the occasion of every system shutdown involving an anode morphology change. This enables the latest anode morphology variation to be derived continuously.

E. Acquisition of Anode Potential Rise Information During System Operation

The above embodiments describe the series of processing to acquire the anode potential rise information in the course of a stoppage of power generation of the fuel cell at the time of a system shutdown. There may also be an anode potential rise in the course of a stoppage of power generation of the fuel cell during operation of the fuel cell system. A configuration for acquiring the anode potential rise information at the time of a stoppage of power generation during system operation is discussed below as a seventh embodiment.

Figure 14:
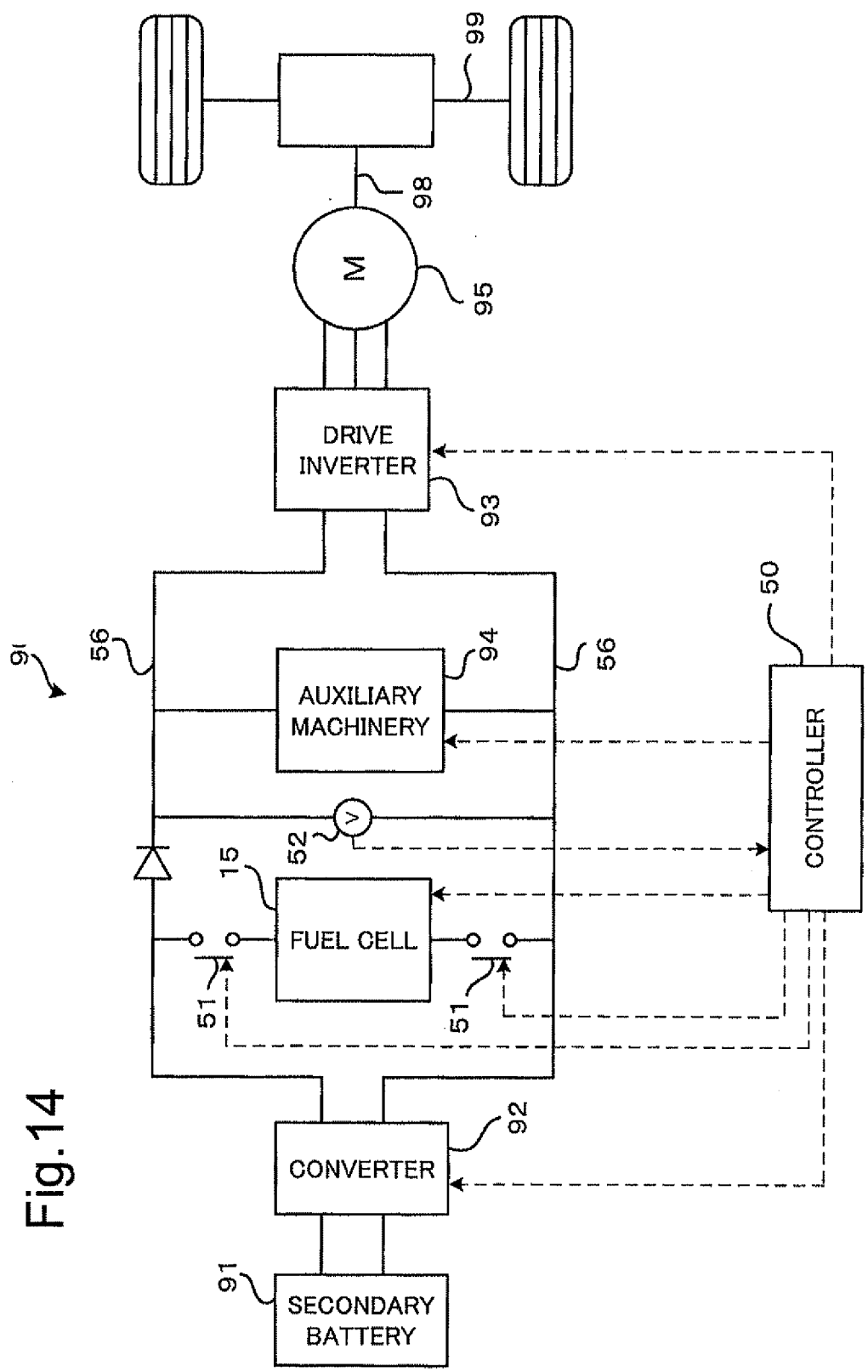
FIG. 14 is a block diagrammatic representation of the general configuration of an electric vehicle 90.

FIG. 14 is a block diagrammatic representation of the general configuration of an electric vehicle 90 of the seventh embodiment equipped with the fuel cell system 10. The electric vehicle 90 may be equipped with the fuel cell system 110 of the fifth embodiment or the fuel cell system 210 of the sixth embodiment, in place of the fuel cell system 10.

The electric vehicle 90 has the fuel cell 15 and a secondary battery 91 as driving power sources. The components of the fuel cell system 10 other than the fuel cell 15 are omitted from the illustration of FIG. 14. The electric vehicle 90 has auxiliary machinery 94 and a drive inverter 93 connected with a drive motor 95 as loads receiving supplies of electric power from the fuel cell 15 and the secondary battery 91. The power output to an output shaft 98 of the drive motor 95 is transmitted to a vehicle driveshaft 99. The auxiliary machinery 94 include fuel cell-related auxiliary machinery, such as the compressor 30, the hydrogen circulation pump 44, and the coolant circulation pump 60, as well as vehicle-related auxiliary machinery, such as air-conditioning equipment (air conditioner). The fuel cell 15 and the secondary battery 91 are connected in parallel with the respective loads via wiring 56. The wiring 56 has the load connector 51 to enable and cut off the connection with the fuel cell 15. The secondary battery 91 is connected with the wiring 56 via a DC-DC converter 92. In the configuration of this embodiment, the controller 50 sets a target voltage value on the output side of the DC-DC converter 92, so as to regulate the voltage of the wiring 56 and control the power generation capacity of the fuel cell 15 and the charge-discharge condition of the secondary battery 91. The DC-DC converter 92 serves as a switch to enable and cut off the connection between the secondary battery 91 and the wiring 56. In the state of the secondary battery 91 that requires neither charging nor discharging, the DC-DC converter 92 cuts off the connection between the secondary battery 91 and the wiring 56.

The above configuration of the electric vehicle 90 enables the electric power to be supplied to the loads from at least one of the fuel cell 15 and the secondary battery 91 and enables the secondary battery 91 to be charged by the fuel cell 15. During braking of the electric vehicle 90, the drive motor 95 works as a generator to charge the secondary battery 91. In the configuration of FIG. 14, the respective parts of the electric vehicle 90 are controlled by the controller 50. A controller involved in the controls of the fuel cell system 10 and a controller involved in the controls of the respective parts of the electric vehicle 90 may be provided integrally or separately.

The electric vehicle 90 has three different operating statuses, i.e., "power generation drive mode", "intermittent drive mode", and "regenerative drive mode". The "power generation drive mode" causes at least part of electric power corresponding to a load demand to be supplied from the fuel cell 15, so as to attain a desired driving condition. The "regenerative drive mode" operates the drive motor 95 as a generator during braking of the electric vehicle 90, so as to charge the secondary battery 91. The "intermittent drive mode" is adopted on the occasion that the supply of electric power from the fuel cell 15 lowers the energy efficiency of the fuel cell system 10 to an undesirably low level. The "intermittent drive mode" stops power generation of the fuel cell 15 and causes required electric power to be supplied from the secondary battery 91.

Figure 15:
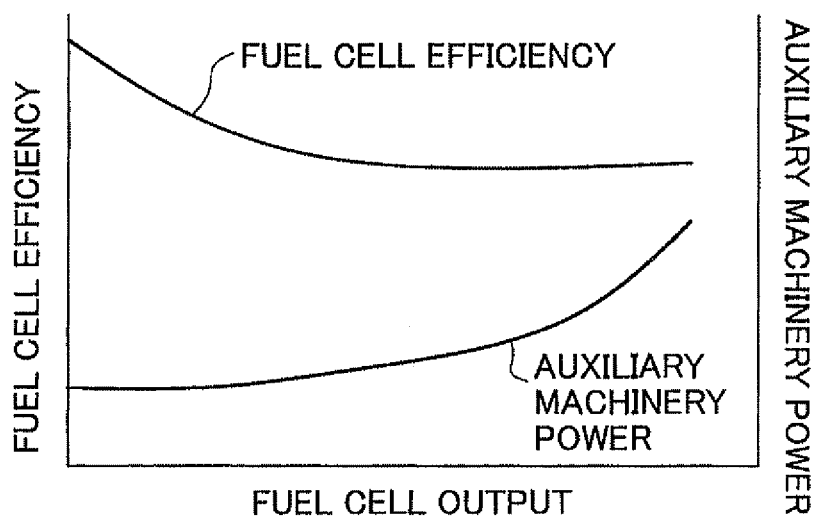
FIG. 15 is an explanatory graphical representation of relations of the energy efficiency of the fuel cell and the power required for the fuel cell-related auxiliary machinery.
Figure 16:
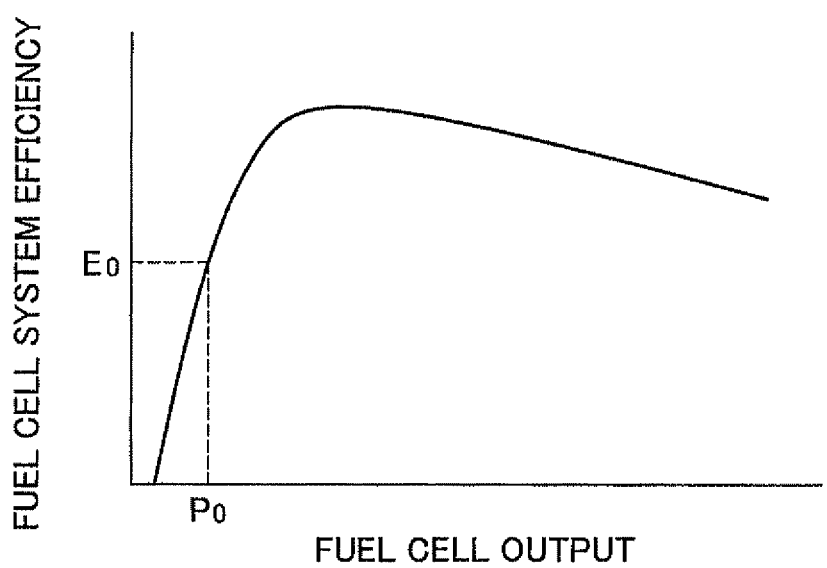
FIG. 16 is an explanatory graphical representation of a relation of the efficiency of the fuel cell system to the output of the fuel cell.

The "intermittent drive mode" is described below in detail. FIG. 15 is an explanatory graphical representation of relations of the energy efficiency of the fuel cell 15 and the power required for the fuel cell-related auxiliary machinery to the output of the fuel cell 15. FIG. 16 is an explanatory graphical representation of a relation of the overall efficiency of the fuel cell system 10 to the output of the fuel cell 15. As shown in FIG. 15, the energy efficiency of the fuel cell 15 gradually lowers with an increase in output of the fuel cell 15. The auxiliary machinery power, i.e., the amount of energy consumed for driving the fuel cell-related auxiliary machinery, increases with an increase in output of the fuel cell 15. In the electric vehicle 90, the amount of electric power consumed by the fuel cell-related auxiliary machinery is extremely smaller than the amount of electric power consumed by the drive motor 95. In the condition of the low output of the fuel cell 15, however, there is a relatively large ratio of the amount of electric power consumed by the fuel cell-related auxiliary machinery to the amount of electric power generated by the fuel cell 15. The overall energy efficiency of the fuel cell system 10 (fuel cell system efficiency) is computed from the fuel cell energy efficiency and the auxiliary machinery power shown in FIG. 15. The fuel cell system efficiency reaches a peak at a certain output level of the fuel cell 15 as shown in FIG. 16. The low output of the fuel cell 15 gives a low level of the fuel cell system efficiency. In the electric vehicle 90 of the embodiment, in a low loading condition with the poor fuel cell system efficiency (in the condition that the output of the fuel cell 15 is lower than a value $P_0$ and gives a lower level of the fuel cell system efficiency than a value $E_0$ shown in FIG. 16), the "intermittent drive mode" of stopping the operation of the fuel cell 15 and using the secondary battery 91 for the power supply is adopted to prevent a decrease of the fuel cell system efficiency.

The fuel cell 15 stops power generation in the "intermittent drive mode" and in the "regenerative drive mode" as explained above. In the "intermittent drive mode", there is also termination of the supplies of the fuel gas and the oxidizing gas by the power generation-time gas supplier. Even during operation of the fuel cell system 10, in the "intermittent drive mode", there may be an anode potential rise, as in the time of a system shutdown. In this embodiment, in the "intermittent drive mode" during operation of the fuel cell system 10, the series of processing is performed to acquire the anode potential rise information, as in the time of a system shutdown described above. In the "regenerative drive mode", on the occasion of terminating the supplies of the fuel gas and the oxidizing gas by the power generation-time gas supplier, the series of processing may be performed to acquire the anode potential rise information.

As discussed previously, after activation of the fuel cell system 10, the anode morphology variation deriving routine of FIG. 6 is continuously performed until a system shutdown. The CPU of the controller 50 performs any of the anode potential rise detection processes described above at step S100 to acquire the anode potential rise information, on the occasion of a stoppage of power generation of the fuel cell during operation of the fuel cell system. For example, the anode potential rise detection process of FIG. 8 may be performed to acquire the anode potential rise information based on the fuel cell voltage. Alternatively the anode potential rise information may be acquired based on the time elapsed since a stoppage of power generation of the fuel cell 15 or may be acquired based on the gas concentration on the anode as shown in FIG. 11.

On determination of acquisition of the anode potential rise information representing one stoppage of power generation of the fuel cell involving an anode potential rise at step S100, the CPU of the controller 50 derives and stores an anode morphology variation at step S110 even during operation of the fuel cell system, as in the time of a system shutdown. A concrete procedure derives and stores an anode morphology variation induced by a current stoppage of power generation involving an anode potential rise, with the temperature-based correction if necessary, according to the map stored with the latest anode morphology variation (anode catalyst surface area) and the integration number of stoppages of power generation. The procedure also updates the integration number of stoppages of power generation and stores the updated integration number. When the anode morphology variation is subjected to the temperature-based correction, the integration number of stoppages of power generation is updated with correction based on the corrected anode morphology variation.

In the case of derivation and storage of the anode morphology variation at step S110 during operation of the fuel cell system, the CPU of the controller 50 determines that the current stoppage of power generation is not ascribed to a system shutdown at step S120 and returns the processing flow to step S100.

During operation of the fuel cell system, the acquisition of the anode potential rise information may be determined at step S100, based on the execution of the series of power generation stopping process associated with adoption of the "intermittent drive mode". In the "intermittent drive mode", however, there may be no anode potential rise, because of a short power generation stop time. It is thus desirable to adopt the acquisition method that enables confirmation of an eventual anode potential rise, for example, the acquisition method based on the fuel cell voltage, the acquisition method based on the elapsed time, or the acquisition method based on the gas concentration on the anode.

Even once the fuel cell 15 stops power generation during operation of the fuel cell system, the fuel cell 15 may restart power generation before acquisition of the anode potential rise information at step S100. In such a case, for example, when the connection is enabled by the load connector 51 in the course of processing of steps S200 to S240 in the routine of FIG. 8, the CPU of the controller 50 may perform interrupt processing to detect no stoppage of power generation involving an anode potential rise. Namely the CPU determines no acquisition of the anode potential rise information at step S100 and repeats the decision step S100.

As described above, the procedure may detect one stoppage of power generation involving an anode potential rise and derive an anode morphology variation, not only at the time of a shutdown of the fuel cell system but on the occasion of every stoppage of power generation of the fuel cell associated with the inflow of oxygen into the anode-side flow path. This arrangement effectively enhances the accuracy of derivation of the anode morphology variation.

The acquisition method of the anode potential rise information associated with a stoppage of power generation during operation of the fuel cell system is not restricted to the application of the fuel cell system as the driving power source of the electric vehicle. The acquisition method of the anode potential rise information during operation of the fuel cell system may be adopted in any application of the fuel cell system that has an operation mode of stopping power generation of the fuel cell without a shutdown of the fuel cell system.

F. Acquisition of Anode Potential Rise Information in Consideration of Restart of Power Generation in Progress of Morphology Change of Anode Catalyst Even once the fuel cell stops power generation at the time of a shutdown of the fuel cell system or during operation of the fuel cell system, the fuel cell may restart power generation in progress of an anode morphology change associated with an anode potential rise. For example, a command for a system restart may be given shortly after input of a command for a system shutdown into the fuel cell system. In another example, the operation status may be changed to the 'power generation drive mode" in response to an increase in load demand shortly after a start of the "intermittent drive mode" during the system operation. In such cases, there is no progress of an anode morphology change corresponding to one stoppage of power generation. A series of processing to acquire the anode potential rise information in consideration of a possible restart of power generation of the fuel cell in progress of an anode morphology change associated with a stoppage of power generation of the fuel cell is discussed below as an eighth embodiment. The following describes the series of processing to acquire the anode potential rise information based on the time elapsed since a stoppage of power generation of the fuel cell 15 in the fuel cell system 10. The similar series of processing may be performed in the fuel cell system having another configuration, for example, the fuel cell system 110 or the fuel cell system 210.

Figure 17:
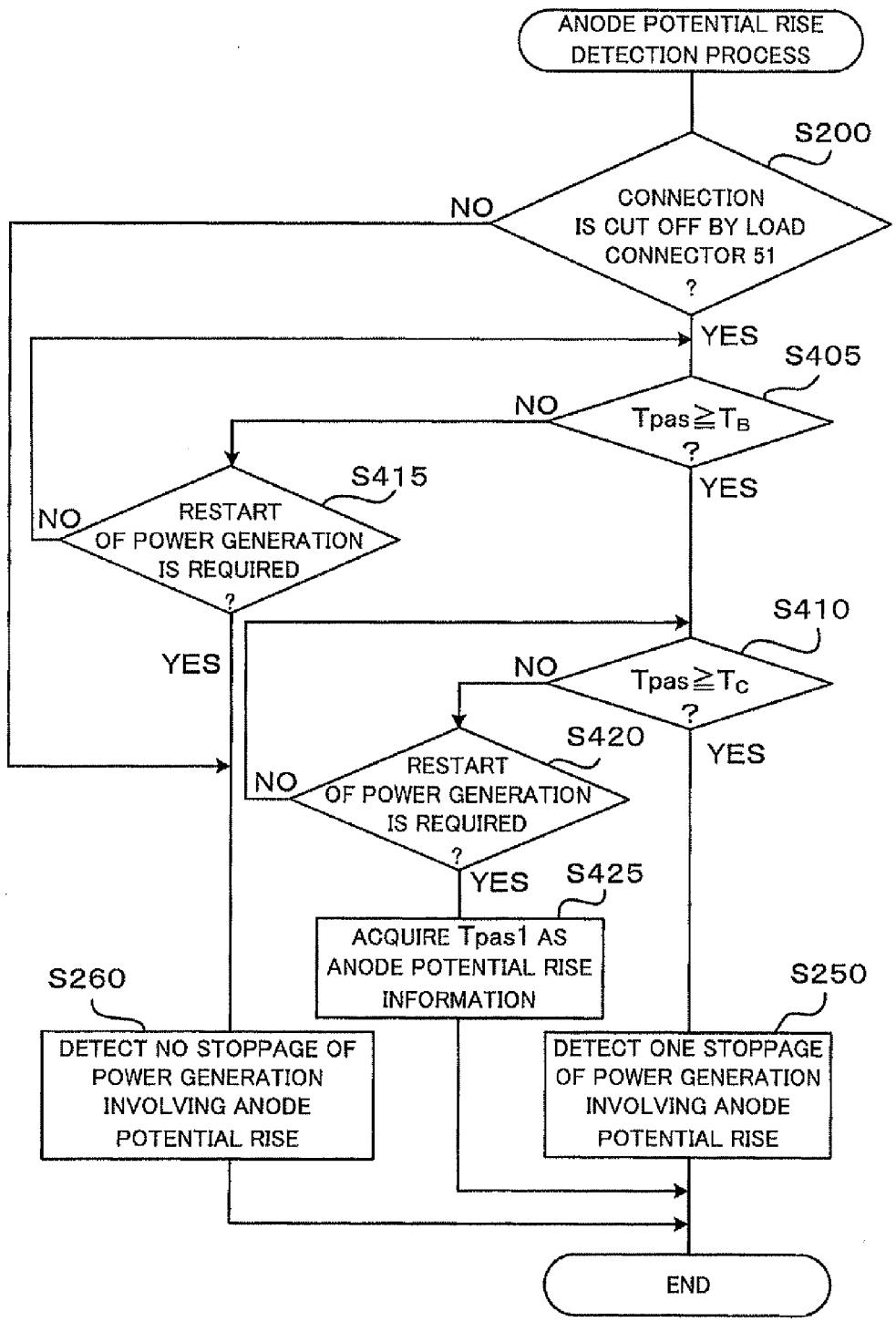
FIG. 17 is a flowchart of an anode potential rise detection routine.

FIG. 17 is a flowchart of an anode potential rise detection routine performed by the CPU of the controller 50 in the fuel cell system 10, in place of the processing routine of FIG. 8, at step S100 in the routine of FIG. 6. The like steps of FIG. 17 to those of FIG. 8 are expressed by the like step numbers and are not specifically explained here.

On activation of this routine, the CPU of the controller 50 first determines whether the connection between the fuel cell 15 and the load 57 is cut off by the load connector 51 (step S200). The cutoff of the connection by the load connector 51 may be the operation performed at the time of a system shutdown or the operation performed at a stoppage of power generation of the fuel cell during the system operation. On determination at step S200 that the connection is cut off by the load connector 51, the CPU of the controller 50 obtains an elapsed time Tpas since a stoppage of power generation of the fuel cell 15 and determines whether the elapsed time Tpas has reached a first reference elapsed time $T_B$ (step S405). The time period required for the beginning of stabilization of the rising anode potential is set as the first reference elapsed time $T_B$ as explained previously. At step S405, the first reference elapsed time $T_B$ is used as a criterion time to detect a start of an anode morphology change.

On determination at step S405 that the elapsed time Tpas has reached or exceeded the first reference elapsed time $T_B$, the CPU of the controller 50 obtains the elapsed time Tpas again and determines whether the elapsed time Tpas has reached a second reference elapsed time $T_C$ (step S410). The time period required for completion of an anode morphology change induced by one stoppage of power generation is set as the second reference elapsed time $T_C$ as explained previously.

The determination of step S410 that the elapsed time Tpas has reached or exceeded the second reference elapsed time $T_C$ leads to the determination that an anode morphology change associated with an anode potential rise is completed without interruption by a restart of the operation of the fuel cell. On determination that the elapsed time Tpas has reached or exceeded the second reference elapsed time $T_C$, the CPU of the controller 50 accordingly detects one stoppage of power generation involving an anode potential rise (step S250) and terminates this routine. At this moment, at step S100 in the anode morphology variation deriving routine of FIG. 6, the CPU of the controller 50 determines acquisition of the anode potential rise information representing one stoppage of power generation of the fuel cell involving an anode potential rise. In this case, at step S110 in the routine of FIG. 6, the CPU derives and stores an anode morphology variation induced by a current stoppage of power generation involving an anode potential rise, with the temperature-based correction if necessary, according to the map stored with the latest anode morphology variation (anode catalyst surface area) and the integration number of stoppages of power generation, as explained previously.

On determination at step S410 that the elapsed time Tpas has not yet reached the second reference elapsed time $T_C$, on the contrary, the CPU of the controller 50 identifies the requirement or non-requirement for a restart of power generation of the fuel cell 15 (step S420). For example, when the cutoff of the connection by the load connector 51 at step S200 is associated with a system shutdown, the CPU of the controller 50 performs the requirement identification of step S420, based on input or no input of a command for a system restart. The requirement for a restart of power generation is identified, in response to input of the command for a system restart. When the cutoff of the connection by the load connector 51 at step S200 occurs during the system operation, on the other hand, the CPU of the controller 50 performs the requirement identification of step S420, based on switchover control or no switchover control of the operation status from, e.g., the "intermittent drive mode" to the "power generation drive mode". The requirement for a restart of power generation is identified, in response to switchover control of the operation status.

On identification of the requirement for a restart of power generation of the fuel cell 15 at step S420, the CPU of the controller 50 obtains an elapsed time Tpas1 when the requirement for a restart of power generation is identified, as the anode potential rise information (step S425) and terminates this routine. After the identification of the requirement for a restart of power generation at the elapsed time Tpas1, a series of power generation restarting process is performed for the fuel cell 15 to resume the supplies of the fuel gas and the oxidizing gas by the power generation-time gas supplier.

After acquisition of the elapsed time Tpas1 when the requirement for a restart of power generation is identified, between the first reference elapsed time $T_B$ and the second reference elapsed time $T_C$ as the anode potential rise information at step S425, the CPU of the controller 50 derives an anode morphology variation involved in a current stoppage of power generation (reduction of the anode catalyst surface area), based on the elapsed time Tpas1 at step S110 in the routine of FIG. 6. The CPU subsequently adds the derived anode morphology variation involved in the current stoppage of power generation to the stored latest anode morphology variation, so as to update and store the integration value of the anode morphology variation.

Figure 18:
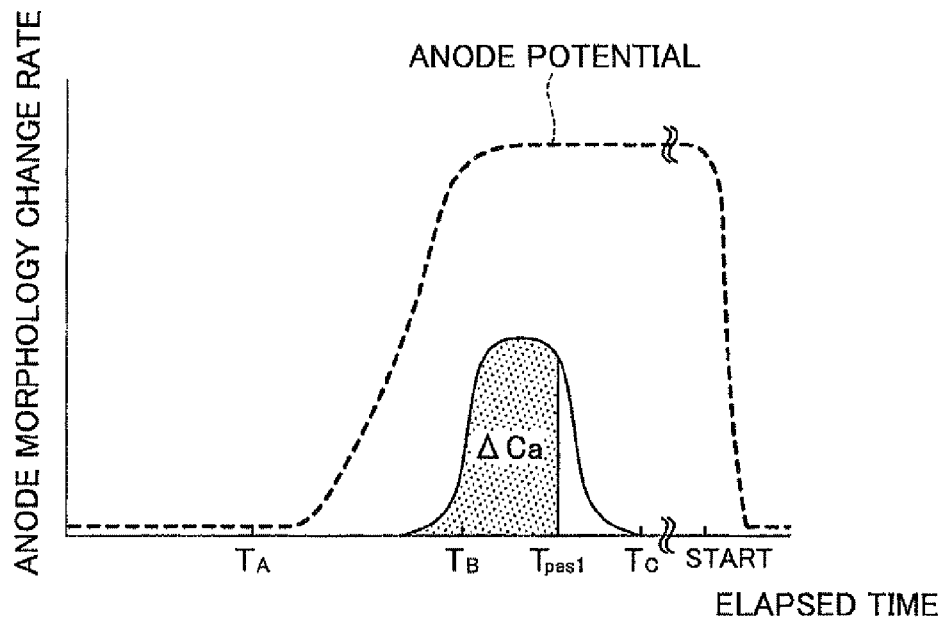
FIG. 18 is an explanatory graphical representation of a relation of the rate of an anode morphology change to the elapsed time.

The following describes derivation of the anode morphology variation based on the elapsed time Tpas1. FIG. 18 is an explanatory graphical representation of a relation of the rate of an anode morphology change to the time elapsed since a stoppage of power generation. A variation of the anode potential against the elapsed time is shown together with a variation of the rate of the anode morphology change against the elapsed time in the graph of FIG. 18. As shown in FIG. 18, the rate of the anode morphology change gradually increases from 0 with an anode potential rise. The rate of the anode morphology change reaches a peak after the elapsed time $T_B$ when the rising anode potential begins stabilizing, and then decreases to about 0 at the elapsed time $T_C$ when the surface of the anode catalyst metal is covered with an oxide layer. The relation of the rate of the anode morphology change to the time elapsed since a stoppage of power generation is specifiable in advance for each fuel cell. An anode morphology variation ΔCa involved in a current stoppage of power generation (i.e., a reduction of the anode catalyst surface area) can thus be derived by time integration of the rate of the anode morphology change to the elapsed time Tpas1. In the graph of FIG. 18, a hatched area represents the reduction of the anode catalyst surface area ΔCa caused by the progress of the anode morphology change until the elapsed time Tpas1.

The relation of the rate of the anode morphology change to the time elapsed since a stoppage of power generation is also affected by the fuel cell temperature at the time of the stoppage of power generation. The controller 50 accordingly stores a map for deriving the anode morphology variation ΔCa until the elapsed time Tpas1 with the time elapsed since a stoppage of power generation and the fuel cell temperature at the time of the stoppage of power generation as parameters. At step S110 in the routine of FIG. 6, the CPU refers to this stored map and derives the anode morphology variation ΔCa corresponding to the elapsed time Tpas1 obtained at step S425 and the fuel cell temperature at the time of the stoppage of power generation.

Figure 19:
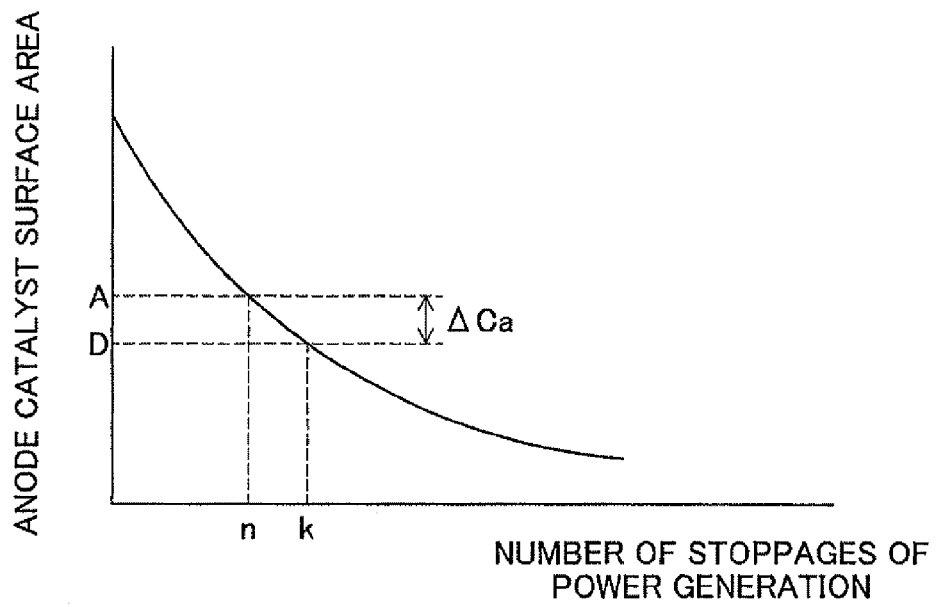
FIG. 19 is an explanatory graphical representation of a relation of the anode catalyst surface area to the number of stoppages of power generation of the fuel cell.

FIG. 19 is an explanatory graphical representation of a relation of the degree of a morphology change of the anode catalyst (anode catalyst surface area) to the number of stoppages of power generation of the fuel cell involving an anode potential rise. Like the map of FIG. 7, in the map of FIG. 19, "n" times of stoppages of power generation gives a value "A" of the anode catalyst surface area, and "k" times of stoppages of power generation corresponds to a value "D" of the anode catalyst surface area, which is decremented from the value A by the reduction of the anode catalyst surface area ΔCa. At step S110, the CPU accordingly derives and stores the value "D" of the anode catalyst surface area and updates the storage of the number of stoppages of power generation as "k" times, instead of "n+1" times.

On identification of the non-requirement for a restart of power generation of the fuel cell 15 at step S420, the CPU of the controller 50 returns the processing flow to step S410 to repeat the acquisition of the elapsed time Tpas and the determination of whether the elapsed time Tpas has reached the second reference elapsed time $T_C$.

On determination at step S405 that the elapsed time Tpas has not yet reached the first reference elapsed time $T_B$, the CPU of the controller 50 identifies the requirement or non-requirement for a restart of power generation of the fuel cell 15 (step S415). The identification of step S415 is identical with the identification of step S420 described above.

On identification of the requirement for a restart of power generation of the fuel cell 15 at step S415, the CPU of the controller 50 detects no stoppage of power generation involving an anode potential rise (step S260) and terminates this routine. At this moment, at step S100 in the anode morphology variation deriving routine of FIG. 6, the CPU of the controller 50 determines no acquisition of the anode potential rise information.

On identification of the non-requirement for a restart of power generation of the fuel cell 15 at step S415, on the other hand, the CPU of the controller 50 returns the processing flow to step S405 to repeat the acquisition of the elapsed time Tpas and the determination of whether the elapsed time Tpas has reached the first reference elapsed time T.

When it is determined at step S200 that the connection is not cut off but is enabled by the load connector 51, the CPU of the controller 50 detects no stoppage of power generation involving an anode potential rise (step S260) and terminates this routine.

In the configuration of this embodiment, when the elapsed time Tpas has reached the second reference elapsed time $T_C$, the processing routine acquires the anode potential rise information representing one stoppage of power generation involving an anode potential rise and derives an anode morphology variation (anode catalyst surface area) after a stoppage of power generation corresponding to the number of stoppages of power generation. On identification of the requirement for a restart of power generation at the elapsed time Tpas between the first reference elapsed time $T_B$ and the second reference elapsed time $T_C$, the processing routine obtains the elapsed time Tpas1 when the requirement for a restart of power generation is identified, as the anode potential rise information, and derives the reduction of the anode catalyst surface area induced by a current stoppage of power generation based on the elapsed time Tpas1, so as to determine the anode catalyst surface area after the current stoppage of power generation. This arrangement effectively enhances the accuracy of derivation of the anode morphology variation, compared with a method of deriving the anode morphology variation corresponding to only the number of stoppages of power generation.

In the above description, the elapsed time $T_B$ until the beginning of stabilization of the rising anode potential is set to the first reference elapsed time used as the criterion time to detect a start of an anode morphology change. Such setting is, however, neither essential nor restrictive. As one alternative, a time period required for a reach of the rising fuel cell voltage to its maximal voltage level after a drop may be set as the first reference elapsed time. As another alternative, an elapsed time that is shorter than the elapsed time $T_B$ and is more proximate to an actual start timing of an anode morphology change (i.e., an elapsed time when a start of an anode morphology change, such as elution of the anode catalyst or a start of the reduction of the anode catalyst surface area, is experimentally detected) may be set as the first reference elapsed time.

In the above description, the degree of an anode morphology change (e.g., start or completion) is detected, based on the elapsed time Tpas since the time of a stoppage of power generation of the fuel cell as the commencement. Such setting is, however, neither essential nor restrictive. The environmental condition at the time of a stoppage of power generation or another factor may cause some error in the time period required for the inflow of oxygen into the inner-cell fuel gas flow path via the inner-cell oxidizing gas flow path and the electrolyte membrane after the stoppage of power generation of the fuel cell. The degree of an anode morphology change may thus be detected, based on a time period elapsed since the elapsed time $T_A$ when the fuel cell voltage takes an upward turn after a drop, instead of the elapsed time Tpas since a stoppage of power generation of the fuel cell. Such detection may be based on any other suitable elapsed time that enables detection of the progress of an anode morphology change with an anode potential rise and derivation of the degree of the ongoing anode morphology, change. The reduction of the anode catalyst surface area induced by a current stoppage of power generation may be derived corresponding to the fuel cell voltage. The variation pattern of the fuel cell voltage that drops after a stoppage of power generation, rises, and drops again has a fixed correlation to the reduction of the anode catalyst surface area. The degree of an anode morphology change (start, completion, or progress) is thus detectable, based on the fuel cell voltage.

G. Derivation of Anode Catalyst Morphology Variation in Consideration of Negative Voltage History During Power Generation The above embodiments describe the series of processing to acquire the anode potential rise information at the time of a stoppage of power generation of the fuel cell. There may also be an anode morphology change during power generation of the fuel cell. A configuration for deriving an anode morphology variation in consideration of an anode potential rise possibly occurring during power generation of the fuel cell is discussed below as a ninth embodiment. The ninth embodiment describes the series of processing in the fuel cell system 10. The similar series of processing may be performed in the fuel cell system having another configuration, for example, the fuel cell system 110 or the fuel cell system 210.

Figure 20:
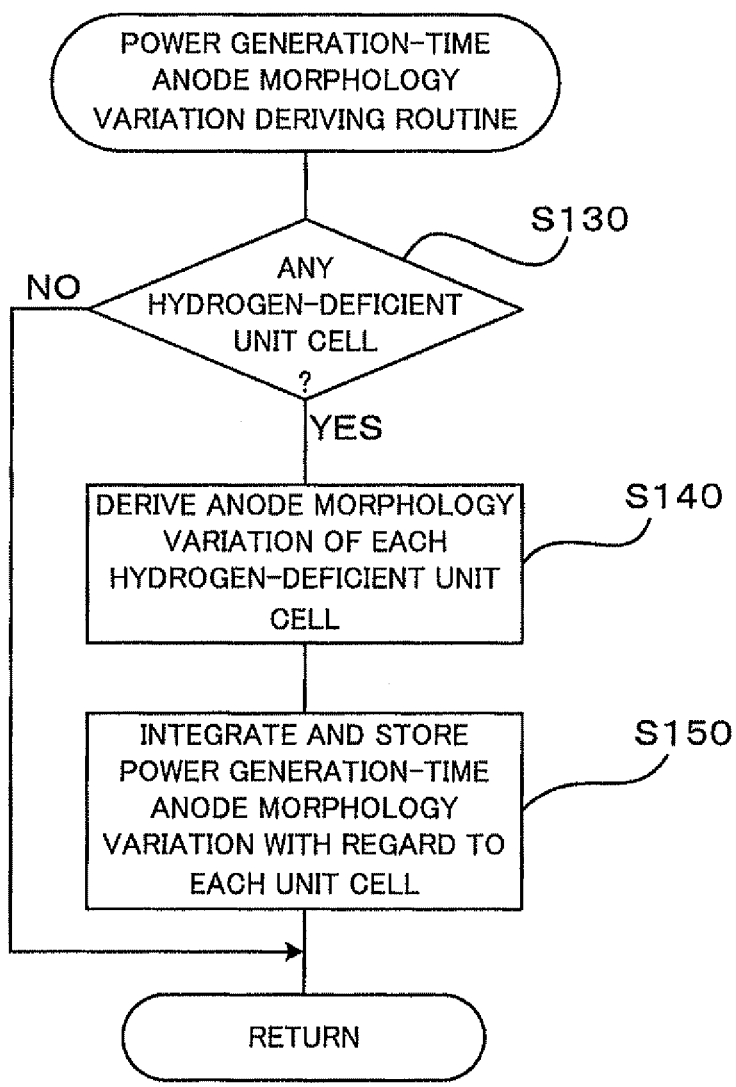
FIG. 20 is a flowchart of a power generation-time anode morphology variation deriving routine.

During power generation of the fuel cell, because of the supply of hydrogen to the anode-side flow path, the anode potential is equal to 0. Condensation of water in the inner-cell fuel gas flow path may cause a deficiency of hydrogen supplied to the anode. In a unit cell with such a deficiency of hydrogen, there is an anode morphology change with a rise of the anode potential and a drop of the fuel cell voltage to a negative voltage level. FIG. 20 is a flowchart of a power generation-time anode morphology variation deriving routine executed to derive an anode morphology variation during power generation. The CPU of the controller 50 repeatedly performs this routine, in parallel with the anode morphology variation deriving routine of FIG. 6, during power generation of the fuel cell 15.

On activation of this routine, the CPU of the controller 50 detects whether there is any unit cell having a deficiency of hydrogen and a resulting voltage drop to a negative voltage level (step S130). Some unit cell located at some position in the fuel cell may be identified as a unit cell having the greater tendency of accumulation of condensed water and a voltage drop to a negative voltage level due to a deficiency of hydrogen. A concrete procedure of step S130 obtains the voltages of the individual unit cells from the voltage sensors 52 and determines whether any unit cell detected to have a negative voltage or any negative-voltage unit cell meets the condition of the identified unit cell explained above. In the case where any negative-voltage unit cell meets the condition of the identified unit cell, on condition that the negative voltage of the negative-voltage unit cell is equal to or less than a reference voltage level, the procedure detects the presence of any unit cell having a deficiency of hydrogen or any hydrogen-deficient unit cell.

In response to detection of the presence of any hydrogen-deficient unit cell at step S130, the CPU of the controller 50 derives a power generation-time anode morphology variation of each detected hydrogen-deficient unit cell (step S140). The power generation-time anode morphology variation is drivable from a map representing a relation of the anode catalyst surface area to the frequency of hydrogen deficiencies, like the map of FIG. 5 representing the relation of the anode catalyst surface area to the number of stoppages of power generation. The power generation-time anode morphology variation is affected by various power generation conditions of the negative-voltage unit cell, i.e., the voltage, the current magnitude, the temperature, and the time period when the unit cell has the negative voltage level. The influence of each of these power generation conditions on the reduction of the anode catalyst surface area induced by one hydrogen deficiency is determinable as a voltage-, current-, temperature-, or time-sensitive factor of varying the reduction of the anode catalyst surface area per hydrogen deficiency, like the temperature-sensitive factor explained previously. At step S140, the CPU of the controller 50 increments the frequency of hydrogen deficiencies by a current hydrogen deficiency and refers to the map to derive an anode morphology variation induced by the current hydrogen deficiency. The CPU of the controller 50 detects the power generation conditions (i.e., the voltage, the current magnitude, the temperature, and the time period when the unit cell has the negative voltage level) of each negative-voltage unit cell and corrects the derived anode morphology variation induced by the current hydrogen deficiency with the respective sensitive factors, so as to determine the power generation-time anode morphology variation.

After derivation of the power generation-time anode morphology variation induced by the current hydrogen deficiency at step S140, the CPU of the controller 50 integrates and stores the power generation-time anode morphology variation with regard to each unit cell detected to have a negative voltage (step S150) and terminates this routine. In this manner, the controller 50 stores the information on identification of each unit cell and the integration value of the power generation-time anode morphology variation of each identified unit cell. Any unit cell of the fuel cell 15 is expected to have a similar level of the anode morphology variation at the time of a stoppage of power generation. The anode morphology variation during power generation of the fuel cell is, on the other hand, derived for each unit cell identified to have an actual anode potential rise.

In response to detection of the absence of any hydrogen-deficient unit cell at step S130, the CPU of the controller 50 terminates this routine.

In the configuration of this embodiment, the processing flow derives the anode morphology variation induced by an anode potential rise during power generation of the fuel cell 15, as well as the anode morphology variation at the stoppage of power generation of the fuel cell 15. This arrangement enables the anode morphology variation induced by an anode potential rise to the high potential level to be estimated with the higher accuracy.

H. Change of Control Based on Anode Catalyst Morphology Variation

With the progress of an anode morphology change, the output voltage of the fuel cell during ordinary power generation gradually decreases to degrade the performance of the fuel cell. The performance degradation of the fuel cell caused by an anode morphology change is described below in detail.

A voltage drop of the fuel cell induced by an anode morphology change arises from an anode potential rise, which is supposed to be kept at the substantially 0-V level during power generation. An anode potential rise induced by an anode morphology change is at least partly ascribed to a decrease of the surface area of the catalyst metal fine particles dispersively supported on the carrier at the anode in the course of the anode morphology change as discussed previously. The decreased surface area of the catalyst metal reduces the sites where the anode reaction or the hydrogen oxidation reaction proceeds. This causes an overvoltage increase or an anode potential rise and leads to a voltage drop of the fuel cell (i.e., performance degradation of the fuel cell).

Figure 21:
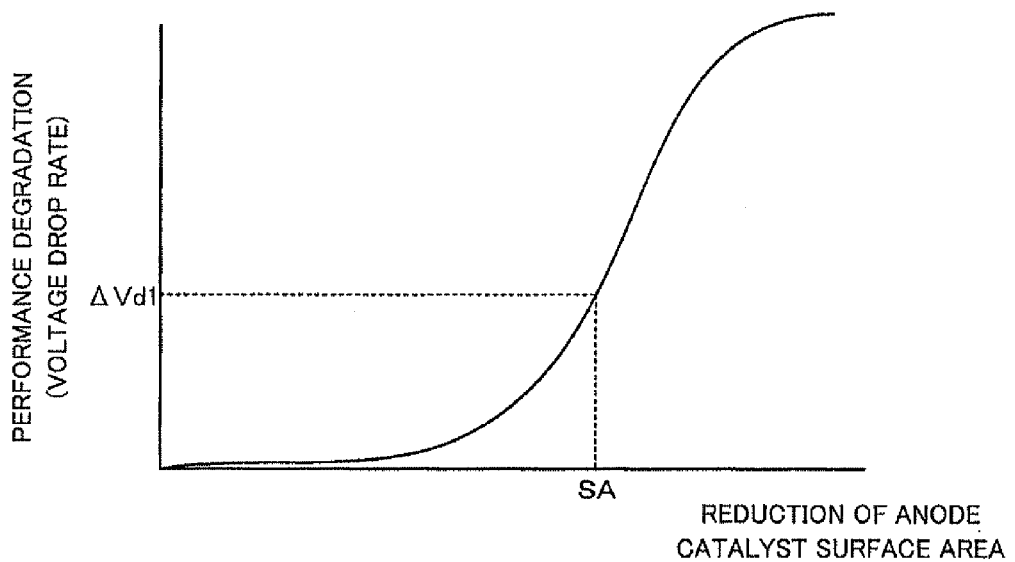
FIG. 21 is an explanatory graphical representation of a relation of the performance degradation of the fuel cell to the degree of an anode morphology change.
Figure 22:
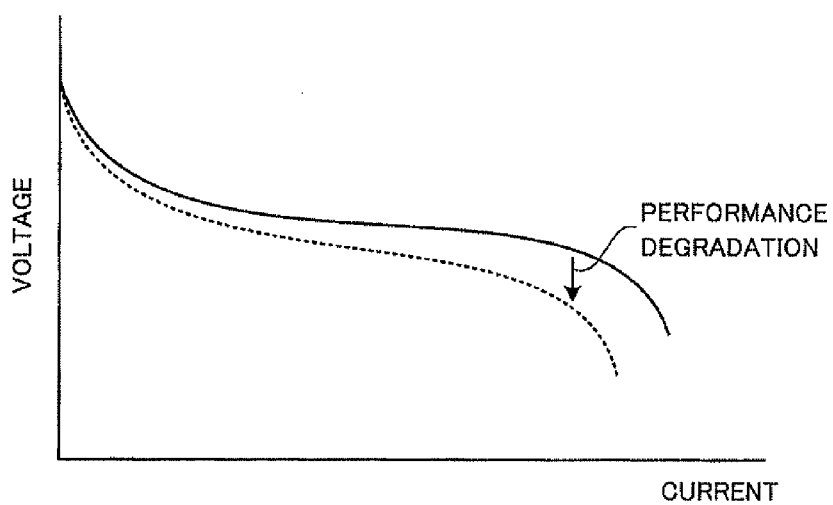
FIG. 22 is an explanatory graphical representation of I-V characteristic curves of the fuel cell.

FIG. 21 is an explanatory graphical representation of a relation of the performance degradation of the fuel cell (i.e., voltage drop rate under a specific power generation condition) to the degree of an anode morphology change (i.e., reduction of the anode catalyst surface area relative to an original value at the time of manufacturing the fuel cell 15). The voltage drop rate under the specific power generation condition represents a decreasing degree of the voltage on the occasion of power generation of the fuel cell 15 to have a certain value of the output current under fixed temperature and gas supply conditions. The greater voltage drop rate leads to the greater deterioration of an I-V characteristic representing a current-voltage relation of the fuel cell 15 and the greater degradation of the cell performance. FIG. 22 is an explanatory graphical representation of I-V characteristic curves of the fuel cell. As shown by an arrow in FIG. 22, an anode potential rise with reduction of the anode catalyst surface area lowers the fuel cell voltage and degrades the cell performance.

In the event of a voltage drop of the fuel cell with an increase of the anode morphology variation, the power generation-related controls of the fuel cell may be changed adequately in consideration of the voltage drop rate. The following describes a configuration of changing the various controls based on a voltage drop rate of the fuel cell induced by an anode morphology change.

H-1. Restriction of Voltage Drop

As shown in FIG. 21, the performance degradation (voltage drop) of the fuel cell has a relatively moderate increase rate until the reduction of the anode catalyst surface area to a certain extent. After the reduction of the anode catalyst surface area beyond the certain extent, however, there is a greater increase in rate of the performance degradation of the fuel cell against the reduction of the anode catalyst surface area. The output power of the fuel cell may be controlled, based on the voltage of the fuel cell as explained previously. In this application, in the state of a significant voltage drop of the fuel cell, the same control procedure after the degradation of the cell performance causes a failure in supplying a desired level of electric power from the fuel cell. In the state of the reduction of the anode catalyst surface area beyond the certain extent, it is preferable to change the output control during power generation of the fuel cell for the purpose of restricting a voltage drop caused by the reduction of the anode catalyst surface area and keeping the high performance of the fuel cell. A configuration for performing the change of control in the state of the reduction of the anode catalyst surface area beyond the certain extent to keep the fuel cell voltage at a higher level is discussed below as a tenth embodiment.

Figure 23:
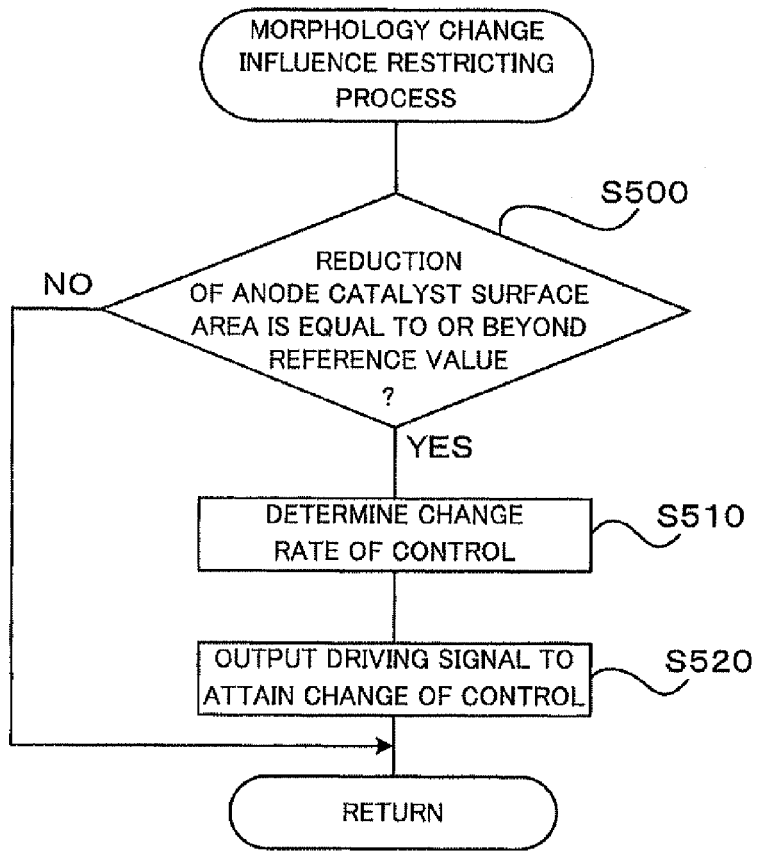
FIG. 23 is a flowchart of a morphology change influence restriction routine.

FIG. 23 is a flowchart of a morphology change influence restriction routine performed by the CPU of the controller 50 in the fuel cell system 10 of the tenth embodiment. This routine is repeatedly performed during power generation of the fuel cell 15. This routine may similarly be performed in the fuel cell system 110 or in the fuel cell system 210.

On activation of this routine, the CPU of the controller 50 determines whether the reduction of the anode catalyst surface area is equal to or beyond a reference value (step S500). As shown in FIG. 21, there is a fixed relation between the voltage drop rate of the fuel cell and the reduction of the anode catalyst surface area. A reference anode catalyst surface area reduction SA as an allowable limit of the reduction of the anode catalyst surface area may accordingly be set by specifying a value $\Delta Vd1$ as an allowable limit of a voltage drop rate $\Delta Vd$ (FIG. 21). The controller 50 stores in advance the setting of the reference anode catalyst surface area reduction SA.

At step S500, the CPU of the controller 50 reads the latest anode morphology variation derived and stored by the anode morphology variation deriving routine of FIG. 6 and determines whether the latest anode morphology variation is equal to or beyond the reference anode catalyst surface area reduction SA. The derivation of the anode morphology variation according to the routine of FIG. 6 is performed at the time of a stoppage of power generation of the fuel cell. The latest anode morphology variation read at step S500 is accordingly the anode morphology variation derived at a previous stoppage of power generation of the fuel cell 15.

In the case of deriving and storing the anode catalyst surface area as the anode morphology variation at step S110 in the routine of FIG. 6, the CPU derives a reduction of the anode catalyst surface area relative to the original value at the time of manufacturing from the stored anode catalyst surface area, and compares the derived reduction of the anode catalyst surface area with the reference anode catalyst surface area reduction SA at step S500. In one alternative application, the CPU may set a reference anode catalyst surface area corresponding to the allowable limit $\Delta Vd1$, instead of the reference anode catalyst surface area reduction SA, and use the set reference anode catalyst surface area for the determination of the decision step S500. In another alternative application, the reduction of the anode catalyst surface area may be derived and stored as the anode morphology variation at step S110. Any application may be adopted to determine whether a voltage drop rate exceeds an allowable range according to the degree of an anode morphology change or the anode morphology variation derived at step S110.

When it is determined at step S500 that the latest anode morphology variation is equal to or beyond the reference anode catalyst surface area reduction SA, the CPU of the controller 50 determines a change rate of control required for restricting a voltage drop of the fuel cell induced by an anode morphology change (step S510). The change of control for restricting the voltage drop of the fuel cell induced by an anode morphology change may be actualized by various applications, for example, increasing the pressure of the fuel gas, increasing the flow of the fuel gas (increasing the circulation amount of the fuel gas), increasing the release of the impurities (e.g., nitrogen and water vapor) from the fuel gas, or increasing the humidity of the fuel gas. An application of increasing the pressure of the fuel gas changes a target pressure in adjustment of the variable regulator 42 to increase the hydrogen pressure supplied from the hydrogen tank 20 to the fuel cell 15. An application of increasing the flow of the fuel gas (increasing the circulation amount of the fuel gas) increases the operation amount of the hydrogen circulation pump 44. An application of increasing the release of the impurities from the fuel gas extends the valve-opening time of the purge valve 46 per unit time by, for example, extending each valve-opening time of the purge valve 46 or narrowing the valve-opening interval. An application of increasing the humidity of the fuel gas uses a humidifier (not shown) provided in the anode-side flow path to humidify the fuel gas. Any of these applications of the change of control raises the voltage of the fuel cell 15 (i.e., recovers at least part of the deterioration of the I-V characteristic). In the fuel cell system 10, the fuel gas is circulated through the hydrogen circulation flow path as discussed previously, so that there is generally no requirement for providing a humidifier in the anode-side flow path. The change of control for restricting a voltage drop by increasing the humidity of the fuel gas is thus preferably applied in a fuel cell system of a fuel gas non-circulation configuration equipped with a humidifier to humidify in advance a fuel gas of a relatively low humidity.

Figure 24:
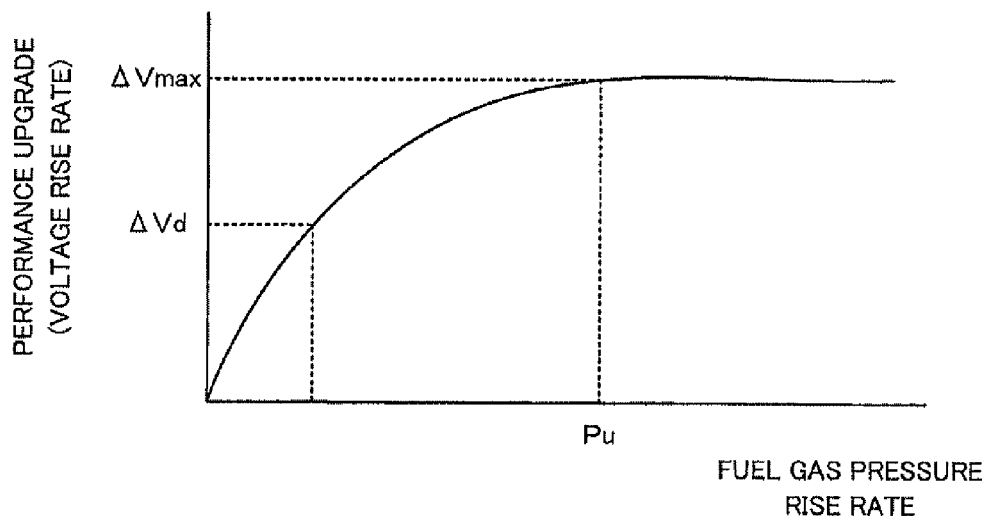
FIG. 24 is an explanatory graphical representation of a relation of the performance upgrade to the fuel gas pressure rise rate.

FIG. 24 is an explanatory graphical representation of a relation of the performance upgrade (voltage recovery rate) to the fuel gas pressure rise rate in the application of increasing the pressure of the fuel gas as the change of control for restricting a voltage drop of the fuel cell induced by an anode morphology change. The controller 50 stores in advance a map representing the relation of the performance upgrade to the fuel gas pressure rise rate shown in FIG. 24. The controller 50 also stores in advance the map representing the relation of the voltage drop rate $\Delta Vd$ of the fuel cell to the reduction of the anode catalyst surface area shown in FIG. 21. At step S510, the CPU of the controller 50 refers to the map of FIG. 21 to derive a voltage drop rate $\Delta Vd$ of the fuel cell corresponding to the latest anode morphology variation, and subsequently refers to the map of FIG. 24 to derive a fuel gas pressure rise rate required for recovery of the derived voltage drop rate $\Delta Vd$ and determine the derived fuel gas pressure rise rate as the change rate of control. In the map of FIG. 24, the voltage rise rate gradually increases with an increase of the fuel gas pressure rise rate, reaches a maximum value $\Delta Vmax$ at a value Pu of the fuel gas pressure rise rate, and keeps the maximum value $\Delta Vmax$ with no more increase against any further increase of the fuel gas pressure rise rate. In this embodiment, the fuel gas pressure rise rate does not exceed the value Pu at which the voltage rise rate for recovery of the derived voltage drop rate ΔVd corresponding to the latest anode morphology variation reaches the maximum value ΔVmax.

In the fuel cell, in the state that only one of the fuel gas and the oxidizing gas has a significantly higher pressure, an increased difference between the gas pressures flowing on the respective faces of the electrolyte membrane increases the potential for damaging the electrolyte membrane. In the application of increasing the pressure of the fuel gas as the change of control for restricting a voltage drop of the fuel cell induced by an anode morphology change, it is thus desirable to simultaneously increase the pressure of the oxidizing gas corresponding to the fuel gas pressure rise rate. At step S510, the CPU simultaneously derives an oxidizing gas pressure rise rate corresponding to the derived fuel gas pressure rise rate. The pressure of the oxidizing gas may be raised by increasing the operation amount of the compressor 30.

The relation of the performance upgrade (voltage recovery rate) to the fuel gas pressure rise rate is given as the map of FIG. 24. In any of the other applications of the change of control for restricting a voltage drop of the fuel cell induced by an anode morphology change as discussed above, there is a similar relation of the performance upgrade to the change rate of control. The change of control for restricting a voltage drop of the fuel cell discussed above generally lowers the energy efficiency of the fuel cell system. For example, in the application of increasing the pressure of the fuel gas as the change of control, the simultaneous increase of the operation amount of the compressor 30 lowers the overall energy efficiency of the system. In the application of increasing the flow of the fuel gas as the change of control, the increase of the operation amount of the hydrogen circulation pump 44 lowers the overall energy efficiency of the system. In the application of increasing the release of the impurities from the fuel gas as the change of control, opening the purge valve 46 causes hydrogen to be released simultaneously with the impurities and thereby lowers the overall energy efficiency of the system (use efficiency of the fuel). In the application of increasing the humidity of the fuel gas as the change of control, the energy consumption by humidification lowers the overall energy efficiency of the system. The allowable limit ΔVd1 of the voltage drop rate ΔVd shown in FIG. 21 may be set to an adequate value in consideration of the effect of a voltage recovery and the influence of the lowered energy efficiency caused by the voltage recovery.

After determining the change rate of control to restrict a voltage drop of the fuel cell induced by an anode morphology change at step S510, the CPU of the controller 50 outputs a driving signal to each relevant part to attain the change of control (step S520) and terminates this routine. More specifically, the CPU outputs a driving signal to the variable regulator 42 and the compressor 30, the hydrogen circulation pump 44, the purge valve 46, or the humidifier corresponding to the selected application of the change of control. For example, in the application of attaining the change of control by increasing the pressure of the fuel gas, the operation amounts of the variable regulator 42 and the compressor 30 are varied to attain the fuel gas pressure rise rate derived at step S510. On determination at step S500 that the latest anode morphology variation is less than the reference anode catalyst surface area reduction SA, the performance degradation is identified to be within the allowable range. The CPU of the controller 50 then immediately terminates the routine.

The change of the control for restricting a voltage drop of the fuel cell induced by an anode morphology change may be performed by any combination of multiple different applications of the change of control, instead of a single application of the change of control selected among the plurality of applications of the change of control discussed above. One concrete procedure of the combined change of control may perform one selected application of the change of control (for example, increasing the pressure of the fuel gas) to recover the fuel cell performance until the voltage rise rate reaches the maximum value ΔVmax shown in FIG. 24 and subsequently adopt another selected application of the change of control (for example, increasing the flow of the fuel gas) to recover the fuel cell performance to a further extent. Another concrete procedure of the combined change of control may perform multiple different applications of the change of control simultaneously.

Any of these applications changes the control during power generation based on the anode morphology variation, which is not directly measured but is estimated easily with the high accuracy, so as to restrict the performance degradation of the fuel cell caused by the anode morphology change.

Some method of deriving the anode morphology variation caused by an anode potential rise may be modified to especially focus on a specific site of the fuel cell 15 having the higher potential for the progress of the anode morphology change. For example, the method of acquiring the anode potential rise information based on the fuel cell voltage may acquire the anode potential rise information based on a voltage of a unit cell arranged at a specific position having the inflow of oxygen into the inner-cell fuel gas flow path at an earliest timing, instead of based on the voltage of the overall fuel cell. The method of acquiring the anode potential rise information based on the elapsed time after a stoppage of power generation of the fuel cell may set the reference elapsed time used as the criterion of the determination by focusing on the unit cell arranged at the specific position having the inflow of oxygen into the inner-cell fuel gas flow path at the earliest timing. The method of acquiring the anode potential rise information based on the oxygen concentration on the anode may acquire the anode potential rise information, based on the oxygen concentration at a specific location having an earliest start of the oxygen inflow in the inner-cell fuel gas flow path for the unit cell arranged at the specific position having the inflow of oxygen into the inner-cell fuel gas flow path at the earliest timing. The change of control based on the anode morphology variation derived with focusing on the specific site having the higher potential for the progress of the anode morphology change effectively restricts the performance degradation at the specific site having the highest potential for the performance degradation and thereby keeps the fuel cell performance at the sufficiently high level.

Figure 25:
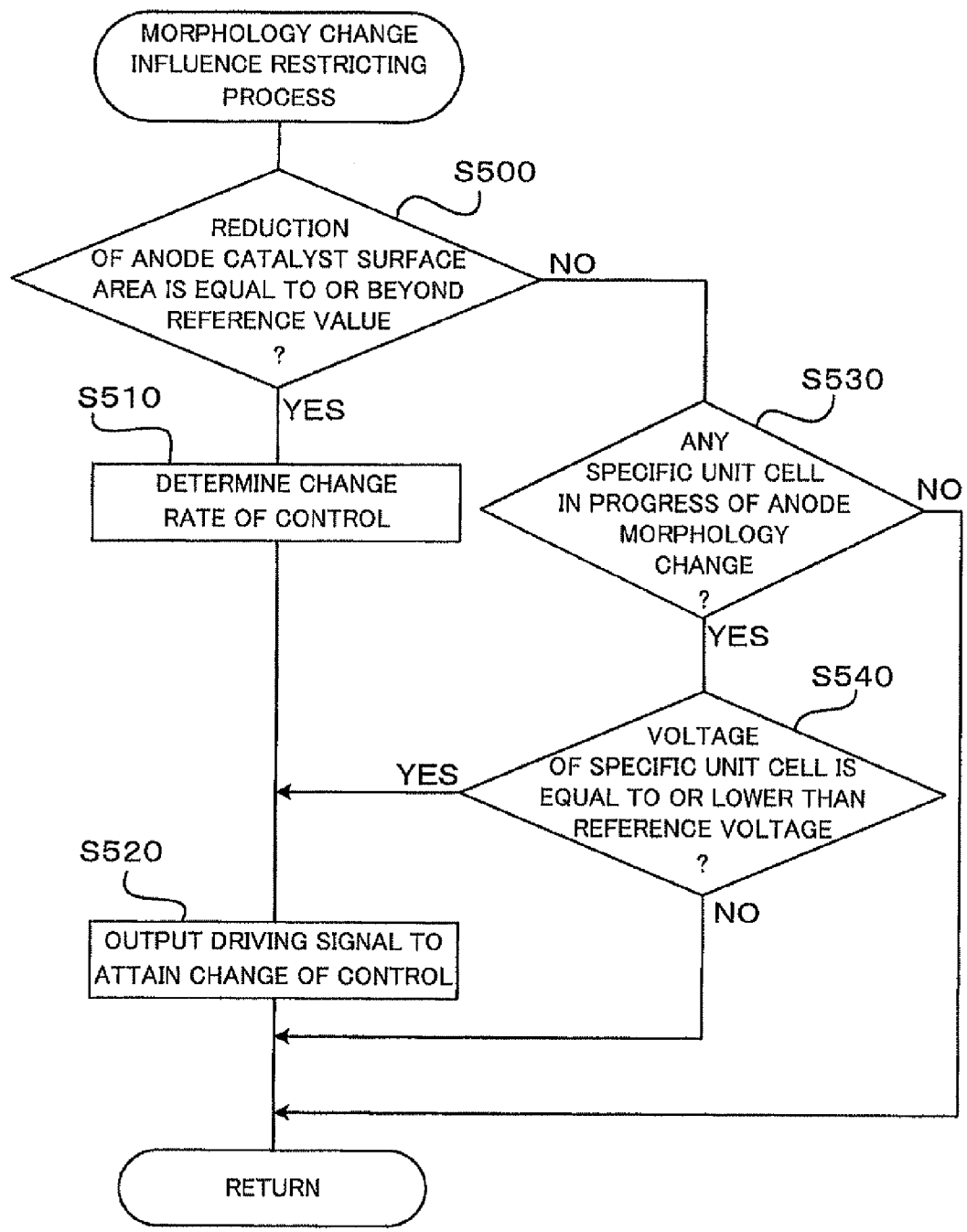
FIG. 25 is a flowchart of a morphology change influence restriction routine.

H-2. Correction of Output Control in Consideration of Power Generation-Time Anode Morphology Change The above embodiment adopts the control of FIG. 23 to restrict a voltage drop induced by an anode morphology change, based on the anode morphology variation derived and stored at step S110 in the routine of FIG. 6. The control for restricting a voltage drop may be performed in further consideration of the power generation-time anode morphology change derived according to the routine of FIG. 20. A configuration for restricting a voltage drop in further consideration of the power generation-time anode morphology change is discussed below as an eleventh embodiment. FIG. 25 is a flowchart of one alternative morphology change influence restriction routine performed by the CPU of the controller 50, in place of the morphology change influence restriction routine of FIG. 23 discussed above. The like steps of FIG.

25 to those of FIG. 23 are expressed by the like step numbers. The following mainly describes the difference from the processing flow of FIG. 23.

On activation of this routine, the CPU of the controller 50 determines whether the reduction of the anode catalyst surface area is equal to or beyond a reference value (step S500). As explained above, at step S500, the CPU reads the latest anode morphology variation derived and stored by the anode morphology variation deriving routine of FIG. 6 and determines whether the latest anode morphology variation or the latest reduction of the anode catalyst surface area is equal to or beyond the reference anode catalyst surface area reduction SA. Namely the determination of step S500 identifies the requirement or the non-requirement for the control of restricting a voltage drop of the overall fuel cell, based on the reduction of the anode catalyst surface area estimated for the overall fuel cell as the anode morphology variation caused by an anode potential rise at the time of a stoppage of power generation.

On determination at step S500 that the latest reduction of the anode catalyst surface area is less than the reference anode catalyst surface area reduction SA, the CPU of the controller 50 identifies the presence or the absence of any specific unit cell in progress of an anode morphology change (step S530). More specifically, the CPU of the controller 50 sums up the power generation-time anode morphology variation of each unit cell integrated and stored at step S150 in the power generation-time anode morphology variation deriving routine of FIG. 20 and the anode morphology variation by one stoppage of power generation derived at step S110 in the routine of FIG. 6 on the assumption of the homogeneous progress in all the unit cells. The CPU subsequently determines whether the total anode morphology variation exceeds a preset reference morphology variation. The reference morphology variation is set as an upper limit of the anode morphology variation, over which the degree of a voltage drop induced by an anode morphology change may be beyond the allowable range. The reference morphology variation may be identical with the reference anode catalyst surface area reduction SA used as the criterion of determination at step S500.

On identification of the presence of any specific unit cell in progress of the anode morphology change at step S530, the CPU of the controller 50 determines whether the voltage of the specific unit cell in progress of the anode morphology change is equal to or lower than a reference voltage (step S540). The reference voltage used as the criterion of determination at step S540 is set and stored in the controller 50 as a lower limit of each unit cell voltage of the fuel cell, below which the fuel cell may have overall performance degradation.

On determination at step S540 that the voltage of the specific unit cell in progress of the anode morphology change is equal to or lower than the reference voltage, the CPU of the controller 50 outputs a driving signal to each relevant part to attain the change of control for restricting a voltage drop induced by an anode morphology change (step S520) and terminates this routine. The change of control for restricting a voltage drop may vary the operation amounts of the variable regulator 42 and the compressor 30 to increase the pressure of the fuel gas. The change of control may vary the operation amount of the hydrogen circulation pump 44 or the purge valve 46 to increase the flow of the fuel cell or may increase the humidity of the fuel gas. The variation of the operation amount of each relevant part may be determined according to the total anode morphology variation computed at step S530. Alternatively the operation amount of each relevant part may be varied by a preset fixed rate each time and sequentially increased until elimination of the voltage drop from the specific unit cell.

On determination at step S540 that the voltage of the specific unit cell in progress of the anode morphology change exceeds the reference voltage, the CPU of the controller 50 detects non-requirement for any special change of control and terminates this routine. On identification of the absence of any specific unit cell in progress of the anode morphology change at step S530, the CPU of the controller 50 also detects non-requirement for any special change of control and terminates this routine.

Even when a voltage drop arises in a specific unit cell in progress of an anode morphology change induced by an anode potential rise during power generation, the configuration of this embodiment changes the control to restrict such a voltage drop. This arrangement effectively prevents the overall performance degradation of the fuel cell caused by the voltage drop in the specific unit cell. A voltage drop in a single unit cell does not immediately decrease the overall current value or the overall voltage value of the fuel cell to an undesirably low level. The fuel cell as a whole keeps the sufficient level of power output. The continuation of the voltage drop in the single unit cell may, however, degrade the overall power output of the fuel cell. The configuration of this embodiment uses the power generation-time anode morphology variation and, in the presence of any specific unit cell having the large power-generation anode morphology variation and an actual cell voltage drop, performs the control of restricting a potential voltage drop even in the normal power output state of the fuel cell as a whole, thus keeping the stable power generation of the fuel cell.

H-3. Correction of Upper Limit Voltage in High Potential Avoidance Process

In the state of a decrease of the fuel cell voltage with reduction of the anode catalyst surface area, the anode potential during power generation rises from 0 V as explained previously. In the drive control based on the fuel cell voltage during power generation of the fuel cell, it is desirable to correct a reference value used for control in consideration of such an anode potential rise. A configuration of a high potential avoidance process in consideration of an anode potential rise is discussed below as a twelfth embodiment.

As shown in FIG. 22, the lower output current gives the greater output voltage of the fuel cell. The high output voltage of the fuel cell is caused by the high cathode potential. Power generation control with setting an upper limit of the output voltage of the fuel cell effectively prevents a cathode morphology change due to exposure of the cathode to an undesirably high potential. In the case that the output voltage of the fuel cell for power output corresponding to a small load demand exceeds the upper limit, the power generation control restricts the setting of the output voltage of the fuel cell to or below the upper limit and causes the fuel cell to generate electric power over the load demand. This effectively prevents an excessive cathode potential rise.

Figure 26:
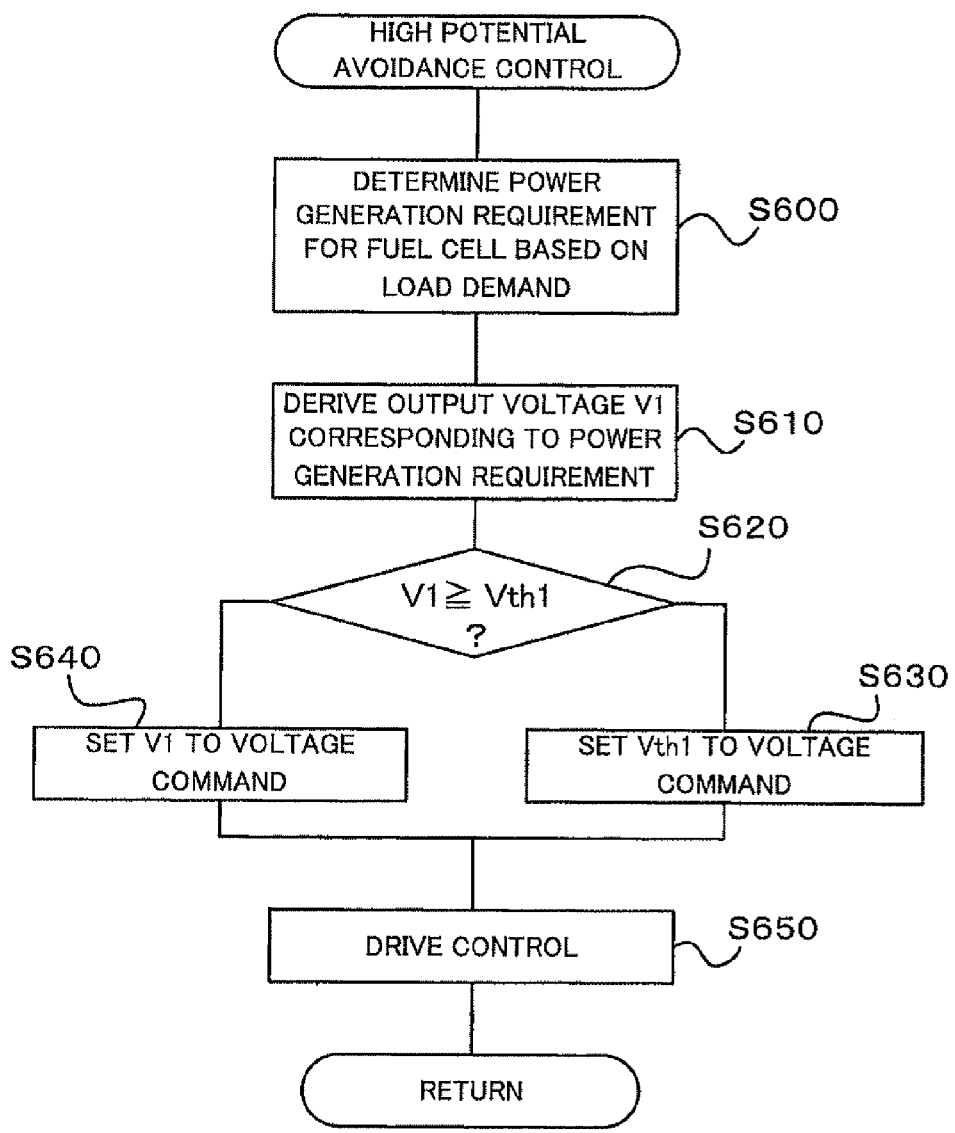
FIG. 26 is a flowchart of a high potential avoidance control routine.

The following describes the general flow of the high potential avoidance process performed to prevent an excessive cathode potential rise. As an example, a series of the high potential avoidance process performed in the electric vehicle 90 of FIG. 14 equipped with the fuel cell system 10 of FIG. 1 is discussed below. FIG. 26 is a flowchart of a high potential avoidance control routine. This routine is performed repeatedly during power generation of the fuel cell 15 by the CPU of the controller 50 in the fuel cell system 10.

On activation of this routine, the CPU of the controller 50 determines a power generation requirement for the fuel cell 15 corresponding to a load demand (step S600). The load demand may be obtained, for example, as a driving power demand derived from a sensing signal of a vehicle speed sensor or a sensing signal of an accelerator opening sensor (neither shown) installed in the electric vehicle 90. The load demand may be derived by adding an energy demand of the auxiliary machinery 94 to the driving power demand. At step S600, the power generation requirement for the fuel cell 15 is determined as an amount of electricity to be generated to satisfy this load demand.

After determining the power generation requirement for the fuel cell 15, the CPU of the controller 50 derives an output voltage V1 of the fuel cell 15 corresponding to the determined power generation requirement (step S610). The controller 50 stores the I-V characteristic shown in FIG. 22. At step S610, the CPU refers to the stored I-V characteristic and specifies an operation point (a combination of output current and output voltage) for generating electric power to satisfy the power generation requirement determined at step S600. The output voltage V1 represents the output voltage of this specified operation point.

After deriving the output voltage V1, the CPU of the controller 50 determines whether the derived output voltage V1 is equal to or beyond an upper limit voltage Vth1 (step S620). The upper limit voltage Vth1 is set as an upper limit of the fuel cell voltage to avoid a cathode potential rise to an excessively high level of inducing a cathode morphology change. On determination at step S620 that the output voltage V1 is equal to or beyond the upper limit voltage Vth1, the CPU of the controller 50 sets not the voltage V1 corresponding to the power generation requirement but the upper limit voltage Vth1 lower than the voltage V1 to a voltage command for the DC-DC converter 92 (step S630).

After setting the voltage command, the CPU of the controller 50 outputs a driving signal to each relevant part (step S650), and terminates this routine. More specifically, the CPU of the controller 50 outputs a driving signal to the DC-DC converter 92 based on the voltage command set at step S630, while outputting driving signals to the drive inverter 93 and the vehicle-related auxiliary machinery to consume electric power corresponding to the load demand. The CPU also outputs driving signals to the fuel cell-related auxiliary machinery to enable the fuel cell 15 to generate electric power at an operation point corresponding to the upper limit voltage Vth1. The drive motor 95 and the auxiliary machinery 94 are thus set in desired driving conditions. Setting the upper limit voltage Vth1 lower than the voltage V1 to the voltage command at step S630 causes the fuel cell 15 to generate a greater amount of electric power than the power generation requirement determined corresponding to the load demand at step S600. The excess electric power beyond the power generation requirement is used to charge the secondary battery 91.

On determination at step S620 that the output voltage V1 is lower than the upper limit voltage Vth1, the CPU of the controller 50 sets the voltage V1 corresponding to the power generation requirement to the voltage command for the DC-DC converter 92 (step S640). After setting the voltage command, the CPU of the controller 50 outputs a driving signal to each relevant part (step S650), and terminates this routine. More specifically, the CPU of the controller 50 outputs a driving signal to the DC-DC converter 92 based on the voltage command set at step S640, while outputting driving signals to the drive inverter 93 and the vehicle-related auxiliary machinery to consume electric power corresponding to the load demand. The CPU also outputs driving signals to the fuel cell-related auxiliary machinery to enable the fuel cell 15 to generate electric power at an operation point corresponding to the voltage V1. The drive motor 95 and the auxiliary machinery 94 are thus set in desired driving conditions.

The above series of high potential avoidance control restricts the output voltage of the fuel cell to or below the upper limit voltage Vth1 and thereby prevents a cathode morphology change from arising from an excessively cathode potential rise. During the high potential avoidance control, the configuration of this embodiment corrects the upper limit voltage Vth1 in consideration of an anode potential rise induced by an anode morphology change, as discussed below.

Figure 27:
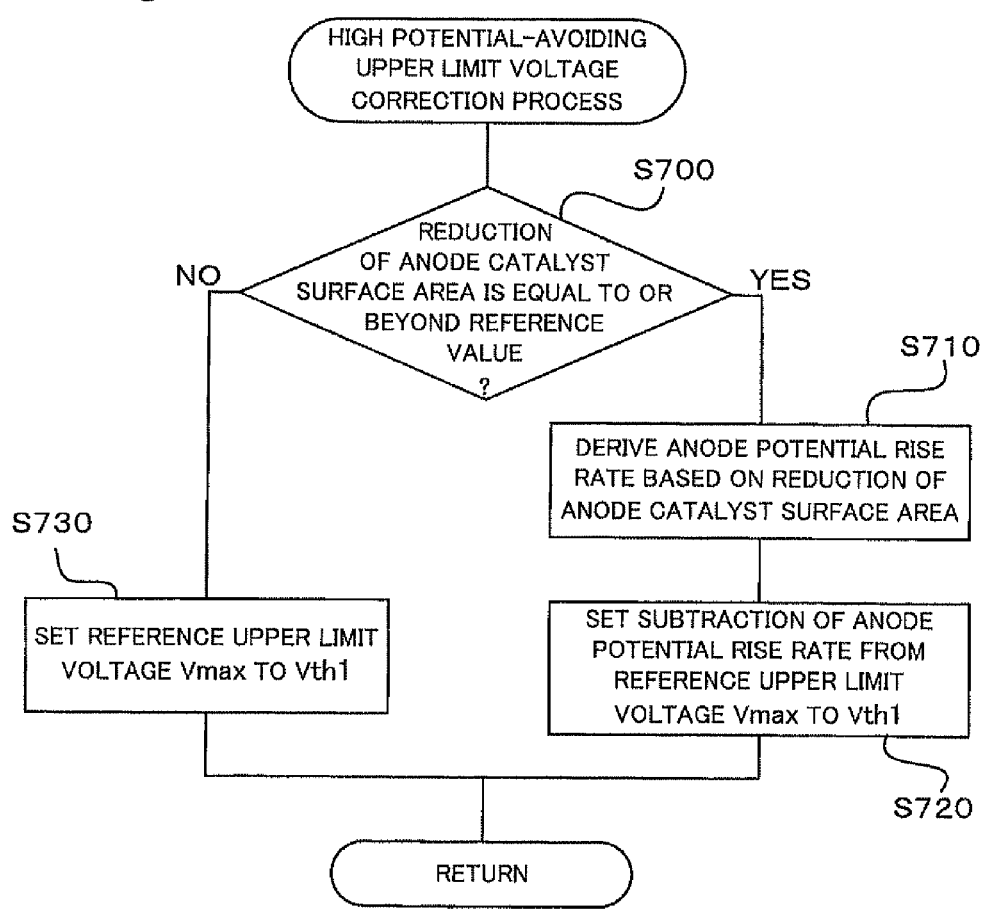
FIG. 27 is a flowchart of a high potential-avoiding upper limit voltage correction routine.

FIG. 27 is a flowchart of a high potential-avoiding upper limit voltage correction routine performed by the CPU of the controller 50. This routine is performed repeatedly, in parallel with the high potential avoidance control routine of FIG. 26, during power generation of the fuel cell 15 by the CPU of the controller 50 in the fuel cell system 10.

On activation of this routine, the CPU of the controller 50 determines whether a latest reduction of the anode catalyst surface area is equal to or beyond a reference value (step S700). The determination of step S700 is similar to the determination of step S500 in the routine of FIG. 23. As discussed previously, there is a relatively small voltage drop rate (anode potential rise rate) of the fuel cell induced by an anode morphology change against a relatively small extent of the anode morphology variation (reduction of the anode catalyst surface area). The determination of step S700 accordingly identifies whether the reduction of the anode catalyst surface area increases to a level that requires correction based on an anode potential rise rate.

On determination at step S700 that the latest anode morphology variation is equal to or beyond the reference value, the CPU of the controller 50 derives an anode potential rise rate ΔVan from the latest reduction of the anode catalyst surface area (step S710). The anode potential rise rate ΔVan induced by an anode morphology change is not a fixed value corresponding to the reduction of the anode catalyst surface area but is affected by the output current of the fuel cell 15. At step S710, the CPU derives an anode potential rise rate against the output current corresponding to the upper limit voltage Vth1 during steady-state power generation of the fuel cell 15.

Figure 28:
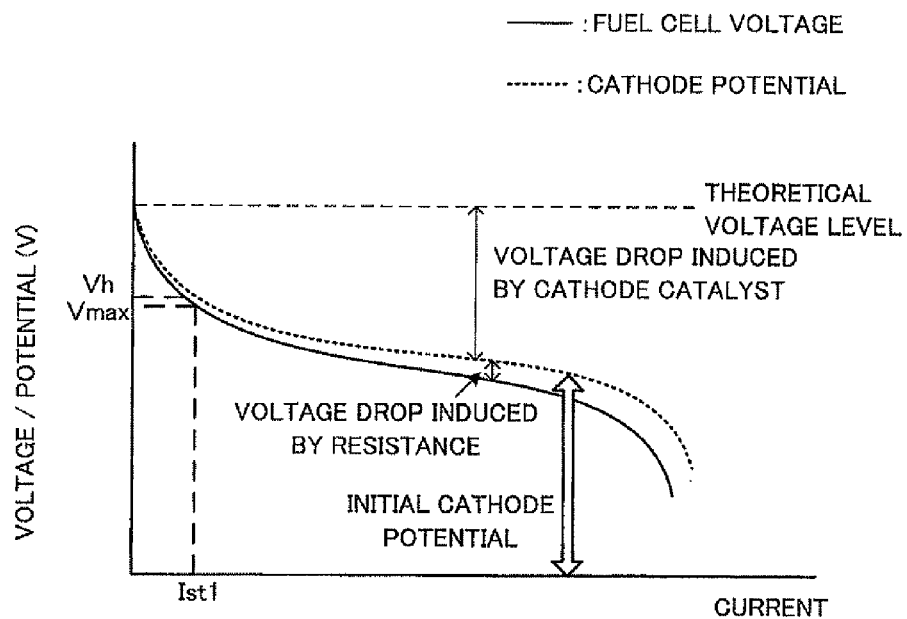
FIG. 28 is an explanatory graphical representation of the I-V characteristic of the fuel cell and relations of the cathode potential to the electric current.
Figure 29:
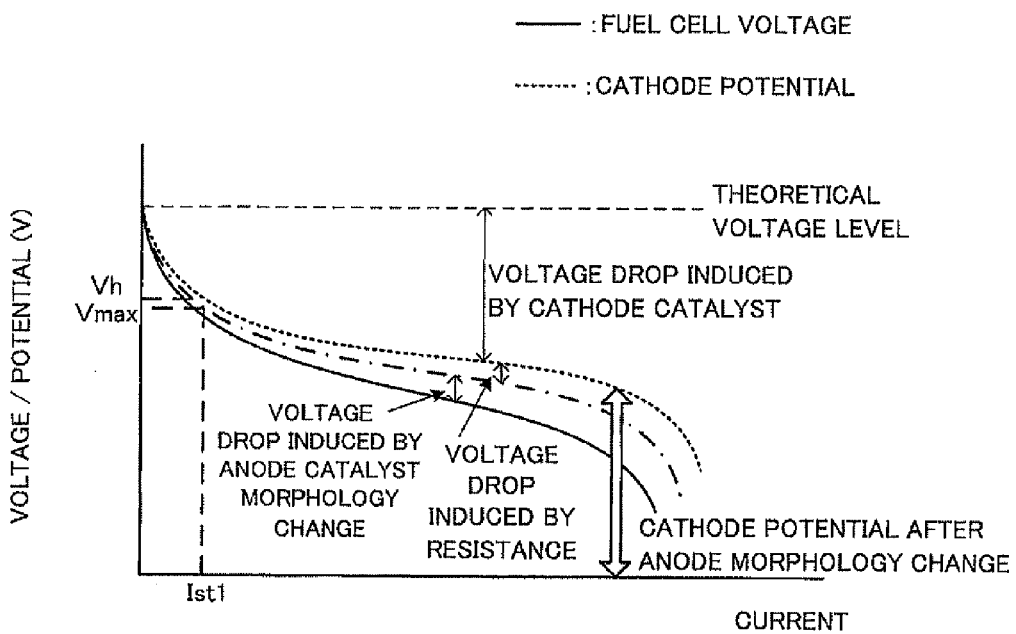
FIG. 29 is an explanatory graphical representation of the characteristic of the fuel cell and relations of the cathode potential to the electric current.

FIGS. 28 and 29 are explanatory graphical representations of the I-V characteristic of the fuel cell and relations of the cathode potential to the electric current. The graph of FIG. 28 shows a relation of the cathode potential to the electric current prior to progress of an anode morphology change. The graph of FIG. 29 shows a relation of the cathode potential to the electric current in progress of the anode morphology change. The controller 50 stores a reference upper limit voltage Vmax as an upper limit of the output voltage of the fuel cell 15. The fuel cell has a voltage drop induced by an overall resistance of the components of the fuel cell (resistance overvoltage), so that the cathode potential is equal to the sum of the resistance-induced voltage drop and the fuel cell voltage as shown in FIG. 28. The reference upper limit voltage Vmax is set based on an upper limit cathode potential Vh of causing no cathode morphology change in consideration of the resistance-induced voltage drop, so as to keep the cathode potential to or below the upper limit cathode potential Vh.

The controller 50 also stores a reference output current Ist1 corresponding to the reference upper limit voltage Vmax in the I-V characteristic curve, in addition to the reference upper limit voltage Vmax. The controller 50 further stores a map representing a relation of the anode potential rise rate to the reduction of the anode catalyst surface area at the output current of the fuel cell equal to the reference output current Ist1. The map representing the relation of the anode potential rise rate to the reduction of the anode catalyst surface area is similar to the map of FIG. 21 representing the relation of the performance degradation (voltage drop rate) to the reduction of the anode catalyst surface area. At step S710, the CPU refers to this map and derives an anode potential rise rate ΔVan corresponding to the latest reduction of the anode catalyst surface area at the output current equal to the reference output current Ist1.

After deriving the anode potential rise rate, the CPU of the controller 50 subtracts the anode potential rise rate ΔVan derived at step S710 from the reference upper limit voltage Vmax and sets the result of the subtraction to the upper limit voltage Vth1 (step S720), and terminates this routine. On determination at step S700 that the latest anode morphology variation is less than the reference value, on the other hand, the CPU of the controller 50 sets the reference upper limit voltage Vmax to the upper limit voltage Vth1 (step S730), and terminates this routine. The latest upper limit voltage Vth1 set either at step S720 or at step S730 in the routine of FIG. 27 is used for the high potential avoidance control of FIG. 26.

Figure 30:
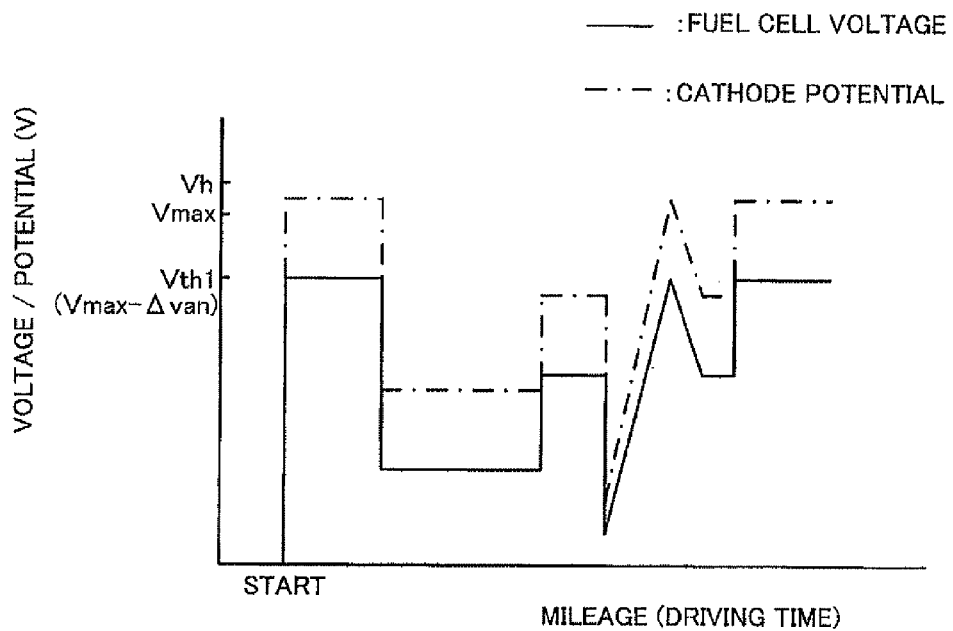
FIG. 30 is an explanatory graphical representation of a fuel cell voltage variation and a cathode potential variation.

In the state of an anode potential rise induced by an anode morphology change, the configuration of this embodiment subtracts the anode potential rise rate ΔVan from the reference upper limit voltage Vmax and sets the result of the subtraction to the upper limit voltage Vth1. Such setting enhances the reliability of the operation for restricting a cathode potential rise to an excessively high level. FIG. 30 is an explanatory graphical representation of a fuel cell voltage variation and a cathode potential variation in progress of an anode morphology change when the high potential avoidance control of FIG. 26 is performed with the upper limit voltage Vth1 set at step S720 of FIG. 27. The graph of FIG. 30 has the mileage of the electric vehicle 90 as the abscissa. The mileage may be replaced by the elapsed time (driving time) since a drive start of the electric vehicle 90 with a start of the fuel cell system 10. The ordinate in the graph of FIG. 30 shows the voltage for the curve of the fuel cell voltage variation, while showing the potential for the curve of the cathode potential variation.

As shown in FIG. 30, when the high potential avoidance control is performed with the upper limit voltage Vth1 set at step S720 of FIG. 27, the fuel cell voltage varying with a variation of the load demand does not exceed the upper limit voltage Vth1. This arrangement effectively restricts the cathode potential to or below the upper limit cathode potential Vh even in the state of the anode potential increased by the anode potential rise rate ΔVan. In progress of an anode morphology change, the cathode potential is given by further adding a value corresponding to the anode potential rise induced by the anode morphology change to the sum of the fuel cell voltage and the resistance-induced voltage drop as shown in FIG. 29. The configuration of this embodiment sets the subtraction of the anode potential rise rate ΔVan from the reference upper limit voltage Vmax to the upper limit voltage Vth1 as discussed above and thereby prevents the cathode potential from exceeding the upper limit cathode potential Vh. This arrangement effectively prevents a cathode morphology change from arising from a cathode potential rise to an excessively high level.

Figure 31:
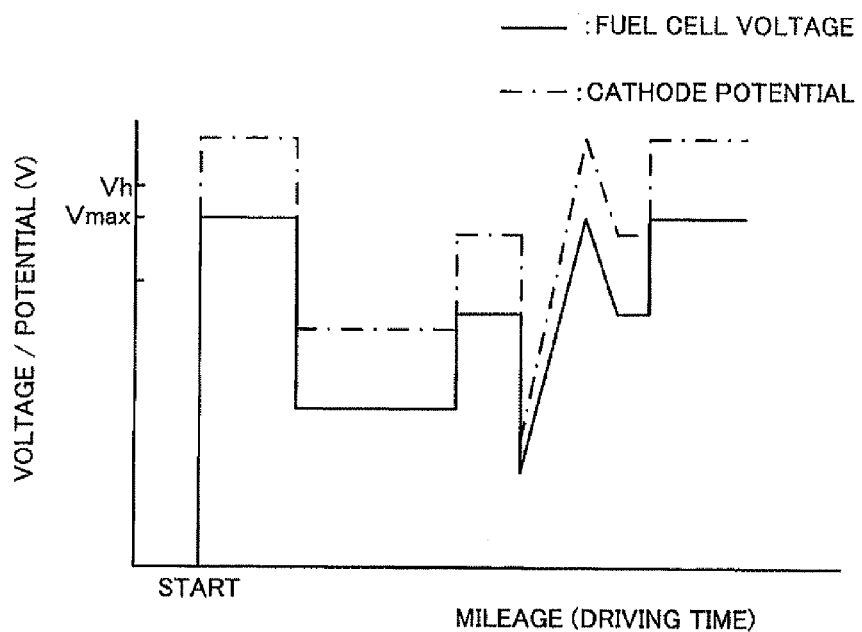
FIG. 31 is an explanatory graphical representation of a fuel cell voltage variation and a cathode potential variation.

FIG. 31 is an explanatory graphical representation of a fuel cell voltage variation and a cathode potential variation in progress of an anode morphology change when the high potential avoidance control of FIG. 26 is performed with the fixed setting of the reference upper limit voltage Vmax to the upper limit voltage Vth1 without the high potential-avoiding upper limit voltage correction of FIG. 27. Such control still restricts the fuel cell voltage to or below the reference upper limit voltage Vmax. Since the anode potential is increased by the anode potential rise rate ΔVan, however, the cathode potential is equal to the sum (Vmax+ΔVan) and may exceed the upper limit cathode potential Vh of causing no cathode morphology change. The correction of the upper limit voltage Vth1 based on the anode potential rise rate ΔVan in the high potential avoidance control effectively prevents an excessive cathode potential rise even in progress of an anode morphology change.

In the above description, the electric power required for satisfying the load demand is fully generated by the fuel cell 15. This configuration is, however, neither essential nor restrictive. For example, part of the electric power required for satisfying the load demand may be supplied by the secondary battery 91. In this modification, power generation control of restricting the fuel cell voltage to or below the upper limit voltage Vth1 effectively prevents a cathode morphology change induced by a cathode potential rise. Correcting the upper limit voltage Vth1 in consideration of the anode potential rise rate ΔVan optimizes the operation of preventing an excessive cathode potential rise.

H-4. Correction of Lower Limit Voltage for Avoidance of Hydrogen-Deficient Operation Hydrogen-deficient operation avoidance control based on the cell voltage may be performed as another example of operation control based on the fuel cell voltage. As explained previously, during power generation of the fuel cell, accumulation of condensed water in the inner-cell fuel gas flow path leads to deficiency of hydrogen supplied to the anode and causes the hydrogen-deficient unit cell to have a negative voltage. There is accordingly an anode potential rise and a resulting anode morphology change in the hydrogen-deficient unit cell. In order to prevent such a disadvantageous state, hydrogen-deficient operation avoidance control for avoiding continuation of power generation in a hydrogen deficient condition is performed in response to detection of a voltage drop induced by hydrogen deficiency. A configuration of hydrogen-deficient operation avoidance control in consideration of an anode potential rise is discussed below as a thirteenth embodiment.

Figure 32:
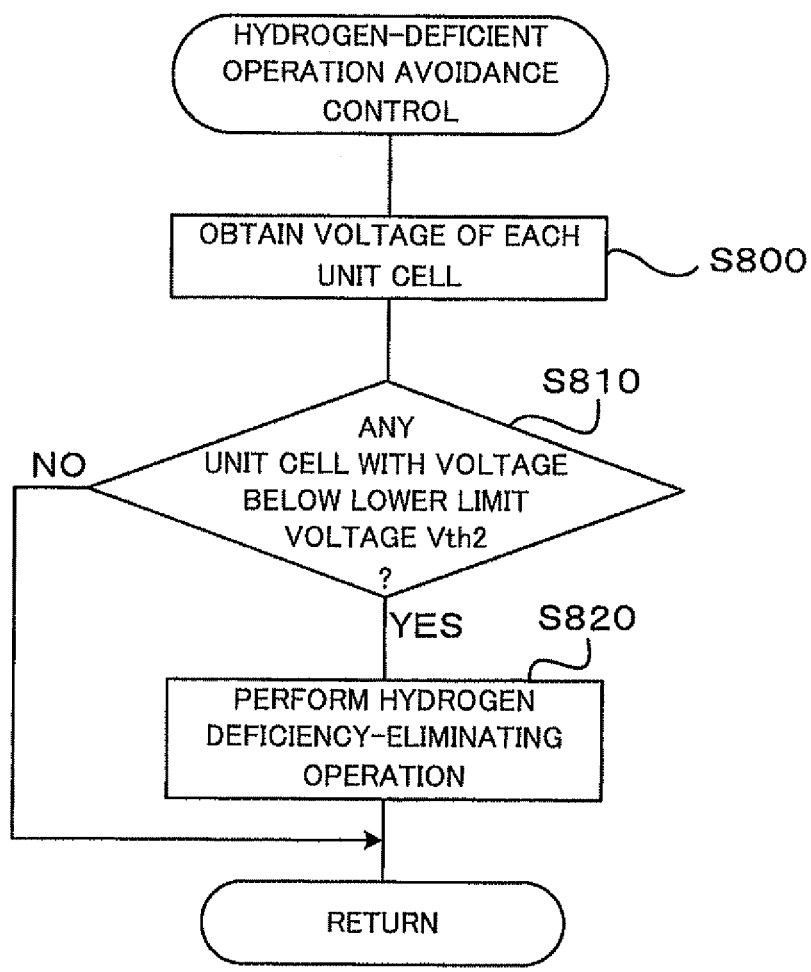
FIG. 32 is a flowchart of a hydrogen-deficient operation avoidance control routine.

FIG. 32 is a flowchart of a hydrogen-deficient operation avoidance control routine. This routine is performed repeatedly during power generation of the fuel cell 15 by the CPU of the controller 50 in the fuel cell system 10.

On activation of this routine, the CPU of the controller 50 obtains a voltage of each individual unit cell 70 of the fuel cell 15 from the voltage sensor 52 (step S800) and identifies the presence or the absence of any specific unit cell having a voltage level below a lower limit voltage Vth2 (step S810). The lower limit voltage Vth2 used as the criterion of determination at step S810 is a preset negative value of the unit cell voltage, below which the hydrogen deficiency exceeds an allowable range.

On identification of the presence of any specific unit cell having the voltage level below the lower limit voltage Vth2 at step S810, the CPU of the controller 50 performs a hydrogen deficiency-eliminating operation (step S820), and terminates this routine. The hydrogen deficiency-eliminating operation performed at step S820 may be, for example, a fuel gas flow-increasing operation. One concrete procedure of the fuel gas flow-increasing operation increases the operation amount of the hydrogen circulation pump 44 in the fuel cell system 10. Another concrete procedure extends the valve-opening time of the purge valve 46 per unit time by, for example, extending each valve-opening time of the purge valve 46 or narrowing the valve-opening interval. Increasing the fuel gas flow by any of these methods purges and removes the liquid water accumulated in the inner-cell fuel gas flow path, thereby eliminating the hydrogen deficiency.

On identification of the absence of any specific unit cell having the voltage level below the lower limit voltage Vth2 at step S810, the CPU of the controller 50 detects no significant hydrogen deficiency to be eliminated, and terminates this routine.

Even when there is a voltage drop (polarity inversion) induced by hydrogen deficiency in the fuel cell, the hydrogen-deficient operation avoidance control immediately eliminates the hydrogen deficiency as discussed above. This arrangement effectively restricts a decrease of the power generation efficiency of the fuel cell caused by hydrogen deficiency-induced polarity inversion. In the hydrogen-deficient operation avoidance control, correcting the lower limit voltage Vth2 in consideration of an anode potential rise induced by an anode morphology change effectively restricts a decrease of the system efficiency caused by the hydrogen deficiency-eliminating operation.

FIG. 33 is a flowchart of a hydrogen deficiency-avoiding lower limit voltage correction process performed by the CPU of the controller 50 in this embodiment. This routine is performed repeatedly, in parallel with the hydrogen-deficient operation avoidance control routine of FIG. 32, during power generation of the fuel cell 15 by the CPU of the controller 50 in the fuel cell system 10.

On activation of this routine, the CPU of the controller 50 determines whether a latest reduction of the anode catalyst surface area is equal to or beyond a reference value (step S900). The determination of step S900 is similar to the determination of step S500 in the routine of FIG. 23. As discussed previously, there is a relatively small voltage drop rate (anode potential rise rate) of the fuel cell induced by an anode morphology change against a relatively small extent of the anode morphology variation (reduction of the anode catalyst surface area). The determination of step S900 accordingly identifies whether the reduction of the anode catalyst surface area increases to a level that requires correction based on an anode potential rise rate.

On determination at step S900 that the latest anode morphology variation is equal to or beyond the reference value, the CPU of the controller 50 derives an anode potential rise rate $\Delta Van$ from the latest reduction of the anode catalyst surface area (step S910). The anode potential rise rate $\Delta Van$ induced by an anode morphology change is affected by the reduction of the anode catalyst surface area and the output current of the fuel cell as explained above. The controller 50 stores a map for specifying an anode potential rise rate $\Delta Van$ corresponding to the reduction of the anode catalyst surface area and the electric current of the fuel cell as parameters. At step S910, the CPU refers to this map and derives an anode potential rise rate $\Delta Van$ corresponding to the latest reduction of the anode catalyst surface area at the current output current.

After deriving the anode potential rise rate, the CPU of the controller 50 subtracts the anode potential rise rate $\Delta Van$ derived at step S910 from a reference lower limit voltage Vmin and sets the result of the subtraction to the lower limit voltage Vth2 (step S920), and terminates this routine. The reference lower limit voltage Vmin is a negative value set and stored in the controller 50 as a criterion of determination whether the lower limit voltage Vth2 or the hydrogen deficiency is within or out of an allowable range in the initial state of the fuel cell (at the manufacturing time) with no progress of an anode morphology change.

On determination at step S900 that the latest anode morphology variation is less than the reference value, on the other hand, the CPU of the controller 50 sets the reference lower limit voltage Vmin to the lower limit voltage Vth2 (step S930), and terminates this routine. The latest lower limit voltage Vth2 set either at step S920 or at step S930 in the routine of FIG. 33 is used for the hydrogen-deficient operation avoidance control of FIG. 32.

In the state of an anode potential rise induced by an anode morphology change, the configuration of this embodiment subtracts the anode potential rise rate $\Delta Van$ from the reference lower limit voltage Vmin and sets the result of the subtraction to the lower limit voltage Vth2. Such setting effectively restricts a decrease of the efficiency of the fuel cell system caused by the hydrogen-deficient operation avoidance control, while sufficiently avoiding continuation of power generation in the hydrogen deficient condition. In progress of an anode morphology change, even when there is no significance change of the hydrogen deficiency before and after the anode morphology change, an anode potential rise causes the hydrogen deficiency-induced negative voltage of the fuel cell to be decreased by the anode potential rise rate $\Delta Van$. Even in the state of setting the subtraction of the anode potential rise rate $\Delta Van$ from the reference lower limit voltage Vmin to the lower limit voltage Vth2, the hydrogen-deficient operation avoidance control is performed in the hydrogen deficient condition that is substantially equivalent to the hydrogen deficient condition used as the criterion of determination before the anode morphology change.

In progress of the anode morphology change, correction of the lower limit voltage Vth2 to a smaller value extends the time period without the hydrogen deficiency-eliminating operation and thereby restricts a decrease of the efficiency of the fuel cell system caused by the hydrogen deficiency-eliminating operation. For example, in the application of increasing the operation amount of the hydrogen circulation pump 44 as the hydrogen deficiency-eliminating operation, the increased energy consumption by the hydrogen circulation pump 44 lowers the energy efficiency of the fuel cell system. In the application of extending the valve-opening time of the purge valve 46 per unit time as the hydrogen deficiency-eliminating operation, the increased amount of hydrogen discharged from the system lowers the use efficiency of the fuel in the fuel cell system. Delaying the timing of the hydrogen deficiency-eliminating operation preferably restricts a decrease of the system efficiency caused by the hydrogen deficiency-eliminating operation.

H-5. Effects by Changing Control

As discussed above, when there is performance degradation of the fuel cell (anode potential rise) with an increase of the anode morphology variation, the control associated with power generation of the fuel cell is changed to be optimized according to the increased anode morphology variation. When performance degradation of the fuel cell is expected with an increase of the anode morphology variation, the optimized change of control enables the performance of the fuel cell to be kept at the sufficiently high level for a longer time period.

Even in progress of an anode morphology variation, the optimized change of control enables the performance of the fuel cell to be kept at the sufficiently high level for a longer time period. This advantageously reduces the amount of the catalyst metal included in the anode.

In the fuel cell, the cathode has a potential rise induced by generation of an internal cell inside the fuel cell at the time of a system shutdown, while having a potential rise to an undesirably high potential level in a low power output condition even during power generation of the fuel cell. There is accordingly a high probability of a cathode morphology change caused by such a cathode potential rise. Oxygen supplied as the electrode active material to the cathode has the lower reaction rate than hydrogen supplied as the electrode active material to the anode, and the air used as the oxidizing gas has a relatively low concentration of oxygen. The cathode accordingly requires a sufficient amount of the catalyst metal.

Hydrogen having the higher reaction rate than oxygen is supplied as the electrode active material to the anode, and the hydrogen concentration in the fuel gas is generally higher than the oxygen concentration in the air. The anode accordingly requires a less amount of the catalyst metal than the cathode without lowering the performance of the fuel cell. The amount of the catalyst metal in the anode is thus generally set to be less than the amount of the catalyst metal in the cathode. Proposed methods of setting the amount of the catalyst metal in the electrode place the emphasis on reduction of the catalyst metal included in the cathode, which requires a greater amount of the catalyst metal. There have been only insufficient studies or discussions on reduction of the catalyst metal included in the anode, which requires a less amount of the catalyst metal than the cathode.

As mentioned above, the anode generally requires a less amount of the catalyst metal than the cathode. For further cost reduction and further spread of fuel cells, it is desirable to minimize the amount of the catalyst metal in the anode within a range of keeping the cell performance at the sufficient level. Even in the event of an anode potential rise induced by an anode morphology change, a sufficiently large amount of the catalyst metal in the anode assures an extremely long life of the fuel cell without lowering the performance of the fuel cell to a practically unusable level. Reduction of the catalyst metal included in the anode may, however, cause the performance degradation of the fuel cell associated with an anode potential rise induced by an anode morphology change to a non-negligible level during the long-term application of the fuel cell system.

In some progress of an anode morphology change, the configurations of the tenth through the thirteenth embodiments discussed above change the control according to the degree of the anode morphology change. The adequately changed control enables the performance of the fuel cell to be kept at the sufficiently high level even in progress of an anode morphology change. Even in the condition of the reduced amount of the catalyst metal in the anode, such optimized control effectively extends the life of the fuel cell without lowering the performance of the fuel cell.

I. Modifications

The invention is not limited to any of the embodiments and their applications discussed above but may be actualized in diversity of other embodiments and applications within the scope of the invention. Some examples of possible modification are given below.

I1. Modification 1

The configuration of the embodiment discussed above derives a current anode morphology variation caused by a current stoppage of power generation, based on anode potential rise information and adds the current anode morphology variation to a stored integration value of the anode morphology variation to determine the latest anode morphology variation. The stored integration value of the anode morphology variation may be corrected with the actual measurement value. At timings suitable for the application of the fuel cell system, for example, at the time of inspection of the electric vehicle 90 equipped with the fuel cell system 10, the anode catalyst surface area may be actually measured by cyclic voltammetry. Correction of the estimated integration value of the anode catalyst surface area with the actual measurement value of the anode catalyst surface area preferably enhances the reliability of the control based on the reduction of the anode catalyst surface area during the long-term application of the fuel cell system.

I2. Modification 2

In the embodiment, the fuel cell 15 is a polymer electrolyte fuel cell. The technique of the invention is, however, applicable to any of various other types of fuel cells having an anode potential rise caused by the inflow of oxygen into inner-cell fuel gas flow paths after a stoppage of power generation of the fuel cell.

The invention claimed is:

1. A fuel cell system having a fuel cell, comprising:
    a power generation-time gas supplier that supplies a hydrogen-containing fuel gas to an anode of the fuel cell and supplies an oxygen-containing oxidizing gas to a cathode of the fuel cell during power generation of the fuel cell; and
    a processor that executes control logic to:
        acquire anode potential rise information, which represents information regarding a status of an anode potential rise of the fuel cell and includes information regarding a number of stoppages of power generation, after termination of supplies of the fuel gas and the oxidizing gas by the power generation-time gas supplier; and
        refer to the information regarding the number of stoppages of power generation and a pre-stored relationship between the information regarding the number of stoppages of power generation and an anode morphology variation representing a degree of a morphology change of a catalyst metal included in the anode so as to derive the anode morphology variation.

2. The fuel cell system in accordance with claim 1, wherein the acquired anode potential rise information represents information showing one occurrence of anode potential rise occurring after a stoppage of power generation of the fuel cell.

3. The fuel cell system in accordance with claim 2, further comprising:
    a voltage sensor that obtains a voltage of the fuel cell,
    wherein the information showing one occurrence of anode potential rise occurring after the stoppage of the fuel cell is generated based on a variation pattern of the voltage obtained by the voltage sensor.

4. The fuel cell system in accordance with claim 3, wherein the variation pattern of the voltage obtained by the voltage sensor has a drop after the stoppage of power generation of the fuel cell, an upward turn from the drop, and a subsequent downward turn.

5. The fuel cell system in accordance with claim 2, the processor further executing the control logic to:
    obtain an elapsed time after a stoppage of power generation of the fuel cell,
    wherein the information showing one occurrence of anode potential rise occurring after the stoppage of the fuel cell is generated when the obtained elapsed time reaches a first reference time that is determined based on a progress status of an anode morphology change.

6. The fuel cell system in accordance with claim 5, wherein the first reference time represents a time period required for stabilization of anode potential which rises after the stoppage of power generation of the fuel cell.

7. The fuel cell system in accordance with claim 5, wherein the first reference time represents a time period required for termination of an anode morphology change reaction proceeding after the stoppage of power generation of the fuel cell.

8. The fuel cell system in accordance with claim 2, the processor further executing the control logic to:
    derive an oxygen partial pressure in a flow path of the fuel cell formed on the anode in the fuel cell,
    wherein the information showing one occurrence of anode potential rise occurring after the stoppage of the fuel cell is generated when the derived oxygen partial pressure exceeds a preset reference partial pressure.

9. The fuel cell system in accordance with claim 2, wherein the information showing one occurrence of anode potential rise occurring after the stoppage of the fuel cell is generated upon execution of a power generation stopping process of the fuel cell associated with termination of the supplies of the fuel gas and the oxidizing gas by the power generation-time gas supplier.

10. The fuel cell system in accordance with claim 9, wherein the power generation stopping process comprises an air purge operation of supplying air to a flow path of the fuel gas in the fuel cell.

11. The fuel cell system in accordance with claim 2, the processor further executing the control logic to:
    store the derived anode morphology variation in an anode morphology variation memory,
    wherein the deriving the anode morphology variation adds a value currently derived as an amount of an anode morphology change proceeding with an anode potential rise by one stoppage of power generation of the fuel cell to an accumulated value of the anode morphology variation stored in the anode morphology variation memory upon previous acquisition of the anode potential rise information, so as to derive the anode morphology variation.

12. The fuel cell system in accordance with claim 11, further comprising:
    a fuel cell temperature sensor that obtains a temperature of the fuel cell,
    wherein the deriving the anode morphology variation derives the amount of the anode morphology change proceeding with the anode potential rise by one stoppage of power generation of the fuel cell, based on the obtained temperature of the fuel cell.

13. The fuel cell system in accordance with claim 1, wherein
    after a stoppage of power generation of the fuel cell, upon detection of occurrence of an anode morphology change induced by an anode potential rise without interruption by a restart of the fuel cell, the acquiring the anode potential rise information acquires information showing one anode potential rise occurring after the stoppage of power generation of the fuel cell, as first anode potential rise information, and
    after a stoppage of power generation of the fuel cell, upon detection of a restart of the fuel cell in the middle of an anode morphology change induced by an anode potential rise, the acquiring the anode potential rise information acquires a value representing an anode morphology change proceeding until the restart of the fuel cell, as second anode potential rise information.

14. The fuel cell system in accordance with claim 13, wherein after a stoppage of power generation of the fuel cell, on elapse of a first reference time set according to a progress status of the anode morphology change without a restart of the fuel cell, the acquiring the anode potential rise information acquires the first anode potential rise information, and
    after a stoppage of power generation of the fuel cell, on elapse of a second reference time set at an earlier timing than the first reference time according to the progress status of the anode morphology change and on a restart of the fuel cell before elapse of the first reference time, the acquiring the anode potential rise information acquires information regarding a time when the fuel cell has restarted, as the second anode potential rise information.

15. The fuel cell system in accordance with claim 13, further comprising:
    an anode morphology variation memory that stores the derived anode morphology variation; and
    a second memory that stores in advance a relationship between the second anode potential rise information and the anode morphology variation,
    wherein upon acquisition of the first anode potential rise information, the deriving the anode morphology variation adds a value currently derived as an amount of an anode morphology change proceeding with an anode potential rise by one stoppage of power generation of the fuel cell to an accumulated value of the anode morphology variation stored in the anode morphology variation memory upon previous acquisition of the anode potential rise information, so as to derive the anode morphology variation, and
    upon acquisition of the second anode potential rise information, the deriving the anode morphology variation refers to the acquired second anode potential rise information and the relationship stored in the second memory to derive a current anode morphology change proceeding between a stoppage and a restart of power generation of the fuel cell, and adds the derived current anode morphology change to the accumulated value of the anode morphology variation stored in the anode morphology variation storage upon previous acquisition of the anode potential rise information, so as to derive the anode morphology variation.

16. The fuel cell system in accordance with claim 1, the processor further executing the control logic to:
    identify a negative-voltage unit cell having a negative voltage induced by hydrogen deficiency during power generation of the fuel cell, among unit cells constituting the fuel cell and detect a power generation condition of the identified negative-voltage unit cell;
    refer to the detected power generation condition and a pre-stored relationship between the power generation condition of the identified negative-voltage unit cell and the anode morphology variation so as to derive an anode morphology variation in the identified negative-voltage unit cell; and
    integrate the derived anode morphology variation with regard to each unit cell and thereby derives a power generation-time anode morphology variation for each unit cell, which corresponds to an anode morphology change proceeding with the negative voltage induced by the hydrogen deficiency.

17. The fuel cell system in accordance with claim 1, the processor further executing the control logic to:
    change fuel gas supply control related to the supply of the fuel gas to the anode by the power generation-time gas supplier, in order to restrict a voltage drop arising from an anode morphology change, based on the derived anode morphology variation, during power generation of the fuel cell.

18. The fuel cell system in accordance with claim 16, the processor further executing the control logic to:
    change fuel gas supply control related to the supply of the fuel gas to the anode by the power generation-time gas supplier, in order to restrict a voltage drop arising from an anode morphology change, during power generation of the fuel cell, wherein on determination that the derived anode morphology is not less than a first reference value, the restricting the voltage drop changes the fuel gas supply control, based on the derived anode morphology variation, and on determination that the derived anode morphology variation is less than the first reference value and that there exists a unit cell whose derived power generation-time anode morphology variation exceeds a second reference value, the restricting the voltage drop changes the fuel gas supply control when a voltage of the unit cell with the power generation-time anode morphology variation exceeding the second reference value drops to be lower than a reference voltage.

19. The fuel cell system in accordance with claim 17, wherein the restricting the voltage drop increases a pressure of the fuel gas supplied to the anode, as the change of the fuel gas supply control to restrict the voltage drop arising from the anode morphology change.

20. The fuel cell system in accordance with claim 17, wherein the restricting the voltage drop increases a flow of the fuel gas supplied to the anode, as the change of the fuel gas supply control to restrict the voltage drop arising from the anode morphology change.

21. The fuel cell system in accordance with claim 17, wherein the restricting the voltage drop increases a humidity of the fuel gas supplied to the anode, as the change of the fuel gas supply control to restrict the voltage drop arising from the anode morphology change.

22. The fuel cell system in accordance with claim 1, the processor further executing the control logic to:
- control a power generation status of the fuel cell, in order to prevent an output voltage of the fuel cell from exceeding an upper limit voltage;
- derive an anode potential rise rate induced by an anode morphology change, based on the derived anode morphology variation; and
- set a result of subtraction of the derived anode potential rise rate from a reference upper limit voltage preset for the upper limit voltage, to the upper limit voltage.

23. The fuel cell system in accordance with claim 1, the processor further executing the control logic to:
- perform hydrogen-deficient operation avoidance control for avoiding continuation of power generation in a hydrogen deficient condition, when a voltage of the fuel cell drops to or below a lower limit voltage due to deficiency of hydrogen supplied to the anode;
- derive an anode potential rise rate induced by an anode morphology change, based on the derived anode morphology variation; and
- set a result of subtraction of the derived anode potential rise rate from a reference lower limit voltage preset for the lower limit voltage, to the lower limit voltage.

24. The fuel cell system in accordance with claim 23, wherein the performing the hydrogen-deficient operation avoidance control increases a flow of the fuel gas supplied to the anode, as the hydrogen-deficient operation avoidance control.

* * * * *